(12) United States Patent
Igarashi et al.

(10) Patent No.: US 7,620,045 B2
(45) Date of Patent: Nov. 17, 2009

(54) COMMUNICATION SYSTEM, MULTICAST-CAPABLE ROUTER, TRANSMITTER TERMINAL, RECEIVER TERMINAL, AND COMMUNICATION METHOD

(75) Inventors: Ken Igarashi, Yokohama (JP); So Ishida, Yokosuka (JP); Harunobu Fukazawa, Yokohama (JP)

(73) Assignee: NTT DoCoMo, Inc, Tokyo (JP)

( * ) Notice: Subject to any disclaimer, the term of this patent is extended or adjusted under 35 U.S.C. 154(b) by 293 days.

(21) Appl. No.: 10/563,751

(22) PCT Filed: Jul. 7, 2004

(86) PCT No.: PCT/JP2004/009663

§ 371 (c)(1),
(2), (4) Date: Aug. 29, 2006

(87) PCT Pub. No.: WO2005/004419

PCT Pub. Date: Jan. 13, 2005

(65) Prior Publication Data

US 2007/0121574 A1   May 31, 2007

(30) Foreign Application Priority Data

Jul. 7, 2003   (JP) .............................. 2003-193232
Jan. 30, 2004   (JP) .............................. 2004-024871

(51) Int. Cl.
  *H04L 12/28* (2006.01)
(52) U.S. Cl. ....................... 370/390; 370/432
(58) Field of Classification Search ................. 370/389, 370/390, 432
See application file for complete search history.

(56) References Cited

U.S. PATENT DOCUMENTS

| | | | |
|---|---|---|---|
| 2002/0085506 A1* | 7/2002 | Hundscheidt et al. | 370/254 |
| 2002/0143951 A1* | 10/2002 | Khan et al. | 709/227 |
| 2003/0018715 A1* | 1/2003 | O'Neill | 709/204 |
| 2004/0047322 A1* | 3/2004 | O'Neill | 370/338 |
| 2004/0098448 A1* | 5/2004 | Fukushima et al. | 709/201 |

FOREIGN PATENT DOCUMENTS

| | | |
|---|---|---|
| CN | 1503538 A | 6/2004 |
| JP | 11-127199 | 5/1999 |
| JP | 2002-094562 | 3/2002 |
| JP | 2002-368751 | 12/2002 |
| JP | 2002-374276 | 12/2002 |
| JP | 2003-309601 | 10/2003 |
| JP | 2004-172932 | 6/2004 |

(Continued)

*Primary Examiner*—Chirag G Shah
*Assistant Examiner*—Daniel Mitchell
(74) *Attorney, Agent, or Firm*—Oblon, Spivak, McClelland, Maier & Neustadt, L.L.P.

(57) ABSTRACT

A communication system (1) is provided with URs (20*a* to 20*h*) and a source terminal (10). The URs (20*a* to 20*h*) include: entry holders (21*a* to 21*h*) for holding forwarding addresses; message processors (25) for registering the addresses of other URs, the addresses being associated with a source terminal address and a multicast group address, in the entry holders (21*a* to 21*h*) as the forwarding addresses; message providers (26) for providing the source terminal address with join request messages which request the addition of the addresses of the URs to sending addresses. The source terminal (10) includes: an entry holder (11) for holding a sending address; and a message processor 14 for registering the addresses of the URs (20*a* to 20*h*) in the entry holder 11 as sending addresses based on the join request messages.

12 Claims, 41 Drawing Sheets

FOREIGN PATENT DOCUMENTS

| | | |
|---|---|---|
| JP | 2004-242063 | 8/2004 |
| JP | 2004-253976 | 9/2004 |
| JP | 4094537 | 3/2008 |
| JP | 4194956 | 10/2008 |

* cited by examiner

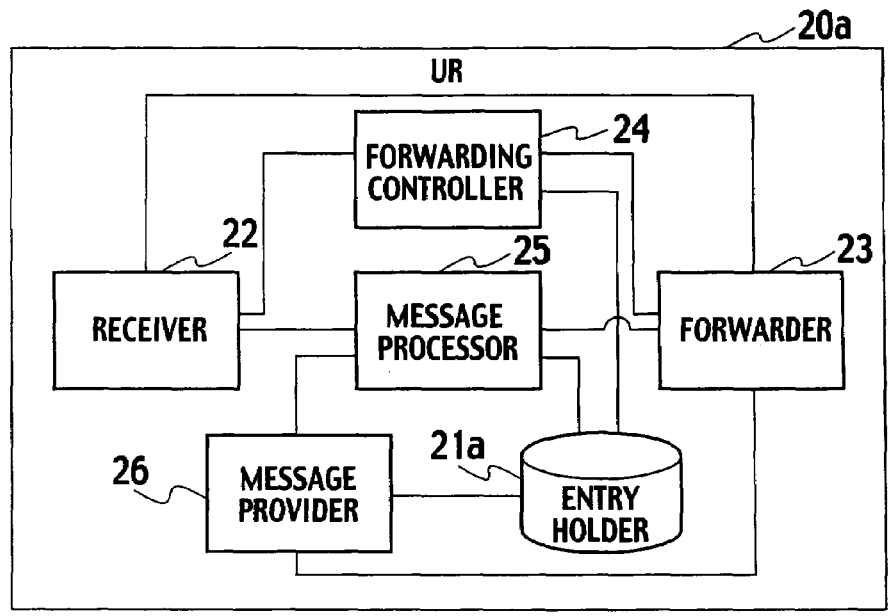

| ISA | MULTICAST GROUP ADDRESS | oISA | MPT | ST |
|---|---|---|---|---|
| S | G | | | |
| S' | G | S | MPT | ST |

COMMUNICATION SYSTEM, MULTICAST-CAPABLE ROUTER, TRANSMITTER TERMINAL, RECEIVER TERMINAL, AND COMMUNICATION METHOD

TECHNICAL FIELD

The present invention relates to a communication system, a multicast-capable router, a source terminal, a destination terminal and a communication method.

BACKGROUND ART

Multicast where a packet is transmitted to a plurality of destination terminals is conventionally performed ("Deploying IP Multicast in the Enterprise" by Thomas A. Maufer, translated by Hiroyuki Kusumoto). In a communication system, multicast is performed by use of protocols whose standardization is being promoted by the Internet Engineering Task Force (IETF), the protocols being such as: Source-Specific Multicast (SSM) (Internet Draft, "dradt-ietf-ssm-overviw-xx.txt", "Japanese Journal B of the Institute of Electronics, Information and Communication Engineers", Vol. J85-B, No. 8, pp. 1207-1214); Internet Management Protocol Version 3 (IGMPv3) (RFC3376, "Internet Management Protocol Version 3"); Hop by Hop Multicast Routing Protocol (HBH) (L. HMK Costa, S. Fidia and O CMB Duarte, "HOP by HOP Multicast Routing Protocol", ACM SIGCOM 2001, August 2001); Protocol Independent Multicast-Sparse Mode (PIM-SM) (RFC 2362, "Protocol Independent Multicast-Sparse Mode (PIM-SM): Protocol Specification").

Furthermore, in order to continue communications even when a source terminal transmitting a multicast packet moves and then its address is changed, Mobile IP Bi-Directional Tunneling (MIP-BT) is being proposed. In MIP-BT, communications are intended to be continued by forwarding a multicast packet transmitted from a source terminal which has moved to a foreign network via a home agent.

DISCLOSURE OF THE INVENTION

However, unless all routers are multicast-capable routers which correspond to a multicast protocol, it is impossible to forward a multicast packet in a conventional communication system. That is, when multicast-capable routers are mixed with multicast-incapable routers which do not correspond to a multicast protocol, a multicast packet cannot be forwarded.

An object of the present invention is therefore to set an appropriate multicast tree and forward a multicast packet even if there is a multicast-incapable router in a communication system.

A communication system of the present invention includes multicast-capable routers and a source terminal. The multicast-capable router includes: a forwarding destination holder for holding a forwarding address to which a multicast-capable router forwards a multicast packet; a forwarding destination register for registering, in the forwarding destination holder, the address of another multicast-capable router as a forwarding address while associating the address with a source terminal address and a multicast group address; and a router message provider for providing, to the source terminal address, a join request message which requests the addition of the address of the multicast-capable router to a sending address where the source terminal transmits the multicast packet. The source terminal includes: a sending destination holder for holding a sending address; and a sending destination register for registering the address of the multicast-capable router in the sending destination holder as a sending address, based on the join request message.

A forwarding address is an address to which a multicast-capable router forwards a multicast packet. A sending address is an address to which the source terminal transmits a multicast packet. A source terminal address is the address of the source terminal. A multicast group address is an address indicating a multicast group.

A communication method of the present invention registers, in the forwarding destination holder for holding a forwarding address, the address of another multicast-capable router as a forwarding address, while associating the forwarding address with a source terminal address and a multicast group address, and transmits, to the source terminal address, a join request message which requests the addition of the address of a multicast-capable router to a sending address. Then, the source terminal registers, in the sending destination holder for holding a destination address, the address of the multicast-capable router as the sending address based on the join request message.

According to such communication system and method, the multicast-capable router can hold the address of another multicast-capable router as a forwarding address. The source terminal can hold the address of the multicast-capable router as a sending address. Hence, an appropriate multicast tree, where a multicast packet is forwarded from the source terminal to a destination terminal via the multicast-capable router, is set.

Accordingly, a multicast-incapable router existing between the source terminal and the multicast-capable router and between the multicast-capable routers is only required to forward a multicast packet by unicast. In this manner, the communication system can set an appropriate multicast tree and forward a multicast packet even if there exits a multicast-incapable router.

Note that in this manner a part of routers forward a multicast packet by unicast in the present invention. Therefore, a protocol of multicast to be realized by the present invention is specially called a unicast extension multicast protocol (hereinafter, referred to as "UMP") in order to be distinguished from a normal multicast protocol. Moreover, a router which corresponds to UMP is called a "UMP router" and a router which does not correspond to UMP is called a "non-UMP router".

BRIEF DESCRIPTION OF THE DRAWINGS

FIG. 2 is a block diagram showing the configuration of a UR according to the first embodiment of the present invention.

FIG. 3 is a view showing an entry holder of the UR according to the first embodiment of the present invention.

BEST MODES FOR CARRYING OUT THE INVENTION

First Embodiment

[Communication System]

Figure 1:
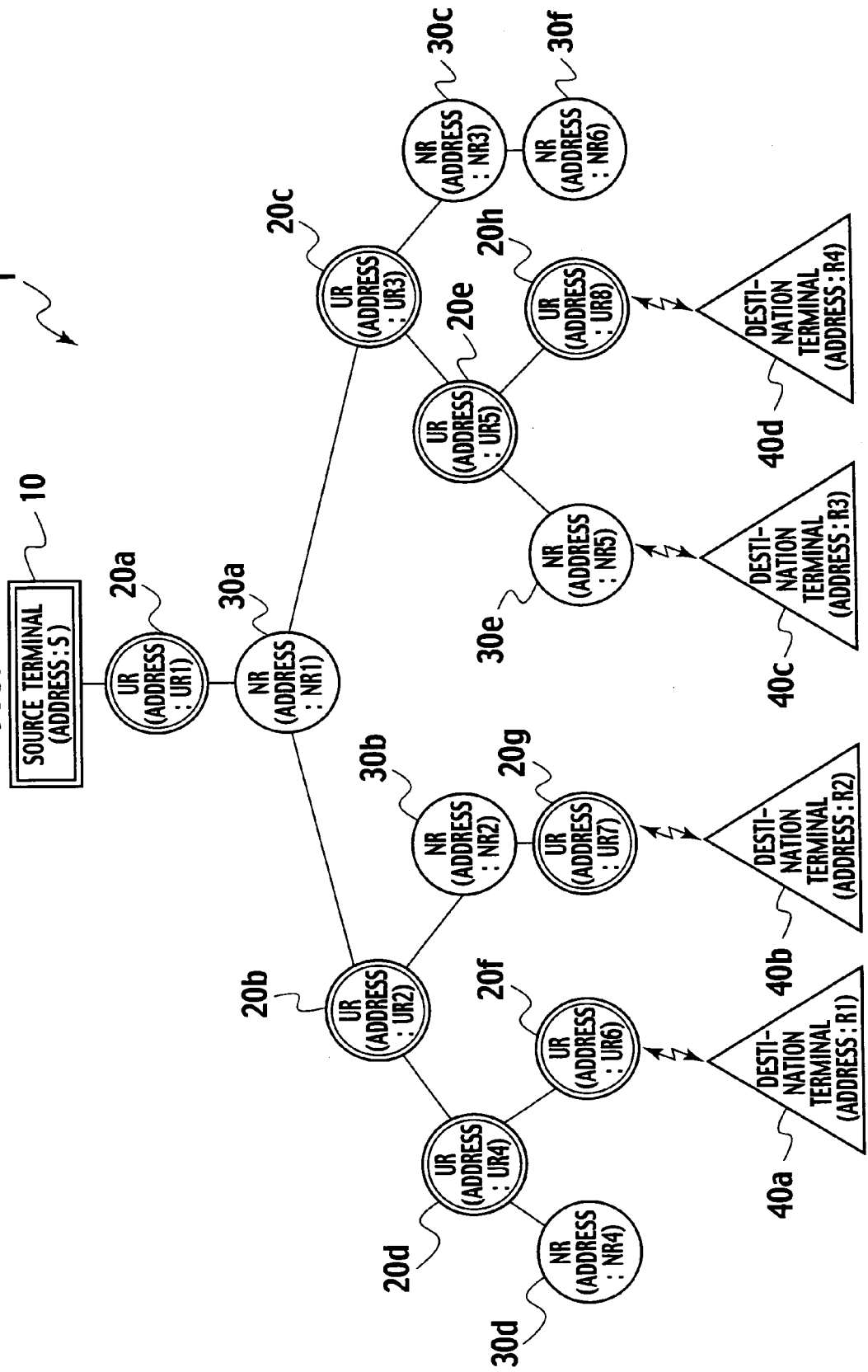
FIG. 1 is a view showing the configuration of a communication system according to a first embodiment of the present invention.

As shown in FIG. 1, a communication system 1 includes: a source terminal 10; a plurality of UMP routers (hereinafter, referred to as "UR") 20a to 20h; a plurality of non-UMP routers (hereinafter, referred to as "NR") 30a to 30f; and a plurality of destination terminals 40a to 40d. The source terminal 10, the URs 20a to 20h and the NRs 30a to 30f are hierarchically connected. In the communication system 1, the source terminal 10 is arranged most upstream, and the URs 20f to 20h and the NRs 30d to 30f are arranged most downstream.

A source terminal address "S" is added to the source terminal 10. Addresses "R1", "R2", "R3" and "R4" are added to the destination terminals 40a, 40b, 40c and 40d, respectively. Addresses "UR1", "UR2", "UR3", "UR4", "UR5", "UR6", "UR7" and "UR8" are added to the URs 20a, 20b, 20c, 20d, 20e, 20f, 20g and 20h, respectively. Addresses "NR1", "NR2", "NR3", "NR4" and "NR5" are added to the NRs 30a, 30b, 30c, 30d, 30e, 30f, and 30g, respectively. Note that although IPv6 is used in the communication system 1, IPv4 may be used instead.

The source terminal 10 forwards a multicast packet to sending addresses. The destination terminals 40a to 40d receive the multicast packets. The URs 20a to 20h and the NRs 30a to 30f forward the multicast packets to the forwarding addresses in accordance with the forwarding paths of the multicast packets (hereinafter, referred to as a "multicast tree"), the paths being set between the source terminal 10 and the destination terminals 40a to 40d.

The URs 20a to 20e can be branch routers for forwarding the multicast packets to a plurality of forwarding addresses. The destination terminals 40a to 40d, the URs 20f, 20g and 20h, and the NRs 30d, 30e and 30f perform radio communications. The source terminal 10, the URs 20a to 20h, and the destination terminals 40a to 40d set a multicast tree.

(Configuration of UR)

Initially, a description will be given of an example of the UR 20a with regard to the configuration of the UR. As shown in FIG. 2, the UR 20a includes an entry holder 21a, a receiver 22, a forwarder 23, a forwarding controller 24, a message processor 25 and a message provider 26. Note that the URs 20b to 20h have the same configurations as that of the UR 20a.

The receiver 22 receives multicast packets and control messages from the source terminal 1, other URs and NRs, and the destination terminals 40a to 40d. The multicast packet contains data from the source terminal 10. Furthermore, the multicast packet is forwarded between the source terminal and the UR and between the URs by being encapsulated. The control message is a message relating to a control over a multicast tree, such as the setting, maintenance and change of the multicast tree.

The control message includes a Join message, a Membership Report, a Join message in which a Stable option is set (hereinafter, referred to as a "Stable Join message"), a Membership Report in which a Stable option is set (hereinafter, referred to as a "Stable Membership Report"), a Prune message, a Leave Group message, a Redirect message, a Binding Update message (hereinafter, referred to as a "BU message"), and a. Location Update message (hereinafter, referred to as an "LU message"). Special options which indicate to be a control message are set in the headers of a Join message, a Stable Join message, a Prune message and a Redirect message.

A Join message and a Membership Report are join request messages which request the addition of an address to sending addresses where the source terminal 10 transmits a multicast packet and to forwarding addresses where the URs 20a to 20h forward the multicast packets. That is, the join request message is a control message which requests the source terminal 10 to transmit the multicast packet.

There are initial and stable states in a multicast tree. The multicast tree shifts from the initial state to the stable state. The multicast tree is judged to have shifted to the stable state when the number of newly joined destination terminals falls. When a multicast tree is already set for a given multicast packet, a Join message and a Membership Report serve as a maintenance request message which is transmitted in the initial state of the multicast tree to maintain the multicast tree. A Stable Join message and a Stable Membership Report are maintenance request messages for maintaining the multicast tree, which are transmitted after the multicast tree has shifted to the stable state.

A Prune message and a Leave Group message are leave request messages which request the leave from a multicast tree. The URs 20a to 20h and the destination terminals 40a to 40d transmit Join messages and Prune messages. The destination terminals 40a to 40d transmit Membership Reports and Leave Group messages.

A Redirect message is a join/leave request message which requests the addition of an address to the sending and forwarding addresses and the deletion of an address from the sending and forwarding addresses. A Redirect message includes a Join message and a Prune message. Specifically, a Redirect message includes an address which requests the addition to the forwarding and sending addresses, and an address which requests the deletion from the forwarding and sending addresses.

A BU message is a change notification message for notifying a sending address of a change in the source terminal address when the source terminal address is changed. An LU message is a location update message for notifying the destination terminal of a changed source terminal address when the source terminal address is changed. For example, when the source terminal address is changed due to the move of the source terminal 10 and the like, the LU message gives notification while the source terminal addresses before and after the change are associated with each other, thus notifying the destination terminals of the move. The source terminal may transmit the LU message alone or may forward the LU message while adding it to a multicast packet.

The receiver 22 judges whether or not what is transmitted is a control message or a multicast packet based on an option in the header. The receiver 22 inputs a control message into the message processor 25. The receiver 22 inputs a multicast packet into the forwarding controller 24. At this point, when the multicast packet is encapsulated, the receiver 22 decapsulates the packet, and inputs the derived multicast packet. Note that the receiver 22 inputs a packet whose destination is not the UR 20a itself, natively.

The forwarder 23 forwards control messages to the source terminal 10, other URs and NRs, and the destination terminals 40a to 40d. The forwarder 23 forwards multicast packets to other URs and NRs, and the destination terminals 40a to 40d. The forwarder 23 obtains a multicast packet from the receiver 22 and the forwarding controller 24. The forwarder 23 obtains a control message from the message processor 25 and the message provider 26.

The entry holder 21a is a forwarding destination holder for holding a forwarding address. As shown in FIG. 3, the entry holder 21a holds forwarding addresses, Keep Alive Timers (KAT), a Join Timer (JT), which are associated with the type of a table, a source terminal address, a multicast group address, a tunnel source address, and a previous tunnel source address.

There are a multicast control table (hereinafter, referred to as an "MCT") and a multicast forwarding table (hereinafter, referred to as an "MFT") in the types of tables. The MCT holds information used for setting a multicast tree. The MFT holds information used for the setting of the multicast tree and the forwarding of a multicast packet.

A source terminal address may be changed due to the move of the source terminal 10 and the like. Therefore, the entry holder 21a can hold the MCT and MFT entries of the current source terminal address in the current location of the source terminal 10, and the MCT and MFT entries of the source terminal address before the change.

It is possible to identify a multicast tree and a multicast packet, due to a combination of a source terminal address and a multicast group address, in terms of information on that the tree and the packet relates to which multicast group from which source terminal 10. A multicast group address "G" is added to a multicast group in which the source terminal 10 forwards a multicast packet.

The entry holder 21a holds a source terminal address and a multicast group address while associating them. An entry held by the entry holder 21a can be identified due to the combination of the source terminal address and the multicast group address. When the UR 20a joins a multicast tree which is discriminated due to the source terminal address "S" and the multicast group address "G", the entry holder 21a holds an entry relating to the multicast tree that the UR 20a joins.

A tunnel source address is a source address used for the encapsulation of a multicast packet received by the UR. Hence, for example, a tunnel source address registered in the entry holder 21a of the UR 20a becomes the source terminal address "S". A previous tunnel source address is a tunnel source address before the change when the tunnel source address is changed. A forwarding address is an address indicating a forwarding destination where the UR forwards a multicast packet.

A KAT is a timer value measuring holding times of a forwarding address and a sending address. The KAT is held while being associated with the forwarding address. The holding time is a time during which the source terminal 10 and the URs 20a to 20f keep holding the forwarding and sending addresses. In FIG. 3, the KAT (the UR 3) shows the KAT of the forwarding address "UR3", and the KAT (the UR 2) shows the KAT of the forwarding address "UR2". The forwarding addresses where the KAT is expired is deleted from the entry holder 21a.

A JT is a timer value measuring a time till the start of the transmission of a Join message. The Join message is transmitted by the expiration of the JT. As long as the KAT of an MFT entry is not expired, the JT is reactivated upon the expiration of the JT. The JT is held while being associated with the source terminal address and the multicast group address. When the type of a table is an MCT, there is no need to hold a tunnel source address, a previous tunnel source address and a JT.

The forwarding controller 24 controls the forwarding of a multicast packet based on the forwarding address. Specifically, the forwarding controller 24 obtains a multicast packet from the receiver 22. The forwarding controller 24 searches the entry holder 21a, and obtains the forwarding address associated with the source terminal address and the multicast group address which are included in the obtained multicast packet.

When the entry holder 21a holds a plurality of forwarding addresses, the UR 20a becomes a replication point of a multicast packet. Therefore, the forwarding controller 24 refers to the entry holder 21a, and replicates a multicast packet to make the same number of copies of the multicast packet as that of the forwarding addresses. The forwarding controller 24 needs not to make a replication when the number of the forwarding address is one.

The forwarding controller 24 compares the destination address of a decapsulated multicast packet with the forwarding address held by the entry holder 21a. When the destination address is different from the forwarding address, a multicast packet is encapsulated with the forwarding address. Specifically, the forwarding controller 24 sets the forwarding address obtained from the entry holder 21a as a destination address, and sets the address of the UR 20a itself as a source address, and encapsulates a multicast packet. The forwarding controller 24 inputs the encapsulated multicast packet into the forwarder 23. The forwarding controller 24 can encapsulate a multicast packet by use of an encapsulation technology shown in "IP in IP Tunneling" (RFC1853) and "Generic Packet Tunneling in Ipv6 Specification" (RFC2473), for example.

On the other hand, the forwarding controller 24 compares the destination address of the decapsulated multicast packet with the forwarding address held by the entry holder 21a. When the destination address and the forwarding address are the same, the forwarding controller 24 inputs the multicast packet into the forwarder 23 natively.

The message processor 25 processes a control message. The message processor 25 functions as a forwarding destination register for registering the address of another multicast-capable router (UR) in the forwarding destination holder as a forwarding address, while associating the address of another multicast-capable router with the source terminal address and the multicast group address. The message processor 25 obtains a control message which the UR 20a has received from the receiver 22. The message processor 25 performs the register of information in the entry holder 21a and the update and deletion of the information held by the entry holder 21a, based on the type of the control message, the destination and source addresses of the control message, and the information held by the entry holder 21a.

The message processor 25 generates an MFT or MCT entry, when registering a new forwarding address. Specifically, the message processor 25 sets an MFT or an MCT for each type of tables of the entry holder 21a, and generates the MFT or MCT entry for each of the source terminal and the multicast group address. For example, the message processor 25 generates an MFT or MCT entry for each of the source terminal address and the multicast group address, the addresses being designated by a Join message newly received by the UR 20a. The MFT or MCT entry generated in this manner functions as an MFT or an MCT.

The message processor 25 registers the generated MFT entry while associating the entry with the source terminal address, the multicast group address, the tunnel source address, the previous tunnel source address, the forwarding address, the KAT and the JT. The message processor 25 registers the generated MCT entry while associating the entry with the source terminal address, the multicast group address, a forwarding address and the KAT. The message processor 25 inputs a received control message into the message provider 26.

The message provider 26 generates a control message, and provides the control message for the source terminal 10 and other URs. The message provider 26 functions as a router message provider for providing the source terminal address with a join request message which requests the addition of the address of a multicast-capable router to the sending address.

The message provider 26 obtains a control message which the UR 20a has received from the message processor 25. The message provider 26 generates a control message based on the obtained control message and the information held by the entry holder 21a. The message provider 26 inputs the generated control message into the forwarder 23, and provides the control message for the source terminal 10 and other URs via the forwarder 23.

(Configuration of Source Terminal)

Figures 4, 5:
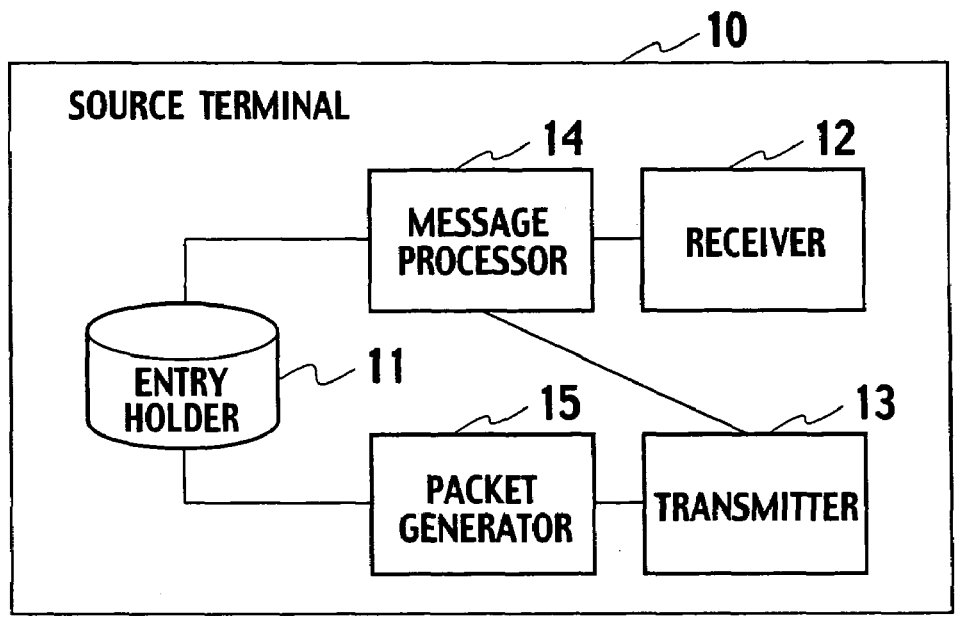
FIG. 4 is a block diagram showing the configuration of a source terminal according to the first embodiment of the present invention.
FIG. 5 is a view showing an entry holder of the source terminal according to the first embodiment of the present invention.

Next, a description will be given of the configuration of the source terminal 10. As shown in FIG. 4, the source terminal 10 includes an entry holder 11, a receiver 12, a transmitter 13, a message processor 14 and a packet generator 15.

The receiver 12 receives control messages from the URs 20*a* to 20*h*. The receiver 12 inputs the received control messages into the message processor 14.

The entry holder 11 is a sending destination holder for holding a sending address. As shown in FIG. 5, the entry holder 11 holds a sending address and a KAT while associating them with the type of a table, the source terminal address and the multicast group address. The source terminal 10 sets an "MFT" for the type of a table, since the source terminal 10 does not use tables other than the MFT. A sending address is an address to which the source terminal 10 transmits a multicast packet. The sending address held by the source terminal 10 is the address of a multicast-capable router (a UR address) or the address of the destination terminal.

As in FIG. 3, the KAT (the UR1) shows the KAT of the sending address "UR1". There is a case where the source terminal address is changed due to the move of the source terminal 10 and the like. Accordingly, the entry holder 11 can hold the MFT entry of the current source terminal address in the current location of the source terminal 10 and the MFT entry of the source terminal before the change.

The message processor 14 processes a control message. The message processor 14 functions as a sending destination register for registering, in the sending destination holder, the address of a multicast-capable router (UR) as a sending address based on a join request message. The message processor 14 obtains a control message which the source terminal 10 has received, from the receiver 12. The message processor 14 performs the register of information in the entry holder 11, and the update and deletion of information held by the entry holder 11, based on the type of the control message, the source address of the control message and the information held by the entry holder 11.

The message processor 14 sets an MFT for each type of the tables of the entry holder 11, and generates an MFT entry for each of the source terminal address and the multicast group address. For example, the message processor 14 generates the MFT entry for each of the source terminal address and the multicast group address, the addresses being designated by Join and Redirect messages newly received by the source terminal 10. The message processor 14 registers the generated MFT entry while associating the entry with the source terminal address, the multicast group address, the sending address and the KAT.

The packet generator 15 generates a multicast packet including data. The packet generator 15 generates, if necessary, control messages such as a BU message and an LU message, and multicast packets to which the LU messages are added. The packet generator 15 generates the multicast packets based on a sending address. The packet generator 15 obtains the sending address from the entry holder 11. Furthermore, the packet generator 15 obtains the data by the input from an application section or an external input.

Initially, the packet generator 15 generates a multicast packet to which the source terminal address as a source address and the multicast group address as a destination address are added to data. The packet generator 15 refers to the entry holder 11, and replicates the generated multicast packet to make the same number of copies of the multicast packets as that of the sending addresses. Note that the packet generator 15 is not required to replicate a multicast packet when the number of the sending address is one.

The packet generator 15 sets the source terminal address as a source address, sets the sending address as a destination address, and encapsulates a multicast packet. The packet generator 15 inputs the encapsulated multicast packet into the transmitter 13.

The transmitter 13 transmits a multicast packet and a control message to the URs 20*a* to 20*h*, the NRs 30*a* to 30*f*, and the destination terminals 40*a* to 40*d*. The transmitter 13 obtains the encapsulated multicast packet from the packet generator 15, and obtains the control message from the message processor 14.

[Communication Method]

Next, a description will be given of the operations of the communication system 1 with reference to FIGS. 6 to 21.

(Operational Procedures of UR)

Figure 6:
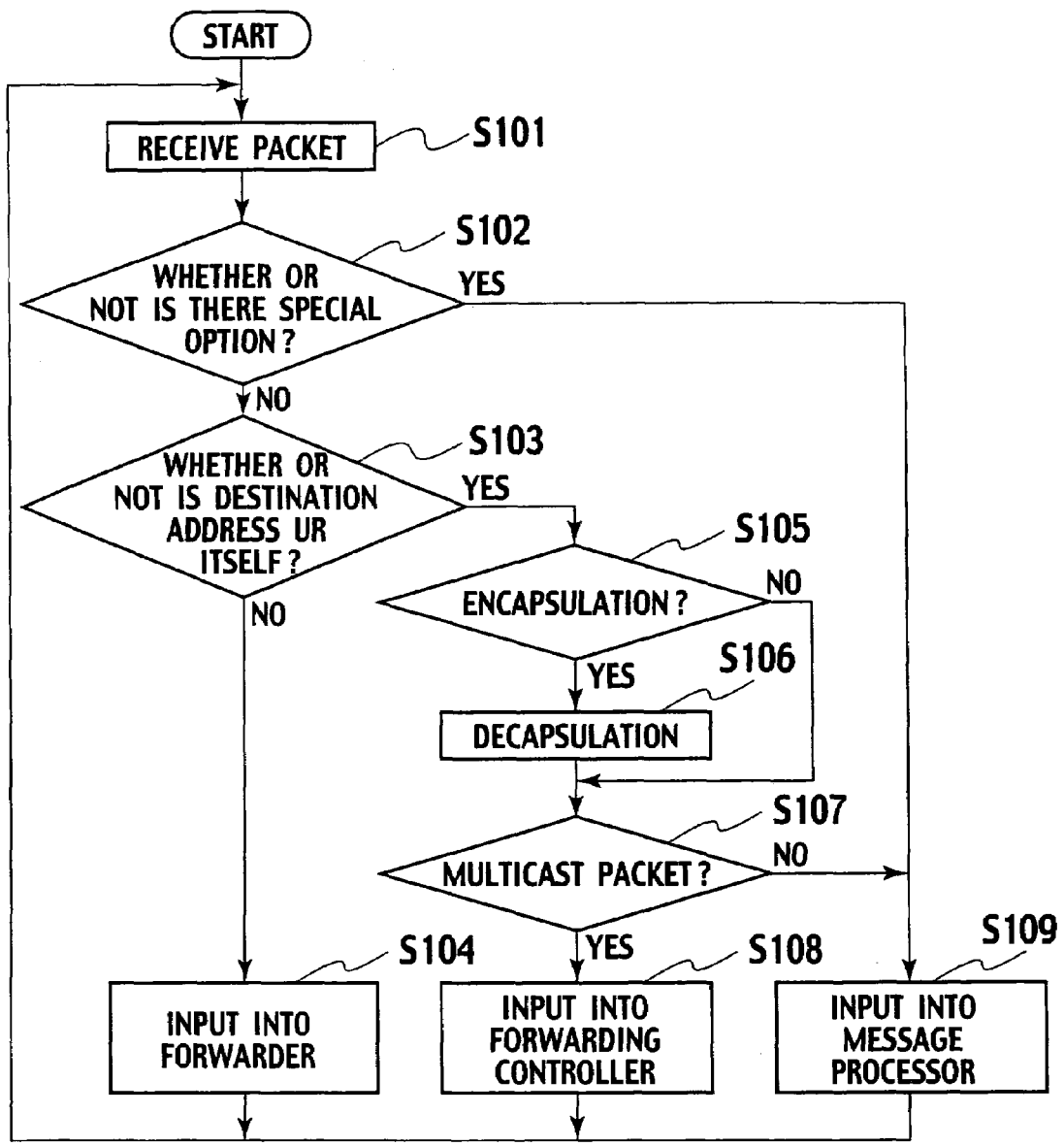
FIG. 6 is a flowchart showing the operational procedures of when a packet is received by the UR according to the first embodiment of the present invention.

A description will be given of the operational procedures of the URs 20*a* to 20*h* with reference to FIGS. 6 to 9. Initially, FIG. 6 shows the operational procedures of when a packet is received. The receivers 22 of the URs 20*a* to 20*h* receive packets from neighboring URs or NRs (S101). The receivers 22 judge whether or not special options are set in the received packets (S102).

It is possible to use a Hop-by-Hop option for a special option stipulated in RFC2460 when using IPv6. When using IPv4, it is possible to use a Router Alert option stipulated in RFC 2113. For this reason, the URs 20*a* to 20*h* can notify other URs and the source terminal 10 that the packets are special control messages. Moreover, even when the options cannot be interpreted as the special options, it is possible to add data which commands not to discard the messages, the data being options starting with "00" in the beginnings of the option type, for example, in the case of the Hop-by-Hop options. Therefore, even if routers which cannot interpret the options, for example, the NRs, exist on the middles of paths, the messages are not discarded and the URs 20*a* to 20*h* and the source terminal 10 can receive the control messages. In addition, there are a router alert option stipulated in RFC2711, and the like.

In Step (S102), when the special options are not set, the receivers 22 judge whether or not the destination addresses of the packets are the addresses of the UR themselves (S103). On the other hand, in Step (S102), in the case of control messages in which the special options are set, the receivers 22 input the control messages into the message processors 25 (S108).

In Step (S103), when the destination addresses of the packets are not the addresses of the UR themselves, the receivers 22 input the packets in the forwarders 23 (S104). On the other hand, in Step (S103), when the destination addresses of the packets are the addresses of the UR themselves, the receivers 22 judge whether or not the packets are encapsulated (S105). When the packets are encapsulated, the receivers 22 decapsulate and derive the packets (S106).

Next, the receivers 22 judge whether the received packets themselves or the derived packets due to the decapsulation are multicast packets or control messages (S107). In Step (S107), when the packets are multicast packets, the receivers 22 input the multicast packets into the forwarding controllers 24 (S108). On the other hand, in Step (S107), when the packets are judged to be control messages, the receivers 22 input the control messages into the message processors 25 (S109). The URs 20*a* to 20*h* repeat the procedures shown in FIG. 6 whenever receiving packets.

Figure 7:
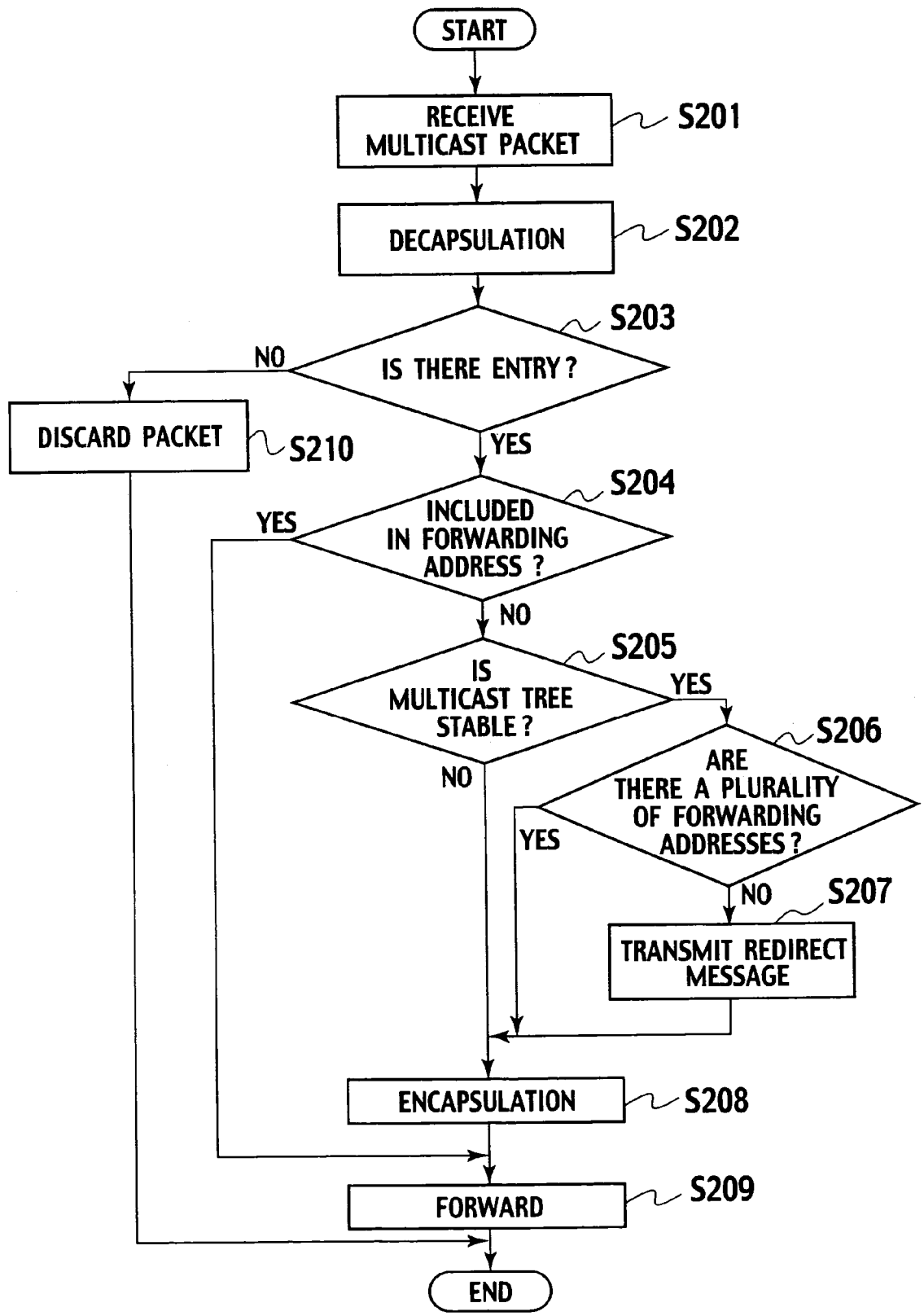
FIG. 7 is a flowchart showing the processing procedures of a multicast packet performed by the UR according to the first embodiment of the present invention.

Next, FIG. 7 shows the processing procedures of when the UR 20*a* receives a multicast packet. The receiver 22 receives a multicast packet (S201). The receiver 22 decapsulates an encapsulated multicast packet. The receiver 22 inputs the derived multicast packet and a source address set in the encapsulated multicast packet into the forwarding controller 24. The forwarding controller 24 sets the source address of the encapsulated multicast packet as the tunnel source address of the entry holder 21a (S202).

Note that when the tunnel source address is different from an already set tunnel source address in Step (S202), the forwarding controller 24 may set the already set tunnel source address as the previous tunnel source address of the entry holder 21a. According to this, when the receiver 22 thereafter receives multicast packets from the previous tunnel source address, it is possible to prevent the redundant receipt of multicast packets by causing the message provider 26 to explicitly transmit a Prune message to the previous tunnel source address. The forwarding controller 24 searches the entry holder 21a, and judges whether or not there exists an entry including the source terminal address "S" and the multicast group address "G", which addresses are included in the multicast packet having been obtained from the receiver 22 (S203).

When there exists the entry, the forwarding controller 24 judges whether or not the destination address of the multicast packet is included in the forwarding address of the entry (S204). When the destination address is not included in the forwarding address, the forwarding controller 24 judges whether or not a multicast tree identified with the source terminal address "S" and the multicast group address "G", which addresses are included in the multicast packet, is stable (S205).

When the multicast tree is stable, the forwarding controller 24 judges whether or not a plurality of forwarding addresses exist in the entry including the source terminal address "S" and the multicast group address "G", which addresses are of the entry holder 21a (S206). When the plurality of forwarding addresses do not exist, the forwarding controller 24 commands the message provider 26 to generate a Redirect message. The message provider 26 generates a Redirect message for the tunnel source address of the multicast packet, and the transmitter 23 transmits the Redirect message (S207). The Redirect message includes a Prune message which requests the leave of the UR itself which has received the multicast packet and a Join message which requests the join of the forwarding address which the UR holds in the entry holder 21a.

On the other hand, when the multicast tree is not stable in Step (S205), and when there exist the plurality of forwarding addresses in Step (S206), the forwarding controller 24 encapsulates the multicast packet with the forwarding addresses (S208). At this point, the forwarding controller 24 replicates the multicast packet to make the same number of its copies as that of the forwarding addresses, and encapsulates each of the multicast packets by use of the forwarding addresses. The forwarding controller 24 inputs the encapsulated multicast packets into the forwarder 23. Then, the forwarder 23 forwards the multicast packets based on their destination addresses (S209).

On the other hand, in Step (S204), when the destination address is included in the forwarding addresses, the forwarding controller 24 inputs the received multicast packet into the forwarder 23 natively. Then, the forwarder 23 forwards the received multicast packet natively, based on the destination address (S209). In this manner, the forwarding controller 24 controls the forwarding of the multicast packet based on the forwarding addresses by encapsulating the multicast packet by use of the forwarding addresses, and the like. On the other hand, when the entry does not exist in Step (S203), the forwarding controller 24 discards the obtained multicast packet (S210).

Figure 8:
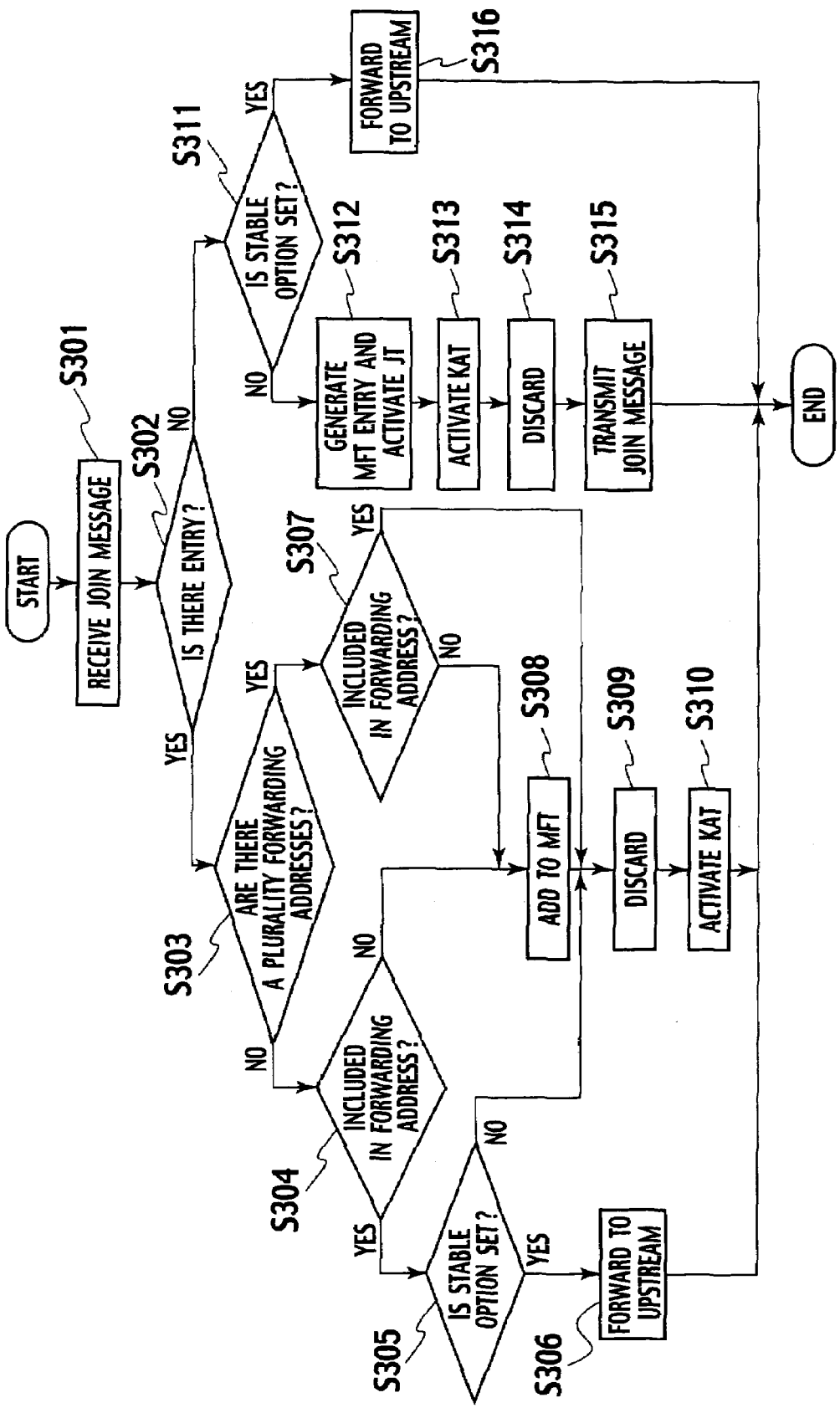
FIG. 8 is a flowchart showing the processing procedures of a Join message performed by the UR according to the first embodiment of the present invention.
Figure 9:
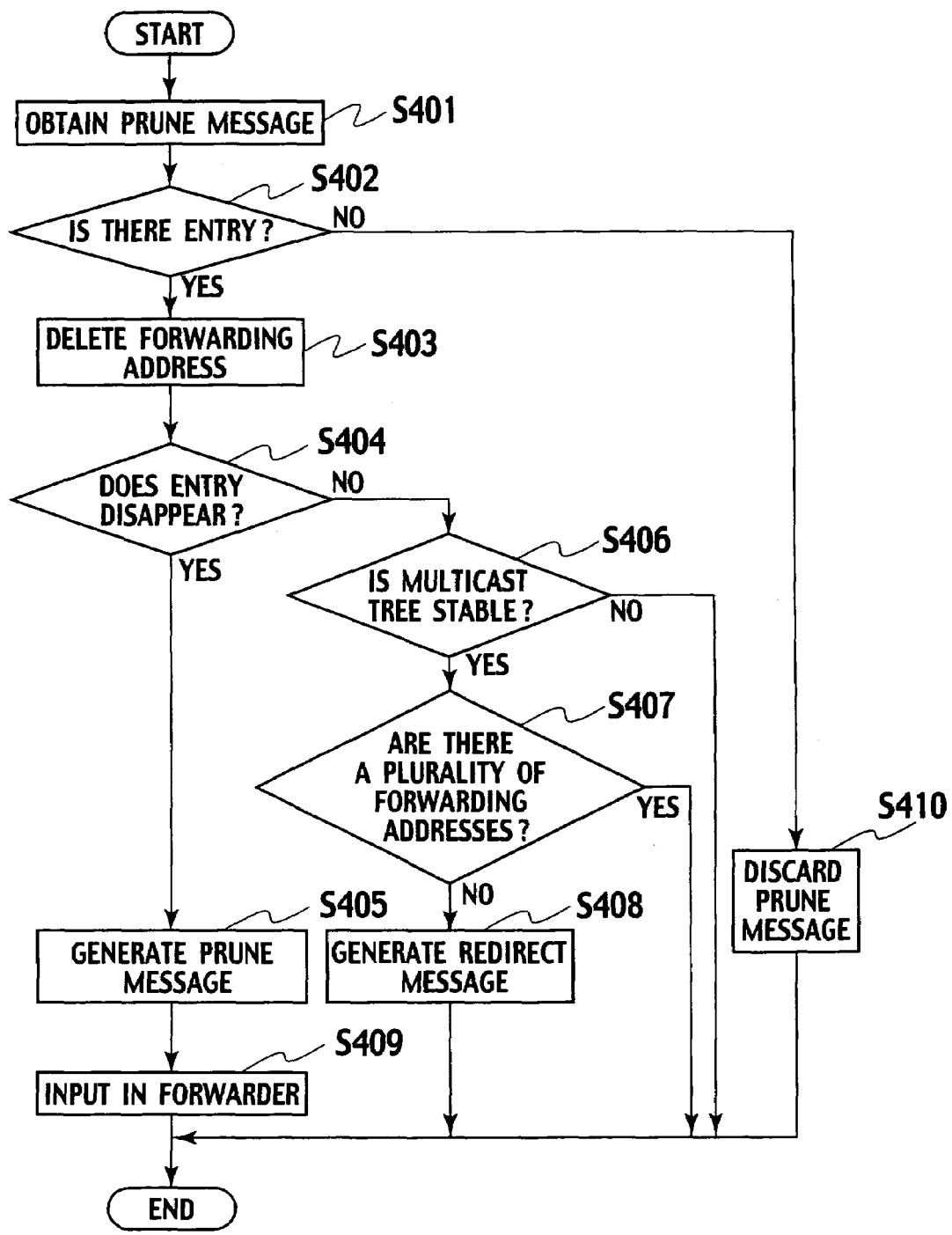
FIG. 9 is a flowchart showing the processing procedures of a Prune message performed by the UR according to the first embodiment of the present invention.

Next, FIGS. 8 and 9 show the processing procedures of when the URs 20a to 20h receive control messages. Initially, FIG. 8 shows a case where the control messages are Join messages. The receivers 22 receive Join messages, and input the messages into the message processors 25 (S301). The message processors 25 search the entry holders 21a, and judge whether or not there exist entries including the source terminal addresses "S" and the multicast group addresses "G", which are included in the obtained Join messages (S302). When the entries exist, the message processors 25 judge whether or not a plurality of forwarding addresses exist in the entries including the source terminal addresses "S" and the multicast group addresses "G" in the entry holders 21a (S303).

When having judged that the plurality of forwarding addresses do not exist, the message processors 25 judge whether or not the source addresses of the Join messages are included in the forwarding addresses (S304). When having judged that the source addresses are included, the message processors 25 judge whether or not the received Join messages are Stable Join messages in which Stable options are set (S305). When having judged that the Stable options are set, the message processors 25 input the received Join messages into the forwarders 23. The forwarders 23 forward the received Join messages upstream natively (S306).

On the other hand, when having judged that the source addresses of the Join messages are not included in the forwarding addresses of the MFT entries in (S304), the message processors 25 add the source addresses to the forwarding addresses of the MFT entries held by the entry holders 21a (S308). Then, the message processors 25 discard the Join messages (S309). Furthermore, the message processors 25 activate the KATs relating to the forwarding addresses added to the entry holders 21a (S310).

On the other hand, when having judged that there exist the plurality of forwarding addresses in Step (S303), the message processors 25 judge whether or not the source addresses of the Join messages are included in the forwarding addresses (S307). When having judged that the forwarding addresses are included, the message processors 25 perform the processing of Steps (S309) and (S310). When having judged that the forwarding addresses are not included, the message processors 25 perform the processing of Steps (S308) to (S310).

Additionally, when the entries do not exist in the entry holders 21a in Step (S302), the message processors 25 judge whether or not the received Join messages are Stable Join messages in which Stable options are set (S311). When having judged that the Stable options are not set, the message processors 25 newly generate MFT entries associating the source addresses of the Join messages with the source terminal addresses "S" and the multicast group addresses "G", which are included in the Join messages, as forwarding addresses. The message processors 25 register the generated MFT entries in the entry holders 21a. Subsequently, the message processors 25 activate the JTs of the registered forwarding addresses (S312). Moreover, the message processors 25 activate the KATs of the registered forwarding addresses (S313).

Then, the message processors 25 discard the Join messages (S314). In addition, the message processors 25 command the message providers 26 to generate a Join message. The message providers 26 set the addresses of the URs themselves as source addresses, and generate Join messages in which the source terminal addresses are set as destination addresses.

Then, the message providers 26 input the generated Join messages into the forwarders 23, and the forwarders 23 transmit the Join messages (S315).

On the other hand, when the multicast tree is judged to be stable in Step (S311), the message processors 25 input the received Join messages natively into the forwarders 23. The forwarders 23 forward the Join messages upstream natively based on the source terminal addresses included in the Join messages (S316).

In this manner, the message processors 25 register, in the entry holders 21a, the forwarding addresses associated with the source terminal addresses "S" and the multicast group addresses "G", based on the Join messages which the URs have received.

Furthermore, the message providers 26 provide the source terminal address with Join messages (join request messages) which request the addition of the addresses of the URs to the sending address of the source terminal 10. The Join messages are generated by the URs in response to, for example, the sending requests of the multicast packets from the destination terminals 40a to 40d and the like, that is, the Join messages which request the join to the multicast tree, and are transmitted to the source terminal 10 arranged upstream. Moreover, in this manner, the URs transmit the Join messages in which the addresses of the URs themselves are set as source addresses, and other URs register the forwarding addresses in the entry holders 21a based on the Join messages. Therefore, the message processors 25 can register the addresses of other URs as the forwarding addresses in the entry holders 21a.

Next, FIG. 9 shows a case where the control messages are Prune messages. The message processors 25 obtain the Prune messages from the receivers 22 (S401). The message processors 25 search the entry holders 21a, and judge whether or not there exist the entries including the source terminal addresses "S", the multicast group addresses "G" and the forwarding addresses, which are included in the obtained Prune messages (S402).

When there exist the entries, the message processors 25 delete the forwarding addresses included in the Prune messages from the entries (S403). On the other hand, when the entries do not exist, the message processors 25d is card the Prune messages (S410). As a result of the deletion of the forwarding addresses in Step (S403), the message processors 25 judge whether or not the entries are to disappear (S404). The entries disappear when the number of the forwarding addresses becomes zero.

When the entries disappear, the message processors 25 command the message providers 26 to generate a Prune message. The message providers 26 set the addresses of the URs themselves as the source addresses, thus generating the Prune messages in which the source terminal address is set as a destination address (S405). The message providers 26 input the generated Prune messages into the forwarders 23 (S409). In this manner, the Prune messages are transmitted to the source terminal 10 in order that the URs explicitly leave the multicast tree.

On the other hand, when the entries do not disappear in Step (S404), the message processors 25 judge whether or not the multicast tree identified with the source terminal address "S" and the multicast group address "G", the addresses being included in the Prune messages, is stable (S406). When the multicast tree is stable, the message processors 25 judge whether or not a plurality of forwarding addresses exist in the entries including the source terminal addresses "S" and the multicast group addresses "G" (S407).

When the plurality of forwarding addresses do not exist, that is, when the number of forwarding address is one, the message processors 25 judge that the URs themselves are no longer the replication points to replicate multicast packets received by the URs. The message processors 25 command the message providers 26 to generate a Redirect message. The message providers 26 generate the Redirect messages (S408). The message providers 26 set the addresses of the URs themselves as the source addresses. The message providers 26 delete the URs themselves from the forwarding addresses or the sending addresses, and generate the Redirect messages which request the addition of the forwarding addresses remaining in the entries to the forwarding or sending addresses.

In this manner, in a case where the URs receive, from the destination terminals 40a to 40d or other URs, messages which request the leave from the multicast tree when the multicast tree is stable, a Redirect message can be used as a change request message which commands the URs which are located more upstream than the URs themselves and the source terminal 10 to change information held by the entry holders 11 and 21a.

The forwarders 23 forward the Prune and Redirect messages based on the source terminal address included in the Prune and Redirect messages. Note that when the multicast tree is not stable in Step (S406), and when the plurality of forwarding addresses exist in Step (S407), the message processors 25 finish the processing.

(Setting of Multicast Tree, Forwarding of Multicast Packet)

Figure 10:
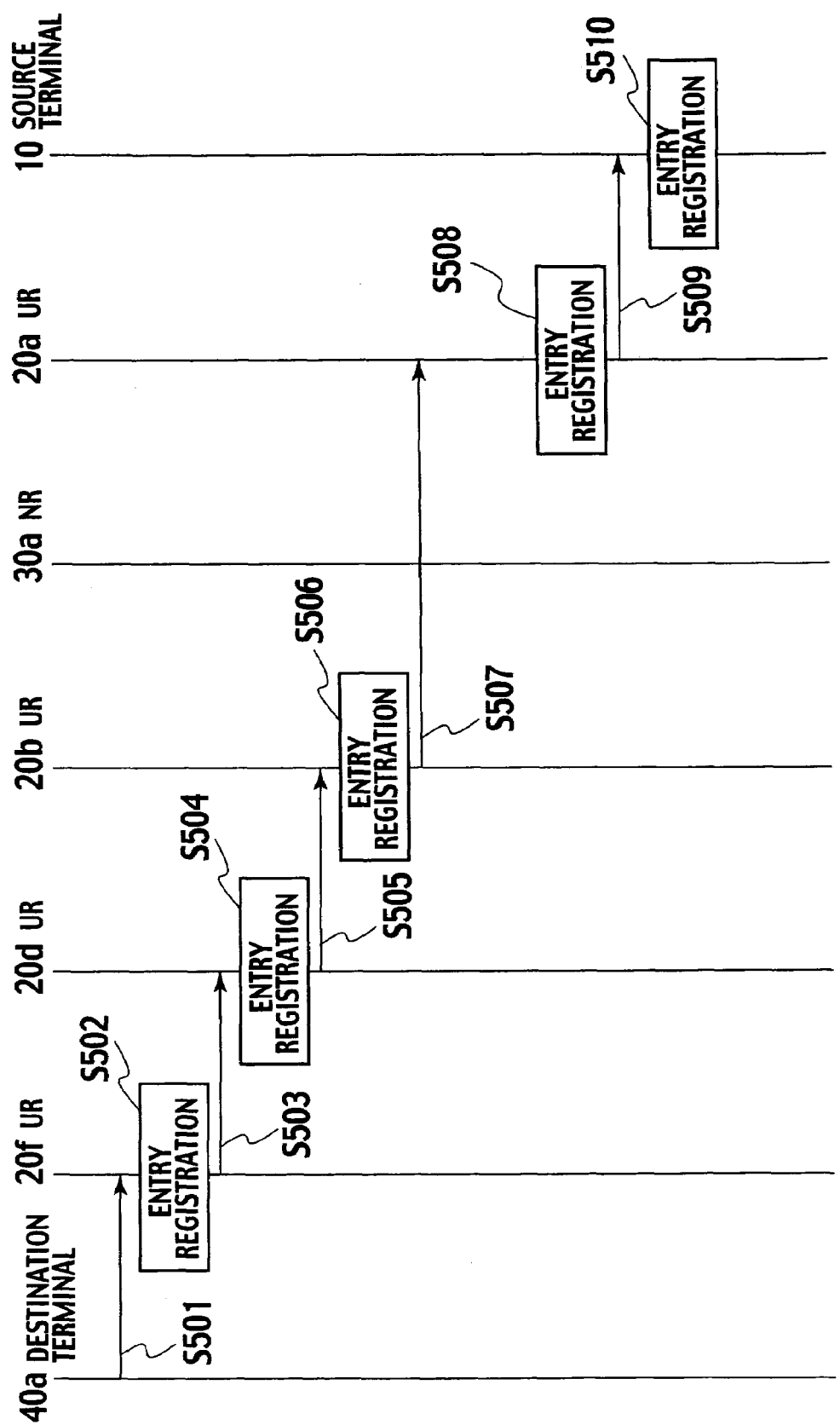
FIG. 10 is a sequence diagram showing the procedures of when the transmission of the multicast packet is requested by a destination terminal according to the first embodiment of the present invention.

Next, a description will be given of the setting of a multicast tree and the forwarding of a multicast packet with reference to FIGS. 10 to 21. Initially, a description will be given of the operations of the communication system 1 of when a multicast tree is set by a fact that the destination terminal 40a requests the source terminal 10 to transmit a multicast packet, with reference to FIGS. 10 and 11. FIG. 10 shows the procedures and FIG. 11 shows the state of the communication system 1.

In a description below, both of entry holders 21a to 21h included in the URs 20a to 20h and the entry holder 11 included in the source terminal 10 are described wherever necessary. However, to simplify the description, only the type of a table, a source terminal address, a multicast group address, and a forwarding address or a sending address are shown among information held by the entry holders 11 and 21a to 21h.

Specifically, a source terminal address, a multicast group address, and a forwarding address or a sending address are described in a manner of (a source terminal address, a multicast group address): [a forwarding address or a sending address]. It is possible to identify that a multicast tree and a multicast packet relate to which multicast group from which source terminal due to (a source terminal address, a multicast group address). In addition, the description will be given, assuming the source terminal 10 to be most upstream.

Figure 11:
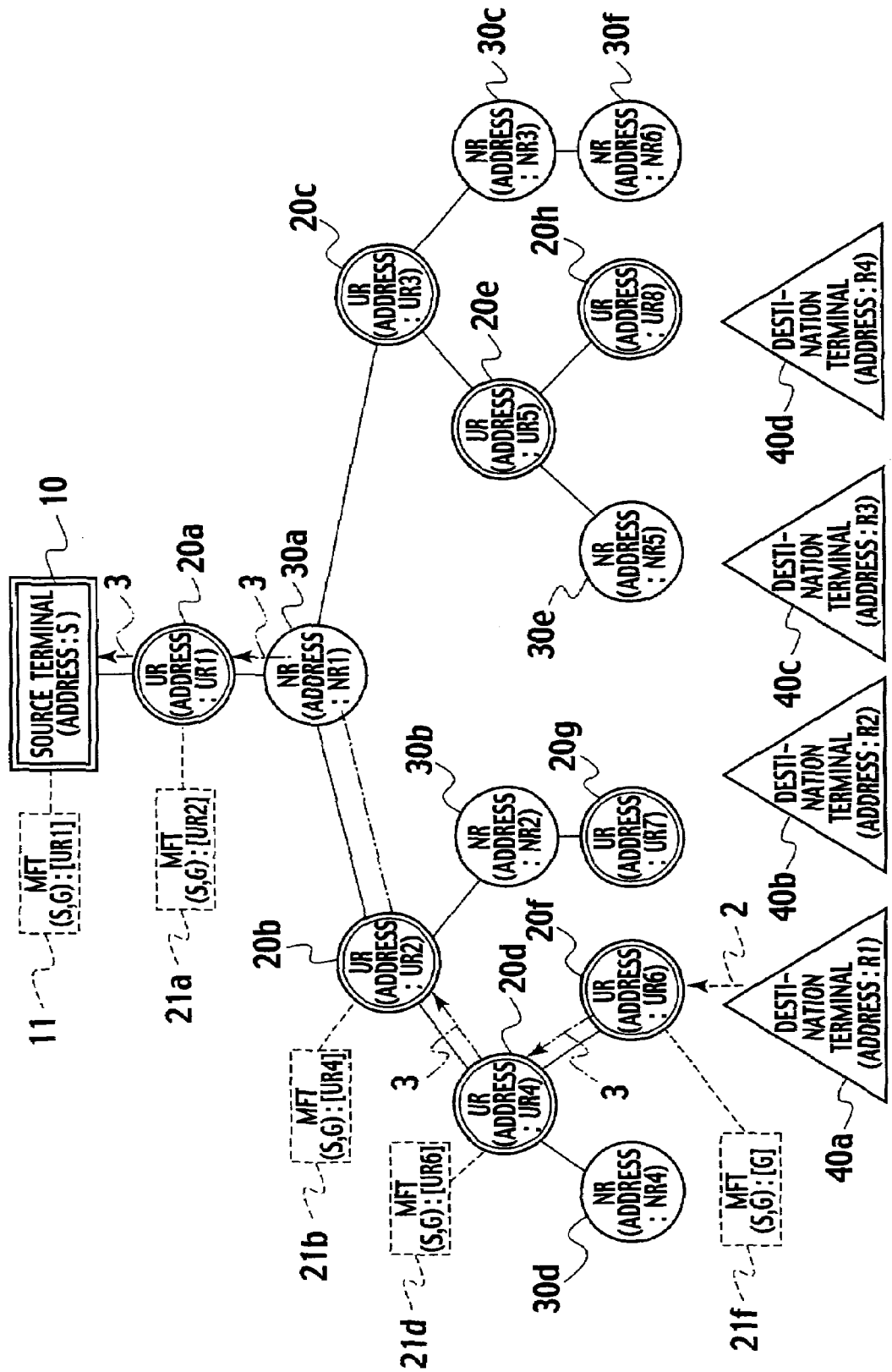
FIG. 11 is a view showing the communication system of when the transmission of the multicast packet is requested by the destination terminal according to the first embodiment of the present invention.

As shown in FIGS. 10 and 11, the destination terminal 40a transmits a join request message to the UR 20f (S501). When a router to which the destination terminal 40a connects via a radio link is a UR, the destination terminal 40a can request the transmission of a multicast packet in accordance with the Internet Management Protocol Version 2 (IGMPv2) and the Multicast Listener Discovery Version 2 (MLDv2) (refer to "draft-vida-mld-v2-xx.txt"), thus requesting to join a multicast tree. Specifically, the destination terminal 40a transmits a Membership Report 2 to the UR 20f. Note that although the destination terminal 40a follows the MLDv2 in a case where IPv6 is used, the Membership Report 2 is transmitted in accordance with the IGMPv3 in a case where IPv4 is used.

The message processor 25 of the UR 20f generates an MFT entry associated with a source terminal address "S", a multicast group address "G" and a forwarding address "G", based on the source terminal address "S", the multicast group address "G", both of the addresses being set in the Membership Report 2. This MFT entry shows the existence of the destination terminal 40a which desires to receive a multicast packet identified with a combination of the source terminal "S" and the multicast group address "G" under the control of the UR 20f itself. In other words, when the forwarding address is the multicast group address "G", the destination terminal 40a which desires to receive the multicast packet identified with (S, G) shows to be connected to the UR 20f. Hence, when the destination address is the multicast group address "G", it is sufficient if the forwarder 23 of the UR 20f transmits the multicast packet decapsulated by the forwarding controller 24, to the destination terminal 40a connected to the UR 20f itself. The message processor 25 registers the generated MFT entry in the entry holder 21f (S502).

The message provider 26 of the UR 20f generates a Join message 3 which requests the addition of the address of the UR 20f to the sending address of the source terminal 10, and provides the message to the source terminal address via the forwarder 23 (S503). Specifically, the message provider 26 sets the source terminal address "S" as a destination address and the address "UR6" of the UR 20f as a source address, and generates the Join message 3 which designates the multicast group address "G". The URs existing more upstream than the UR20f and the source terminal 10 can detect that the received packet is a Join message due to a special option set in the Join message 3. The forwarder 23 forwards the Join message 3 based on the source terminal address "S" set as a destination address.

The UR 20d, which is connected to the UR 20f and is located more upstream than the UR 20f, receives the Join message 3. The message processor 25 of the UR 20d generates an MFT entry associated with the source terminal address "S", the multicast address "G" and the forwarding address "UR6", based on the source terminal address "S", the multicast address "G" and the source address "UR6", the addresses being set in the Join message 3. The message processor 25 registers the generated MFT entry in the entry holder 21d (S504).

Moreover, the message provider 26 of the UR 20d sets the source terminal address "S" as a destination address and the address "UR4" of the UR 20d as a source address, generates a Join message 3 designating the multicast group address "G", and provides the message to the source terminal address via the forwarder 23 (S505).

The UR 20b, which is connected to the UR 20d and is located more upstream than the UR 20d, receives the Join message 3. The message processor 25 of the UR 20b generates an MFT entry associated with the source terminal address "S", the multicast address "G" and the forwarding address "UR4", based on the Join message 3. The message processor 25 registers the generated MFT entry in the entry holder 21b (S506).

Additionally, the message provider 26 of the UR 20b sets the source terminal address "S" as a destination address and the address "UR2" of the UR 20b as a source address, generates a Join message 3 designating the multicast group address "G", and provides the message to the source terminal address via the forwarder 23 (S507).

The NR 30a existing between the UR 20b and the UR 20a located upstream of the UR 20b forwards the Join message 3 by unicast based on the source terminal address "S" set as a sending address.

The UR 20a located upstream of the UR 20b receives the Join message 3. The message processor 25 of the UR 20a generates an MFT entry associated with the source terminal "S", the multicast address "G" and the forwarding address "UR2", based on the Join message 3. The message processor 25 registers the generated MFT entry in the entry holder 21a (S508).

Furthermore, the message provider 26 of the UR 20a sets the source terminal address "S" as a destination address and the address "UR1" of the UR 20a as a source address, generates a Join message 3 designating the multicast group address "G", and provides the message to the source terminal address via the forwarder 23 (S509).

The message processor 14 of the source terminal 10 generates an MFT entry associated with the source terminal address "S", the multicast address "G" and the sending address "UR1", based on the source terminal address "S", the multicast address "G" and the source address "UR1", the addresses being set in the Join message 3. The message processor 14 registers the generated MFT entry in the entry holder 11 (S510). In this manner, the message processor 14 registers, in the entry holder 11, the address "UR1" of the UR 20a located most upstream when the source terminal address "S" is assumed to be upstream in the multicast tree.

By the above-mentioned procedures, as shown in FIG. 11, the multicast tree, in which the multicast packet is forwarded to the destination terminal 40a via the source terminal 10, the URs 20a, 20b, 20d and 20f, is set.

Figure 12:
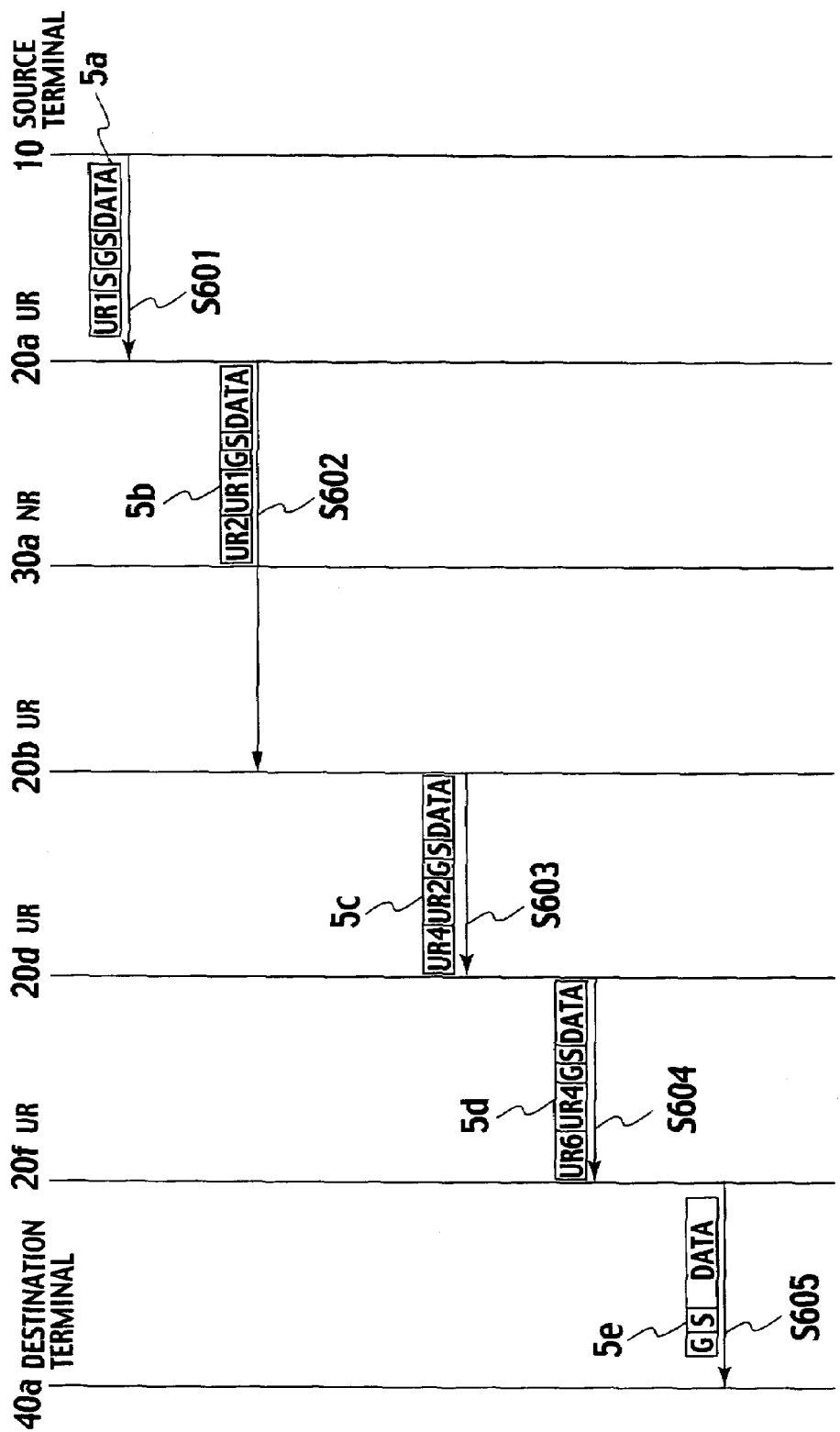
FIG. 12 is a sequence diagram showing the forwarding procedures of the multicast packet according to the first embodiment of the present invention.
Figure 13:
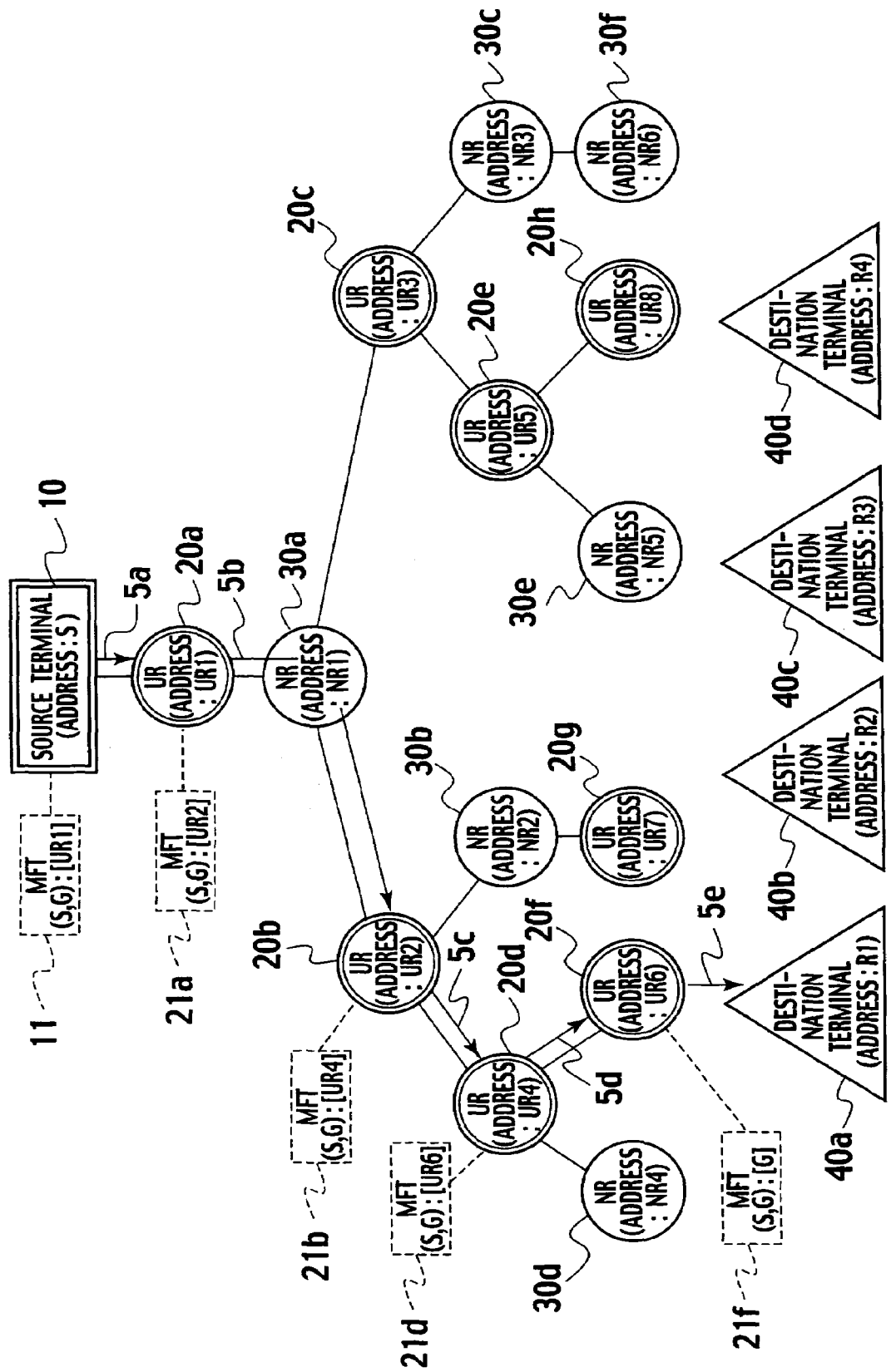
FIG. 13 is a view showing the forwarding of the multicast packet according to the first embodiment of the present invention.

Next, a description will be given of the operations of the communication system 1 of when forwarding a multicast packet in accordance with the multicast tree shown in FIG. 11, with reference to FIGS. 12 and 13. FIG. 12 shows the procedures and FIG. 13 shows the state of the communication system 1.

Initially, the packet generator 15 of the source terminal 10 refers to the entry holder 11, and generates a multicast packet by setting, in data, the source terminal address "S" as a source address and the multicast group address "G" as a destination address. Then, the packet generator 15 sets, in the generated multicast packet, the source terminal address "S" as a source address and the sending address "UR1" held by the entry holder 11 as a destination address, then encapsulating the multicast packet. Subsequently, the transmitter 13 of the source terminal 10 transmits the encapsulated multicast packet 5a to the UR 20a based on the destination address "UR1" (S601).

The receiver 22 of the UR 20a decapsulates the encapsulated multicast packet 5a. The receiver 22 inputs, into the forwarding controller 24, the derived multicast packet and the source address "S" set in the encapsulated multicast packet 5a. The forwarding controller 24 sets the source address "S" of the encapsulated multicast packet 5a as the tunnel source address of the entry holder 21a. The forwarding controller 24 of the UR 20a refers to the entry holder 21a. Since the forwarding address "UR2" is different from the destination address "G" of the decapsulated multicast packet, the forwarding controller 24 of the UR 20a sets the address "UR1" of the UR 20a itself as a source address and the forwarding address "UR2" as a destination address, then encapsulating the multicast packet. Then, the forwarder 23 forwards the encapsulated multicast packet 5b to the UR 20b based on the destination address "UR2" (S602).

Accordingly, the NR 30a existing on a path between the UR 20a and the UR 20b can forward the multicast packet by the processing of normal unicast based on the destination address "UR2", without being aware that the multicast packet 5a is a multicast packet.

The receiver 22 of the UR 20b decapsulates the encapsulated multicast packet 5b. The forwarding controller 24 of the UR 20b sets the source address "UR1" of the encapsulated multicast packet 5b as the tunnel source address of the entry holder 21b. The forwarding controller 24 of the UR 20b refers to the entry holder 21b. Since the forwarding address "UR4" is different from the destination address "G" of the decapsulated multicast packet, the forwarding controller 24 of the UR 20b sets the address "UR2" of the UR 20b itself as a source address and the forwarding address "UR4" as a destination address, then encapsulating the multicast packet. Subsequently, the forwarder 23 forwards the encapsulated multicast packet 5c to the UR 20d based on the destination address "UR4" (S603).

The receiver 22 of the UR 20d decapsulates the encapsulated multicast packet 5c. The forwarding controller 24 of the UR 20d sets the source address "UR2" of the encapsulated multicast packet 5c as the tunnel source address of the entry holder 21d. The forwarding controller 24 of the UR 20d refers to the entry holder 21d. Since the forwarding address "UR6" is different from the destination address "G" of the decapsulated multicast packet, the forwarding controller 24 of the UR 20d sets the address "UR4" of the UR 20d itself as a source address and the forwarding address "UR6" as a destination address, then encapsulating the multicast packet. Subsequently, the forwarder 23 forwards the encapsulated multicast packet 5d to the UR 20f based on its destination address "UR6" (S604).

The receiver 22 of the UR 20f decapsulates the encapsulated multicast packet 5d, and derives a multicast packet 5e. The forwarding controller 24 of the UR 20f sets the source address "UR4" of the encapsulated multicast packet 5d as the tunnel source address of the entry holder 21f. The forwarding controller 24 of the UR 20f refers to the entry holder 21f. Since the forwarding address "G" is the same as the destination address "G" of the decapsulated multicast packet, the multicast packet is natively inputted into the forwarder 23. The forwarder 23 transmits the multicast packet 5e to the destination terminal 40a by multicast based on the destination address "G" (S605).

As shown in FIG. 13, the multicast packet is forwarded from the source terminal 10 to the destination terminal 40a in accordance with the set multicast tree. At this point, the multicast packets 5a to 5d are encapsulated with the sending address and the forwarding addresses (UR1, UR2, UR4 and UR6). Therefore, the NR 30a existing between the source terminal 10 and the UR 20f can forward the multicast packet by normal unicast, without being aware that the received packet is a multicast packet.

Next, a description will be given of the operations of the communication system 1 in a case where the new destination terminals 40b to 40d join the multicast tree in a state where the multicast tree shown in FIG. 11 is set, with reference to FIGS. 14 to 17. Note that in FIGS. 15 and 17, the states of the entry holders 21a, 21b and 21e before updates are shown as entry holders before update 211a, 211b and 211e in order to discriminate between before and after the updates of the entry holders 21a, 21b and 21e.

Figure 14:
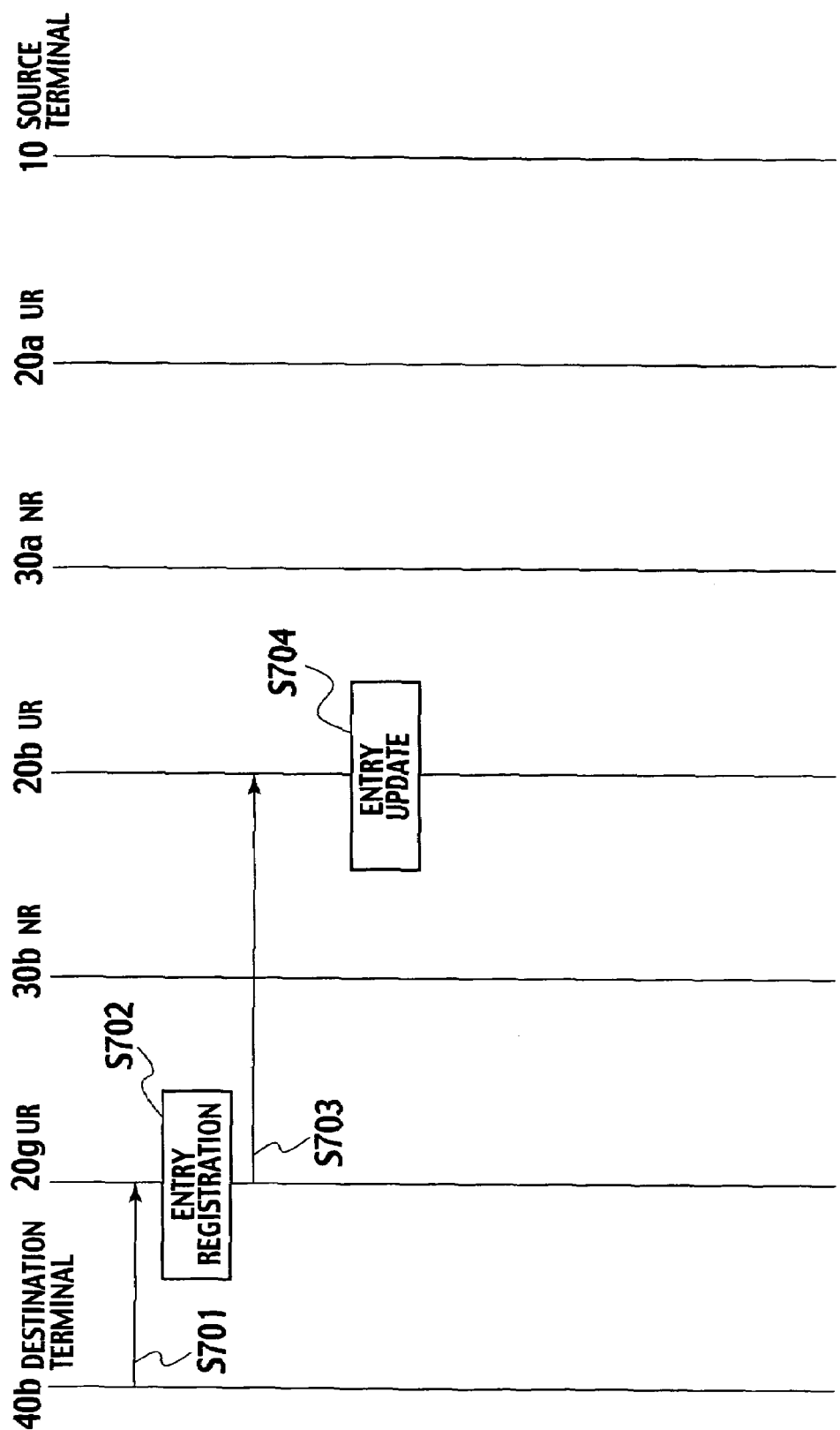
FIG. 14 is a sequence diagram showing the procedures of when the destination terminal joins a multicast tree of the destination terminal according to the first embodiment of the present invention.
Figure 15:
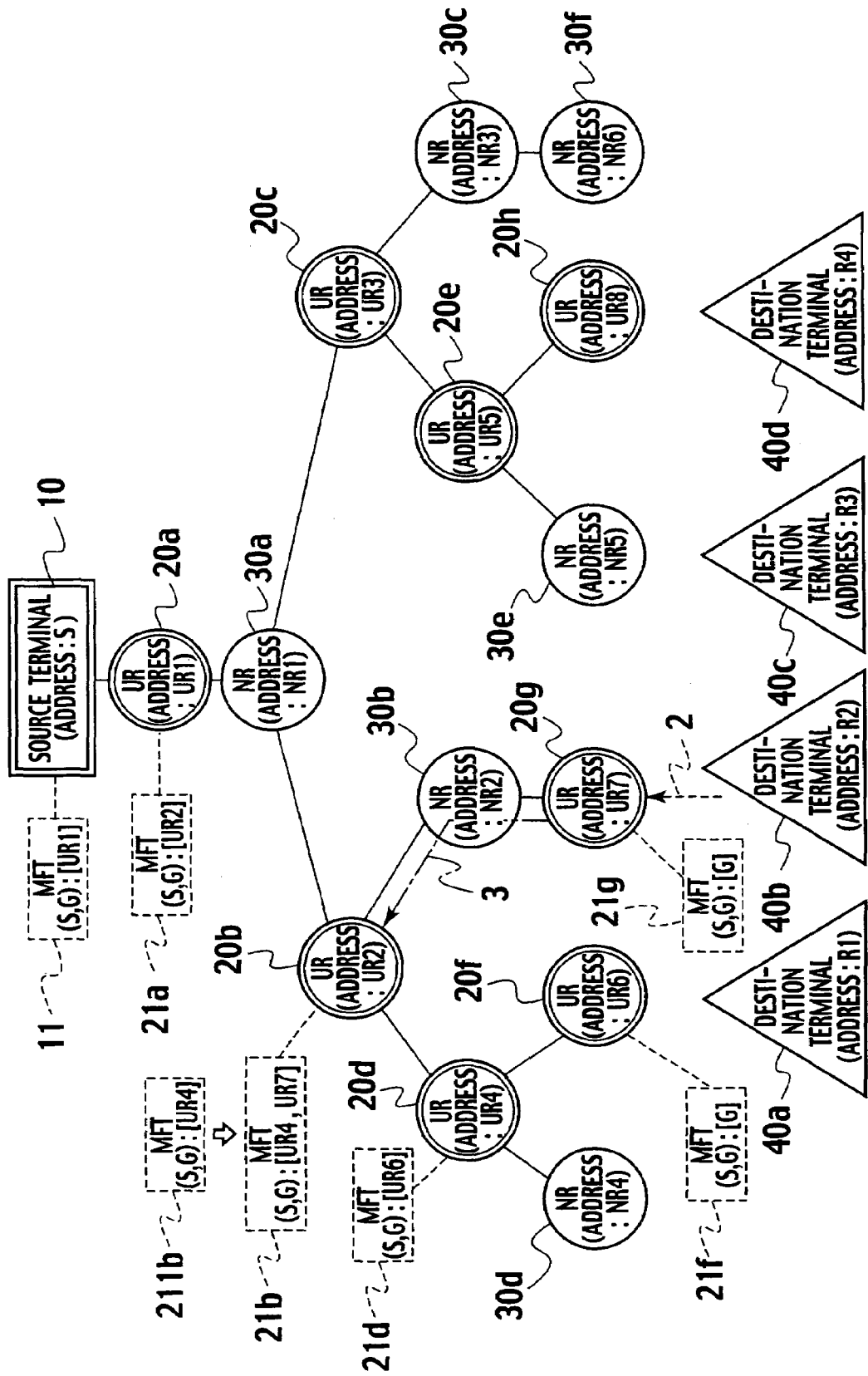
FIG. 15 is a view showing the join of the destination terminal to a multicast tree according to the first embodiment of the present invention.

As shown in FIGS. 14 and 15, the destination terminal 40b transmits a Membership Report 2 to the UR 20g, and requests to join the multicast tree (S701).

The message processor 25 of the UR 20g generates an MFT entry associated with the source terminal address "S", the multicast address "G" and the forwarding address "G", based on the source terminal address "S" and the multicast address "G", the addresses being set in the Membership Report 2. The message processor 25 registers the generated MFT entry in the entry holder 21g (S702).

The message provider 26 of the UR 20g sets the source terminal address "S" as a destination address and the address "UR7" of the UR 20g as a source address, and generates a Join message 3 designating the multicast group address "G". The forwarder 23 forwards the Join message 3 based on the source terminal address "S" set as the destination address (S703).

The NR 30b existing between the NR 20g and the UR 20b located upstream of the UR 20g forwards the Join message 3 by unicast based on the source terminal address "S" set as a sending address.

The UR 20b located upstream of the UR 20g receives the Join message 3. The message processor 25 of the UR 20b updates the entry holder 21b based on the received Join message 3 and the entry held by the entry holder 21b.

Specifically, the message processor 25 newly generates an MFT entry associated with the source terminal address "S", the multicast address "G" and the forwarding addresses "UR4, UR7", based on the forwarding address "UR4" held by the entry holder before update 211b and "UR7" set as the source address of the Join message 3. The message processor 25 updates the entry holder 21b from the state of the entry holder before update 211b to the state of the entry holder 21b shown in FIG. 15, by registering the newly generated MFT entry in the entry holder 21b (S704).

As shown in FIG. 15, the multicast packet is forwarded to the destination terminal 40a via the source terminal 10 and the URs 20a, 20b, 20d and 20f by the above-mentioned procedures, thus setting a multicast tree in which the multicast packet is forwarded to the destination terminal 40b via the source terminal 10 and the URs 20a, 20b, 20d and 20g.

Figure 16:
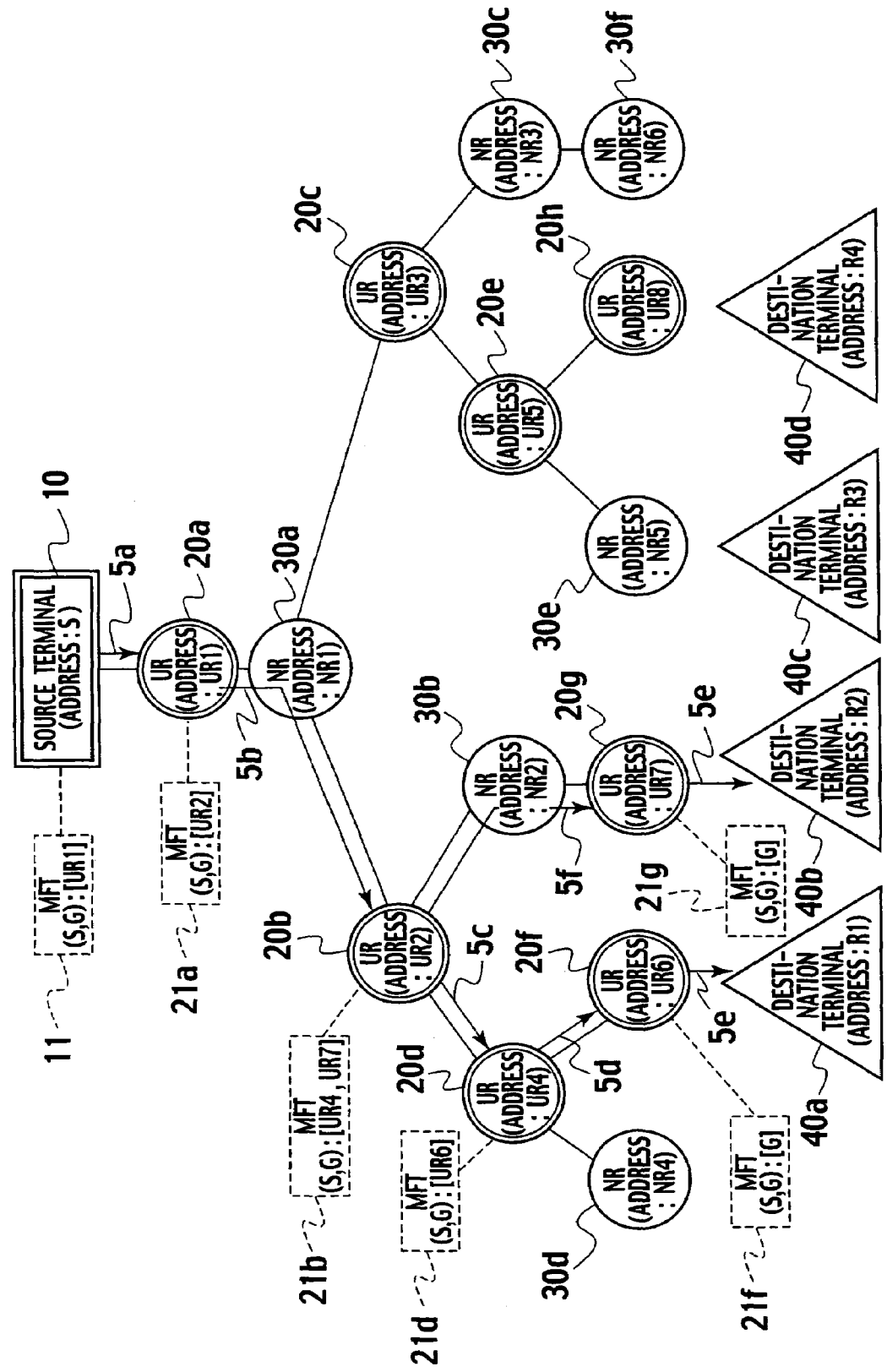
FIG. 16 is a view showing the forwarding of the multicast packet in accordance with the newly set multicast tree according to the first embodiment of the present invention.

Next, a description will be given of the operations of the communication system 1 of when forwarding a multicast packet in accordance with the multicast tree shown in FIG. 15, with reference to FIG. 16.

Initially, the packet generator 15 of the source terminal 10 refers to the entry holder 11, sets, in data, the source terminal address "S" as a source address and the multicast group address "G" as a destination address, and generates a multicast packet. Then, the packet generator 15 sets, in the generated multicast packet, the source terminal address "S" as a source address and the sending address "UR1" held by the entry holder 11 as a destination address, then encapsulating the multicast packet. Subsequently, the transmitter 13 of the source terminal 10 transmits the encapsulated multicast packet 5a to the UR 20a based on its destination address "UR1".

The receiver 22 of the UR 20a decapsulates the encapsulated multicast packet 5a. The receiver 22 inputs, into the forwarding controller 24, the derived multicast packet and the source address "S" set in the encapsulated multicast packet 5a. The forwarding controller 24 sets the source address "S" of the encapsulated multicast packet 5a as a tunnel source address of the entry holder 21a. The forwarding controller 24 of the UR 20a refers to the entry holder 21a. Since the forwarding address "UR2" is different from the destination address "G" of the decapsulated multicast packet, the forwarding controller 24 of the UR 20a sets the address "UR1" of the UR 20a itself as a source address and the forwarding address "UR2" as a destination address, then encapsulating the multicast packet. Then, the forwarder 23 forwards the encapsulated multicast packet 5b to the UR 20b based on its destination address "UR2".

The receiver 22 of the UR 20b decapsulates the encapsulated multicast packet 5b. The forwarding controller 24 of the UR 20b refers to the entry holder 21b. Since there are two forwarding addresses, the decapsulated multicast packet is replicated to make two copies of the multicast packets.

The forwarding controller 24 compares the forwarding addresses "UR4, UR7" with the destination address "G" of the decapsulated multicast packet. Since both of the forwarding addresses are different from the destination address, the forwarding controller 24 sets the address "UR2" of the UR 20b itself as a source address, sets the forwarding address "UR4" as the destination address of one of the multicast packets, and sets the forwarding address "UR7" as the destination address of the other multicast packet. Then, the multicast packets are encapsulated.

Subsequently, the forwarder 23 forwards the encapsulated multicast packet 5c to the UR 20d based on its destination address "UR4". Moreover, the forwarder 23 forwards the encapsulated multicast packet 5f to the UR 20g based on its destination address "UR7".

The URs 20d and 20f forward the multicast packets 5d and 5e similarly to FIGS. 12 and 13. The receiver 22 of the UR 20g decapsulates the encapsulated multicast packet 5f, then deriving the multicast packet 5e. The forwarding controller 24 of the UR 20g refers to the entry holder 21g. Since the forwarding address "G" is the same as the destination address "G" of the decapsulated multicast packet, the forwarding controller 24 of the UR 20g inputs the multicast packet natively into the forwarder 23. The forwarder 23 transmits the multicast packet 5e to the destination terminal 40b by multicast based on the destination address "G". In this manner, the multicast packet is forwarded from the source terminal 10 to the destination terminals 40a and 40b in accordance with the set multicast tree.

Figure 17:
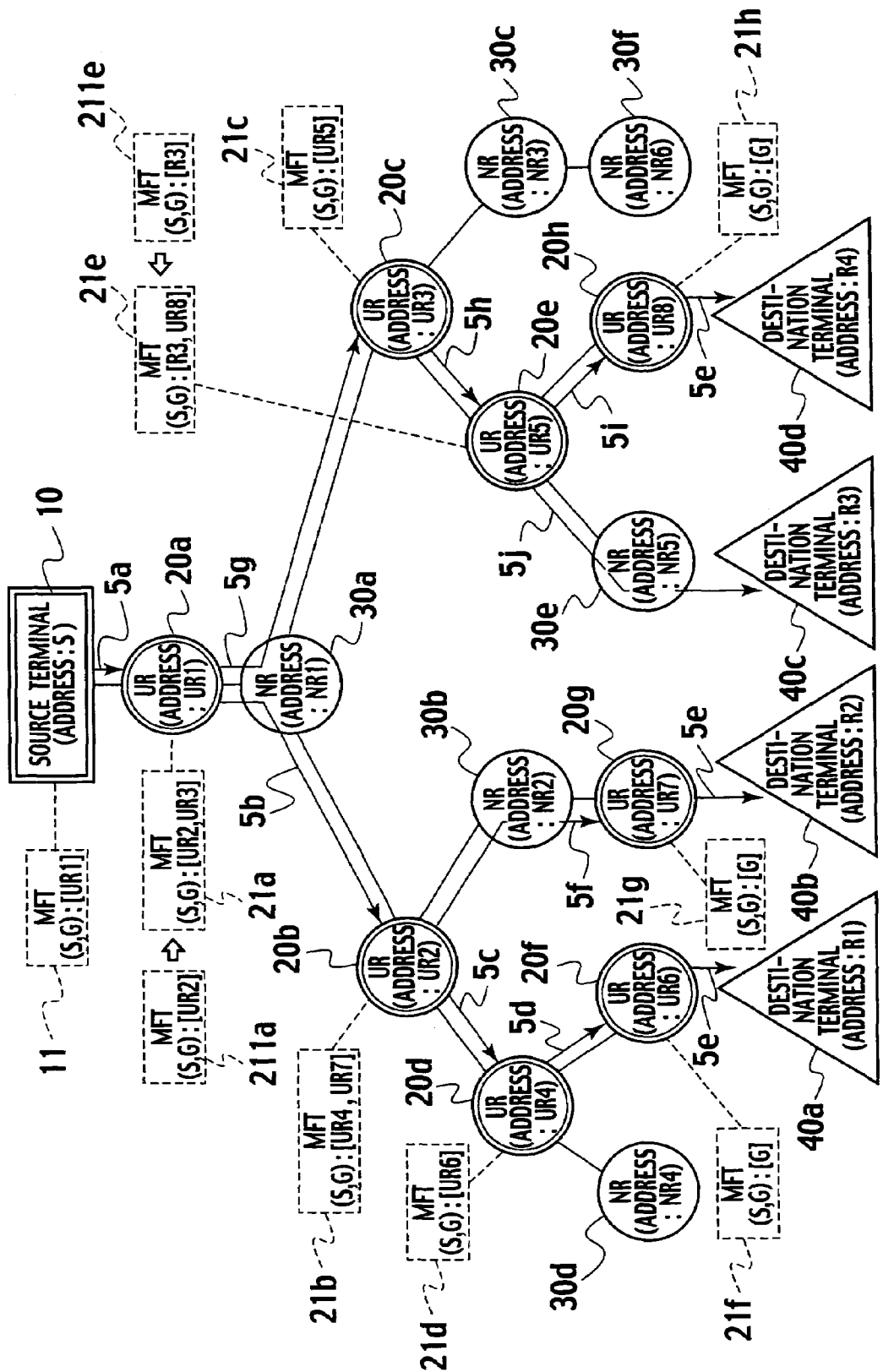
FIG. 17 is a view showing the forwarding of the multicast packet in a state where a plurality of destination terminals join a multicast tree according to the first embodiment of the present invention.

Moreover, FIG. 17 shows a multicast tree which is newly set since the destination terminals 40c and 40d join the multicast tree shown in FIG. 15. The destination terminal 40c is connected to the NR 30e, thus detecting that the router to which the destination terminal 40c connects via the radio link is an NR. The destination terminal 40c can detect it due to whether or not to receive a Membership Query. For example, when the destination terminal 40c cannot receive a Membership Query for more than a specified time, the destination terminal 40c can judge that there is no UR which transmits a Membership Query, and can detect that the destination terminal 40c is connecting to the NR. Alternatively, also when the destination terminal 40c cannot receive a multicast packet even if the specified time has elapsed after the transmission of a Membership Report, the destination terminal 40c can judge that there is no UR which can process the Membership Report, and can detect that the destination terminal 40c is connecting to the NR.

When connecting to the NR, the destination terminal 40c transmits a Join message 3 which requests the join to the multicast tree identified with (S, G). Since a special option is set in the Join message 3 transmitted by the destination terminal 40c, the NR 30e does not discard the Join message 3. Thus, the URs existing on a path from the destination terminal 40c to the source terminal 10 can receive the Join message 3. The destination terminal 40c sets the source terminal address "S" as a destination address, sets the address "R3" of the destination terminal 40c as a source address, and transmits the Join message 3 designating the multicast group address "G". In this case, the UR 20e existing most downstream of the path from the destination terminal 40c to the source terminal 10 among the URs receives the Join message 3.

By causing the destination terminal 40c to join the multicast tree, there arises a need that the UR 20a forwards a multicast packet to the UR 20c, too. Accordingly, the message processor 25 of the UR 20a updates the entry held by the entry holder 21a from an entry (S, G): [UR2] in the entry holder before update 211a to an entry (S, G): [UR2, UR3]. Additionally, the UR 20c is required to forward the multicast packet to the UR 20e. Therefore, the message processor 25 of the UR 20c registers an entry (S, G): [UR5] in the entry holder 21c.

Since the router existing between the UR 20e and the destination terminal 40c is the NR 30e, the UR 20e is required to forward the multicast packet to the destination terminal 40c. Hence, the message processor 25 of the UR 20e registers, in the entry holder 21e, an entry (S, G): [R3] as shown in the entry holder before update 211e.

Furthermore, there arises a need for the UR 20e to forward the multicast packet to the UR 20h, too, by causing the destination terminal 40d to join the multicast tree in this state. Therefore, the message processor 25 of the UR 20e updates the entry held by the entry holder 21e from the entry (S, G): [R3] of the entry holder before update 211e to an entry (S, G): [R3, UR8]. In addition, the message processor 25 of the UR 20h registers an entry (S, G): [G] in the entry holder 21h. Accordingly, the multicast tree, in which multicast packets are forwarded from the source terminal 10 to the plurality of destination terminals 40a to 40e, is set.

The forwarding of a multicast packet in accordance with this multicast tree is performed as follows. Initially, the packet generator 15 of the source terminal 10 refers to the entry holder 11, sets, in data, the source terminal address "S" as a source address and the multicast group address "G" as a destination address, and generates a multicast packet. Subsequently, the packet generator 15 sets, in the generated multicast packet, the source terminal address "S" as a source address and the sending address "UR1" held by the entry holder 11 as a destination address, and then encapsulates the multicast packet. Then, the transmitter 13 of the source terminal 10 transmits the encapsulated multicast packet 5a to the UR 20a based on its destination address "UR1"

The receiver 22 of the UR 20a decapsulates the encapsulated multicast packet 5a. The forwarding controller 24 of the UR 20a refers to the entry holder 21a. Since there are two forwarding addresses, the forwarding controller 24 of the UR 20a replicates the decapsulated multicast packet to make two copies of the multicast packets. The forwarding controller 24 compares the forwarding addresses "UR2, UR3" with the destination address "G" of the decapsulated multicast packet. Since both of the forwarding addresses are different from the destination address, the forwarding controller 24 sets the address "UR1" of the UR 20a itself as a source address, sets the forwarding address "UR2" as the destination address of one of the multicast packets, and sets the forwarding address "UR3" as the destination address of the other multicast packet. Thus, the multicast packets are encapsulated.

Subsequently, the forwarder 23 forwards the encapsulated multicast packet 5b to the UR 20b based on its destination address "UR2". In addition, the forwarder 23 forwards the encapsulated multicast packet 5g to the UR 20c based on its destination address "UR3".

The receiver 22 of the UR 20b decapsulates the encapsulated multicast packet 5b. The forwarding controller 24 of the UR 20b refers to the entry holder 21b. Since there are two forwarding addresses, the decapsulated multicast packet is replicated, thus making two copies of the multicast packet.

The forwarding controller 24 compares the forwarding addresses "UR4, UR7" with the destination address "G" of the decapsulated multicast packet. Since both of the forwarding addresses are different from the destination address, the forwarding controller 24 sets the address "UR2" of the UR 20b itself as a source address, sets the forwarding address "UR4" as the destination address of one of the multicast packets, and sets the forwarding address "UR7" as the destination address of the other multicast packet. Thus, the multicast packets are encapsulated.

Then, the forwarder 23 forwards the encapsulated multicast packet 5c to the UR 20d based on its destination address "UR4". Moreover, the forwarder 23 forwards the encapsulated multicast packet 5f to the UR 20g based on its destination address "UR7".

The URs 20d and 20f forward the multicast packets 5d and 5e similarly to FIGS. 12 and 13. The receiver 22 of the UR 20g decapsulates the encapsulated multicast packet 5f, thus deriving the multicast packet 5e. The forwarding controller 24 of the UR 20g refers to the entry holder 21g. Since the forwarding address "G" is the same as the destination address "G" of the decapsulated multicast packet, the multicast packet is natively inputted into the forwarder 23. The forwarder 23 transmits the multicast packet 5e to the destination terminal 40b by multicast based on the destination address "G".

The receiver 22 of the UR 20c decapsulates the encapsulated multicast packet 5g, and derives the multicast packet. The forwarding controller 24 of the UR 20c refers to the entry holder 21c. Since the forwarding address "UR5" is different from the destination address "G" of the decapsulated multicast packet, the forwarding controller 24 of the UR 20c sets the address "UR3" of the UR 20c itself as a source address and sets the forwarding address "UR5" as a destination address, then encapsulating the multicast packet. Then, the forwarder 23 forwards the encapsulated multicast packet 5h to the UR 20e based on its destination address "UR5".

The receiver 22 of the UR 20e decapsulates the encapsulated multicast packet 5h. The forwarding controller 24 of the UR 20e refers to the entry holder 21e. Since there are two forwarding addresses, the forwarding controller 24 of the UR 20e replicates the decapsulated multicast packet, thus making two copies of the multicast packet. The forwarding controller 24 compares the forwarding addresses "R3, UR8" with the destination address "G" of the decapsulated multicast packet. Since both of the forwarding addresses are different from the destination address, the forwarding controller 24 sets the address "UR5" of the UR 20e as a source address, sets the forwarding address "R3" as the destination address of one of the multicast packets, and sets the forwarding address "UR8" as the destination address of the other multicast packet. Thus, the multicast packets are encapsulated.

Subsequently, the forwarder 23 forwards the encapsulated multicast packet 5j to the destination terminal 40c based on its destination address "R3". In addition, the forwarder 23 forwards the encapsulated multicast packet 5i to the UR 20h based on its destination address "UR8". In this manner, the UR 20e forwards the multicast packet, in which "R3" is set as a destination address, to the destination terminal 40c by unicast, based on the entry (S, G): [R3, UR8]. The UR 20h decapsulates the multicast packet 5i, and the derived multicast packet 5e is forwarded to the destination terminal 40d by multicast.

Figure 18:
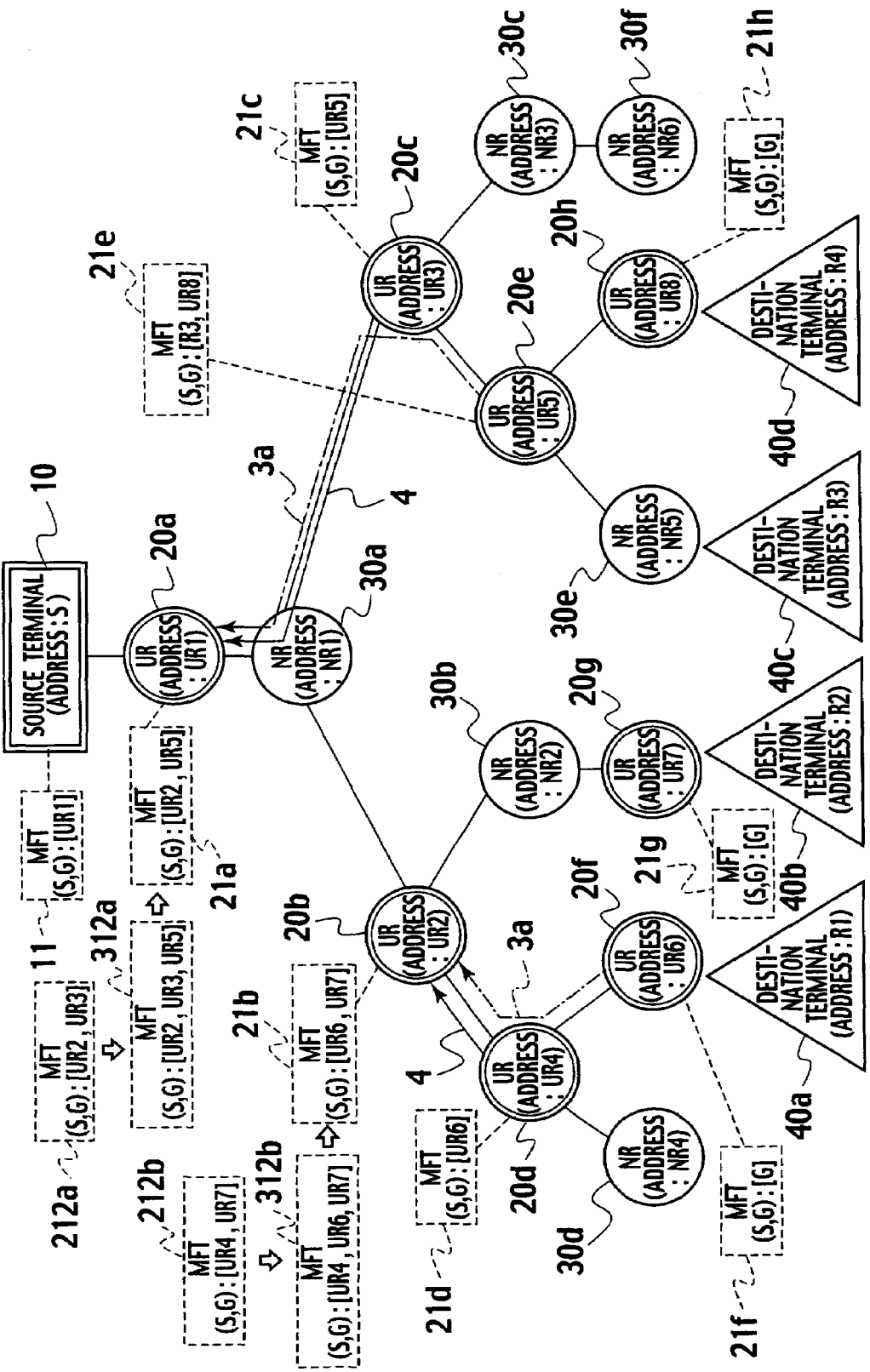
FIG. 18 is a view showing the communication system of when the multicast tree shifts to a stable state according to the first embodiment of the present invention.

Next, a description will be given of the operations of the communication system 1 of when a multicast tree has shifted to the stable state, with reference to FIG. 18. The multicast tree shifts from the initial state to the stable state. The multicast tree shifts to the stable state, for example, due to a decrease in the number of the destination terminals which newly join the multicast tree. For example, after the start of a live broadcast, the destination terminals which newly join decrease in number. The source terminal 10 can judge that the multicast tree has shifted to the stable state, when the source terminal 10 can judge that the number of the destination terminals which newly join has started decreasing.

A description will be given of the processing after the shift to the stable state, taking an example of a case where the multicast tree has shifted to the stable state in the state of the multicast tree shown in FIG. 17. Note that the states of the entry holders 21a and 21b before updates are shown as entry holders before update 212a and 212b in order to discriminate the entry holders 21a and 21b between before and after the updates. In addition, the states of the entry holders 21a and 21b before and after the updates, which are in the shifting stage, are shown as entry holders during shift 312a and 312b.

When having shifted to the stable state, the communication system 1 sets a multicast tree linking branch routers which are the replication points of a multicast packet. According to this, the URs (such as the UR 20c) existing on the paths of the multicast tree except the branch routers can handle multicast packets in the same manner as unicast packets. In this manner, all the URs included in the communication system 1 are not required to process multicast packets. Therefore, a load on the entire communication system 1 is reduced.

Specifically, when the multicast tree has shifted to the stable state, the packet generator 15 of the source terminal 10 generates a multicast packet in which a Stable option to show the shift to the stable state is set, and then the transmitter 13 transmits the packet. Due to this, the source terminal 10 notifies the destination terminals 40a to 40d which are joining that the multicast tree has shifted to the stable state. The destination terminals 40a to 40d transmit Stable Membership Reports or Stable Join messages, after receiving the multicast packets in which the Stable options are set. For example, the destination terminal 40c transmits a Stable Join message in which the destination address is the source terminal address "S" and the source address is "R3", after receiving the multicast packet in which the Stable option is set.

Subsequently, after receiving the Stable Membership Reports or the Stable Join messages from the destination terminals 40a to 40d, the URs 20e to 20h judge that the multicast tree has shifted to the stable state, thus transmitting Stable Join messages 3a to the upstream URs. For example, the message provider 26 of the UR 20f to be an edge router generates the Stable Join message 3a in which the destination address is the source terminal address "S", the source address is "UR6", and "G" is designated as a multicast group address, in a case where there exists even one forwarding address in which the KAT has not been expired when the JT has been expired. The forwarder 23 of the UR 20c transmits the generated Stable Join message 3a.

After the shift to the stable state, the URs 20c and 20d, which are not branch routers, use the Stable Join messages 3a only for registering and update entries, and forward the messages natively to the upstream URs 20a and 20b. Due to this, for example, the Stable Join message 3a from the UR 20f passes through the UR 20d, and then is received by the UR 20b to be the branch router. Consequently, the message processor 25 of the UR 20b adds "UR6" to the forwarding addresses of the UR 20b, based on the Stable Join message 3a from the UR 20f. That is, the message processor 25 of the UR 20b updates the entry held by the entry holder 21b from the entry (S, G): [UR4, UR7] in the entry holder before update 212b to an entry (S, G): [UR4, UR6, UR7] in the entry holder during update 312b. The UR 20b thereafter forwards multicast packets received from the UR 20a to the URs 20d, 20f and 20g.

Moreover, the message provider 26 of the UR 20d which has let the Stable Join message 3a pass provides a Redirect message 4 to the UR 20b via the forwarder 23. The Redirect message 4 is a message which requests the deletion of the address "UR4" of the UR 20d from the forwarding address and the addition of the address "UR6" of the UR 20f to the forwarding address. The source terminal address "S" is set as the destination address of the Redirect message 4.

The message processor 25 of the UR 20b to have received the Redirect message 4 updates the entry held by the entry holder 21b from the entry (S, G): [UR4, UR6, UR7] in the entry holder during update 312b to the entry (S, G): [UR6, UR7]. Due to this, the UR 20f can prevent receiving redundant multicast packets from two paths, that is, the path on which the UR 20b forwards the multicast packet to the UR 20d, and on which the UR 20d forwards the multicast packet to the UR 20f, and the path on which the UR 20b directly forwards the multicast packet to the UR 20f.

In this manner, a Redirect message can be used as a change request message which commands the URs located upstream of the UR itself and the source terminal 10 to change the information held by the entry holders, when the UR receives a message which requests the join to the multicast tree from the destination terminals 40a to 40d and other URs.

Similarly, the Stable Join message 3a from the UR 20e passes through the UR 20c, and is received by the UR 20a to be the branch router. Due to this, the message processor 25 of the UR 20a updates the entry held by the entry holder 21a from the entry (S, G): [UR2, UR3] in the entry holder before update 212a to an entry (S,G): [UR2, UR3, UR5] in the entry holder during shift 312a.

Furthermore, the message provider 26 of the UR 20c which has let the Stable Join message 3a pass provides the UR 20a with a Redirect message 4 which requests the deletion of the address "UR3" of the UR 20c from the forwarding address and the addition of the address "UR5" of the UR 20e to the forwarding address. The message processor 25 of the UR 20a to have received the Redirect message 4 updates the entry held by the entry holder 21a from the entry (S, G): [UR2, UR3, UR5] in the entry holder during shift 312a to an entry (S, G): [UR2, UR5].

Figure 19:
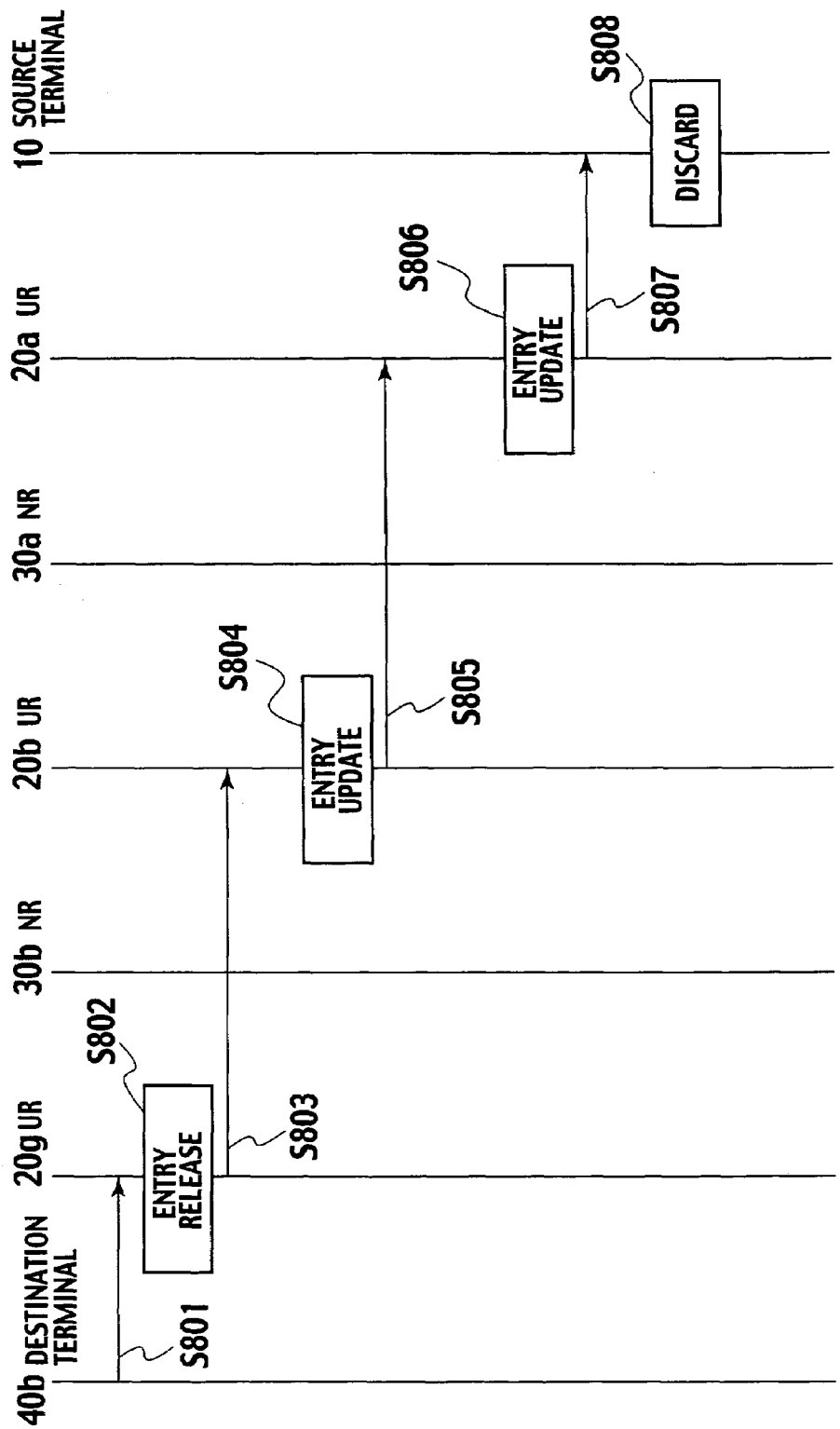
FIG. 19 is a flowchart showing procedures for leaving the multicast tree according to the first embodiment of the present invention.
Figure 20:
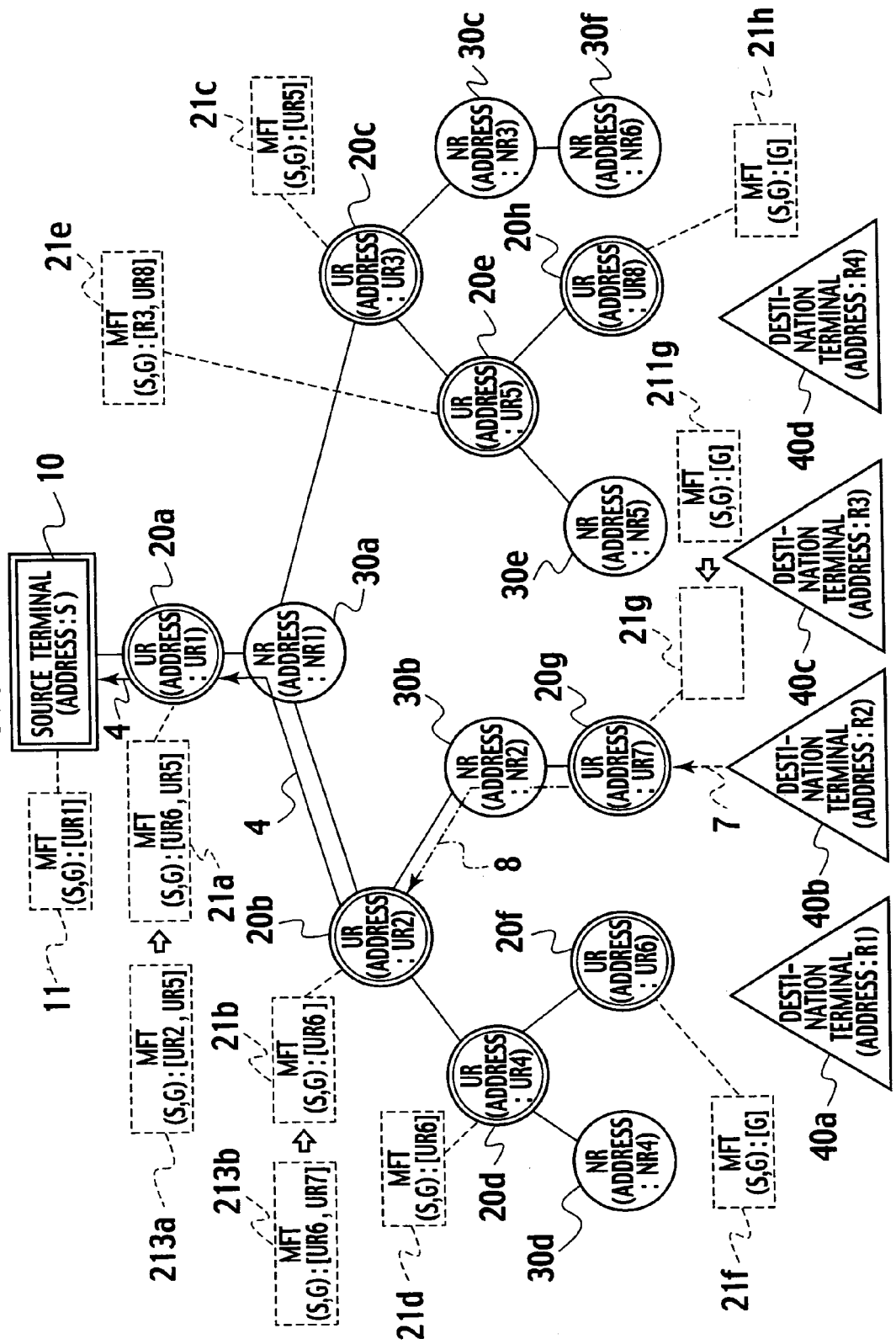
FIG. 20 is a view showing the communication system of when leaving the multicast tree according to the first embodiment of the present invention.

Next, a description will be given of the operations of the communication system 1 of when the destination terminal requests to leave the multicast tree, with reference to FIGS. 19 to 21. Here, a description will be given of a case where the destination terminal 40b leaves when the multicast tree is in the stable state as shown in FIG. 18. Note that in FIG. 20 the states of the entry holders 21a, 21b and 21g before updates are shown as entry holders before update 213a, 213b and 211g in order to discriminate the entry holder 21a, 21b and 21g between the states before and after the updates. FIG. 19 shows the operational procedures, and FIG. 20 shows the state of the communication system 1.

The destination terminal 40b transmits, the UR 20g, a leave request message which requests for the deletion from the forwarding address or the sending address. Specifically, the destination terminal 40b transmits a Leave Group message 7 in accordance with the IGMPv2 or the MLDv2. Due to this, the destination terminal 40b requests to leave the multicast tree, and requests the stop of the transmission of multicast packets (S801).

The message processor 25 of the UR 20g deletes, from the entry holder 21g, the entry identified with the source terminal address "S" and the multicast group address "G", which are set in the Leave Group message 7 (S802). Due to this, the entry held by the entry holder 21g is updated from the state of the entry holder before update 211g holding the entry (S, G): [G] to the state where an entry identified with (S, G) is not held.

Since the entry holder 21g no longer holds the entry identified with (S, G), the message provider 26 of the UR 20g generates a Prune message 8 in order that the UR 20g itself leaves the multicast tree, and provides the message to the source terminal address via the forwarder 23 (S803). Since a special option is set in the Prune message 8, the URs located upstream of the UR 20g can detect that the received Prune message 8 is a special control message.

The NR 30b existing between the NR 20g and the UR 20b upstream of the UR 20g forwards the received Prune message 8 by unicast, based on the source terminal address "S".

The message processor 25 of the UR 20b updates the entry in the entry holder before update 213b to an entry (S, G): [UR6], based on the received Prune message 8. That is, UR7 is deleted from the forwarding addresses (S804).

Since the number of the forwarding address held by the entry holder 21b becomes one, the message processor 25 of the UR 20b judges that the UR 20b is no longer the branch router. Therefore, the message provider 26 generates a Redirect message 4, and provides the message to the source terminal address via the forwarder 23 (S805). The Redirect message 4 is a message which requests the deletion of the address "UR2" of the UR 20b from the forwarding addresses and the addition of the address "UR6" of the UR 20f to the forwarding address. The source terminal address "S" is set as the destination address of the Redirect message 4.

The NR 30a existing between the UR 20b and the UR 20a located upstream of the UR 20b forwards the received Redirect message 4 by unicast based on the source terminal address "S".

The message processor 25 of the UR 20a updates the entry held by the entry holder 21a from the entry (S, G): [UR2, UR5] in the entry holder before update 213a to the entry (S, G): [UR6, UR5], based on the received Redirect message 4 (S806). The forwarder 23 of the UR 20a forwards the Redirect message 4 to the source terminal 10 based on the source terminal address "S".

The message processor 14 of the source terminal 10 searches the entry holder 11 based on the received Redirect message 4. The sending address "UR1" of the entry identified with the source terminal address "S" and the multicast group address "G", the addresses being included in the Redirect message 4, does not correspond to "UR2" included in the Redirect message 4. Hence, the message processor 14 does not update the entry holder 11, and discards the Redirect message 4 (S808). Accordingly, the multicast tree is updated to the state shown in FIG. 20. By causing the destination terminal 40b to request the stop of the transmission of the multicast packet in this manner, it is possible to limit the branch router to be the replication point of the multicast packet. Hence, the load on the communication system 1 is scattered.

Figure 21:
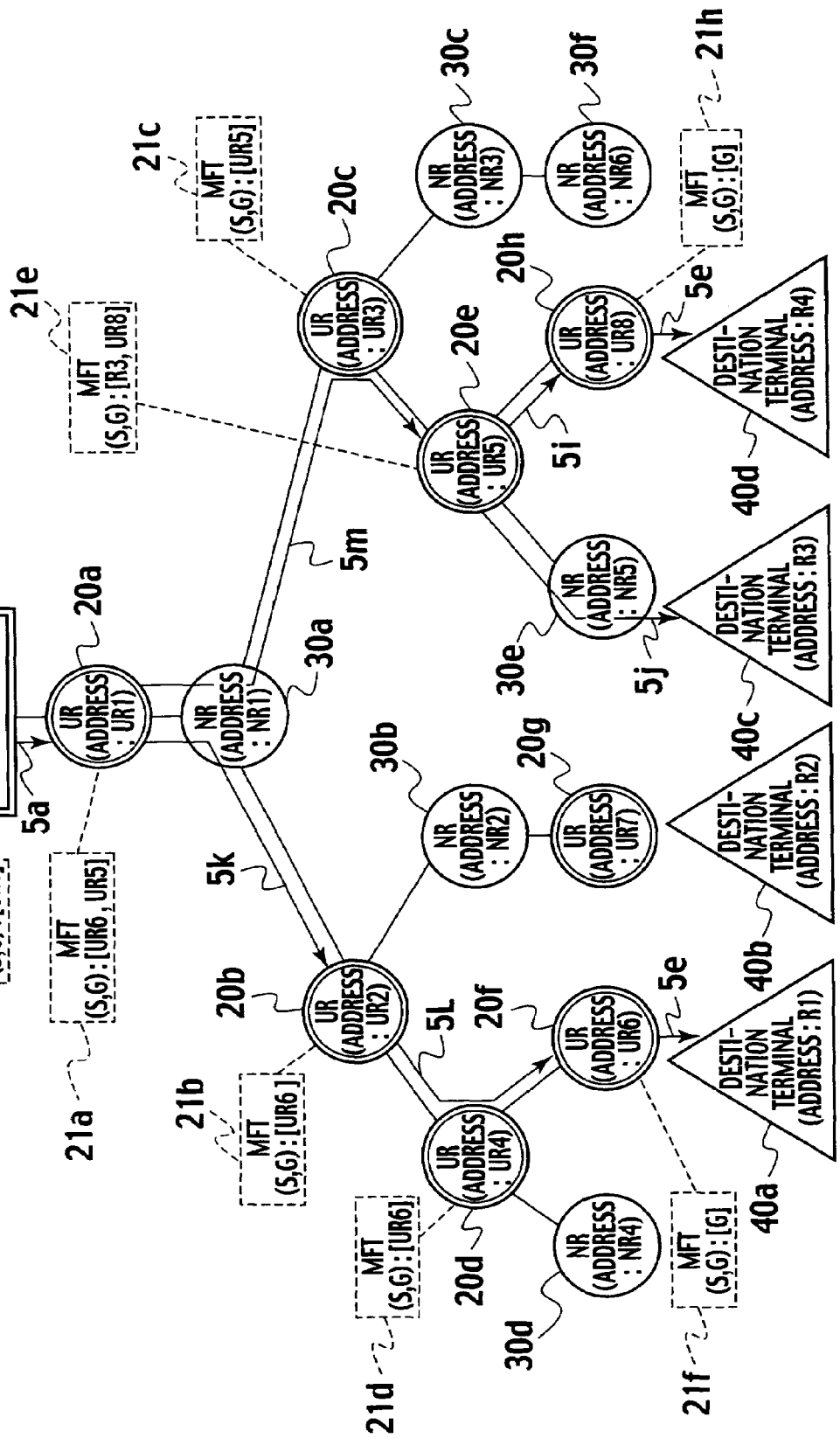
FIG. 21 is a view showing the forwarding of the multicast packet after the leave according to the first embodiment of the present invention.

The forwarding of the multicast packet in accordance with the multicast tree shown in FIG. 20 is performed as shown in FIG. 21. The source terminal 10 transmits the multicast packet 5a to the UR 20a. The UR 20a forwards, to the UR 20b, a multicast packet 5k in which "UR1" is set as a source address and "UR6" is set as a destination address. The UR 20b forwards, to the UR 20f, a multicast packet 5l in which "UR2" is set as a source address and "UR6" is set as a destination address. The UR 20f forwards the multicast packet 5e to the destination terminal 40a.

Further, the UR 20a forwards, to the UR 20e, a multicast packet 5m in which "UR1" is set as a source address and "UR5" as a destination address. The UR 20e forwards the multicast packet 5j to the destination terminal 40c, and forwards the multicast packet 5*i* to the UR 20*h*. The UR 20*h* forwards the multicast packet 5*e* to the destination terminal 40*d*.

According to these kinds of the communication system 1, the source terminal 10, the URs 20*a* to 20*h* and the communication method, the URs 20*a* to 20*h* can hold other UR addresses as forwarding addresses. The source terminal 10 can hold the address of the UR as a sending address. Therefore, an appropriate multicast tree, in which a multicast packet is forwarded from the source terminal 10 to the destination terminals 40*a* to 40*d* via the URs, is set.

Consequently, it is sufficient if the NRs 30*a* to f existing between the source terminal 10 and the UR and between the URs forward a multicast packet by unicast. In this manner, even if there exists an NR, the communication system 1 can set an appropriate multicast tree and forward a multicast packet. In other words, even if the URs 20*a* to 20*h* and the NRs 30*a* to 30*f* are mixed in the communication system 1, it is possible to achieve the forwarding of a multicast packet. For this reason, it is possible to easily forward a multicast packet at a low cost, by partly introducing the URs in the communication system 1.

In addition, the message processors 25 and 24 can register addresses in the entry holders 11 and 21*a* to 21*h*, based on join request messages such as Membership Reports 2 and Join messages 3 from the destination terminals 40*a* to 40*d* and the URs 20*a* to 20*h*. Therefore, the destination terminals 40*a* to 40*d* and the URs 20*a* to 20*h* can join a set multicast tree. As a result, it is possible to forward multicast packets to the destination terminals 40*a* to 40*d* to have joined and the URs 20*a* to 20*h* in the communication system 1.

Second Embodiment

Figure 22:
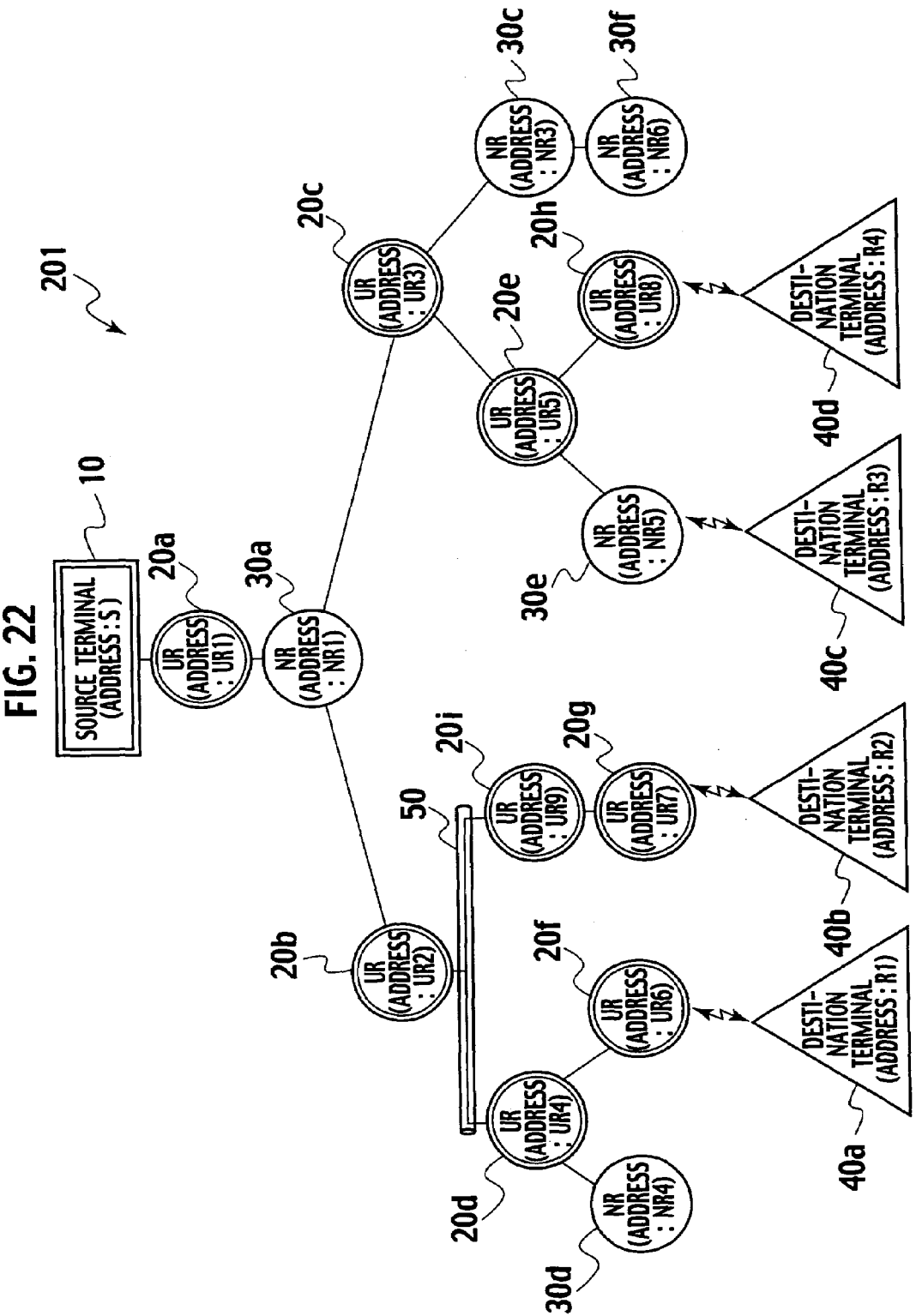
FIG. 22 is a view showing the configuration of a communication system according to a second embodiment of the present invention.

As shown in FIG. 22, a communication system 201 includes a source terminal 10, URs 20*a* to 20*i*, NRs 30*a* to 30*f*, and destination terminals 40*a* to 40*d*. A description will hereinafter be given of the communication system 201, centering on different points from the communication system 1 shown in FIG. 1. The UR 20*d* and the UR 20*i* are connected to the same subnetwork 50. The subnetwork 50 is, for example, an Ethernet and the like. The UR 20*d* and the UR 20*i* connect to the UR 20*b* located upstream via the subnetwork 50.

Figure 23:
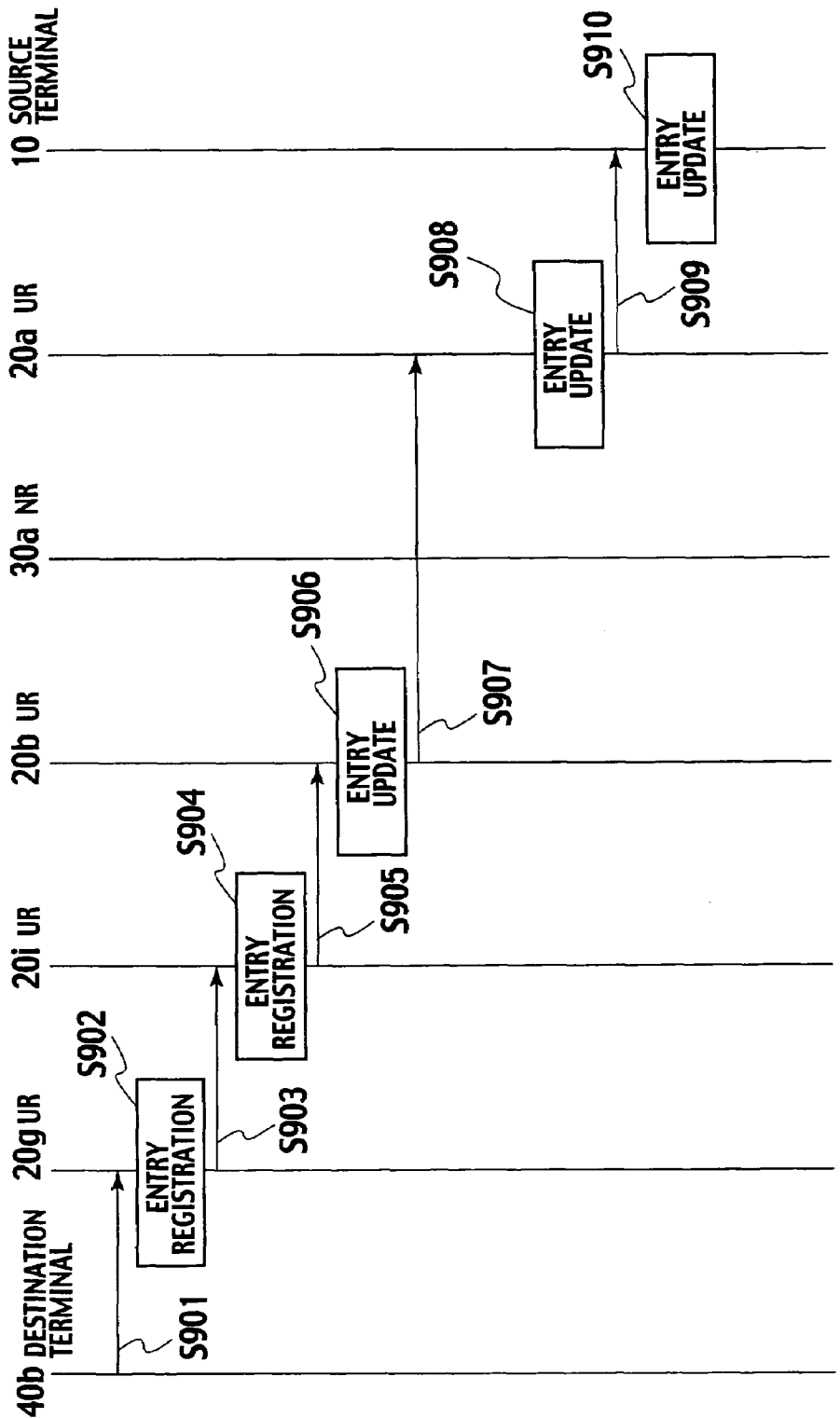
FIG. 23 is a sequence diagram showing the procedures of when a destination terminal joins a multicast tree according to the second embodiment of the present invention.
Figure 24:
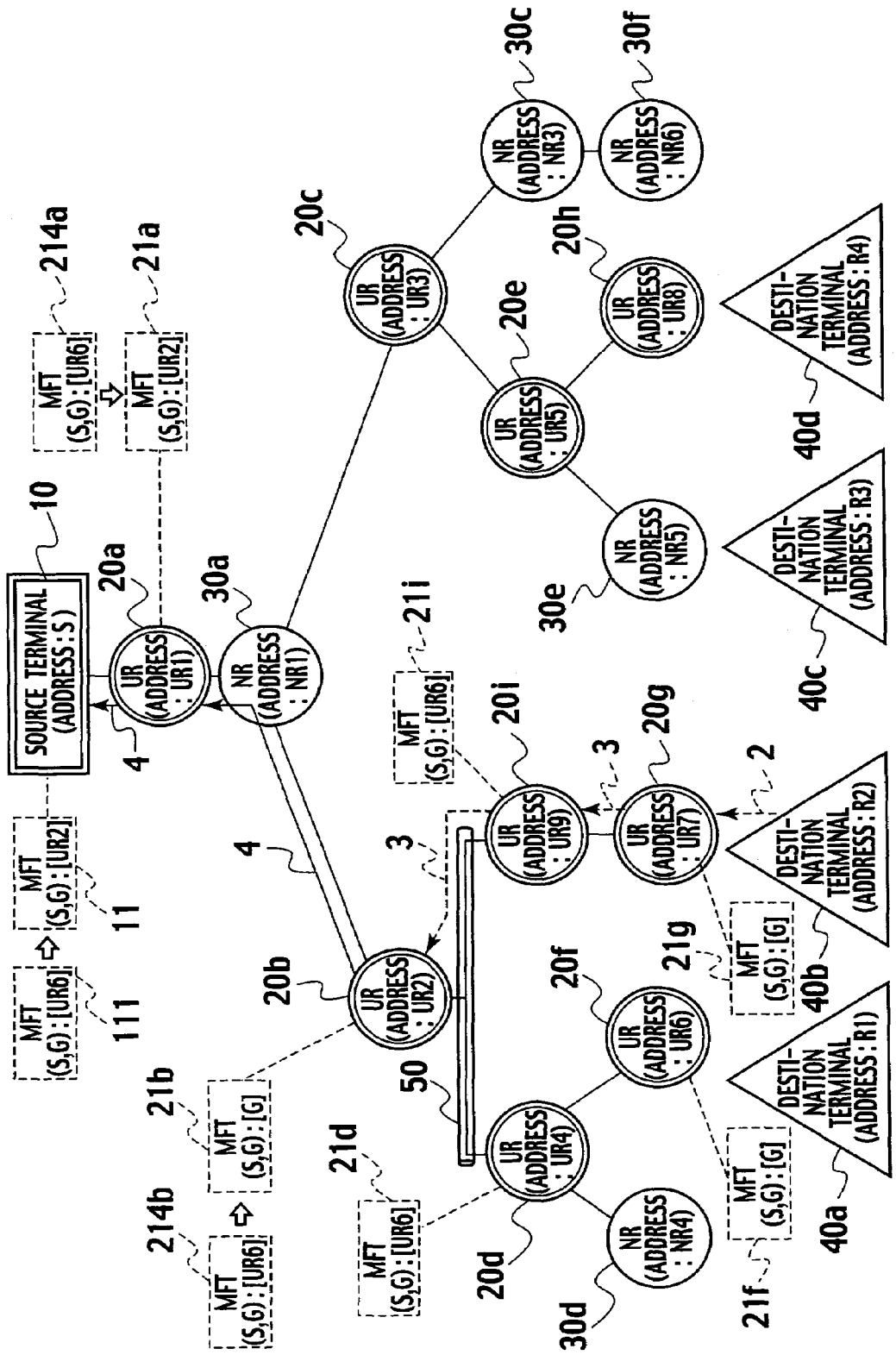
FIG. 24 is a view showing the join of the destination terminal to the multicast tree according to the second embodiment of the present invention.

A description will be given of the operations of when the destination terminal 40*b* newly joins a multicast tree which the destination terminal 40*a* has joined and has shifted to the stable state, with reference to FIGS. 23 and 24. Note that, in FIG. 24, the states of entry holders 11, 21*a* and 21*b* before updates are shown as entry holders before update 111, 214*a* and 214*b* in order to discriminate the entry holders 11, 21*a* and 21*b* between the states before and after the updates. FIG. 23 shows the procedures, and FIG. 24 shows the state of the communication system 201.

The destination terminal 40*b* transmits a Membership Report 2 to the UR 20*g* in accordance with the IGMPv2 and the MLDv2 (S901). A message processor 25 of the UR 20*g* generates an entry associated with a source terminal address "S", a multicast group address "G" and a forwarding address "G" based on the Membership Report 2. The message processor 25 registers the generated entry in an entry holder 21*g* (S902).

A message provider 26 of the UR 20*g* generates a Join message 3 to cause the UR 20*g* to join the multicast tree based on the received Membership Report 2, and provides the message to the source terminal address via a forwarder 23. The message provider 26 sets "S" as a destination address and "UR7" as a source address, and generates a Join message 3 designating the multicast group address "G". The forwarder 23 forwards the Join message 3 based on the source terminal address "S" set as the destination address (S903).

A message processor 25 of the UR 20*i* generates an entry associated with the source terminal address "S", the multicast group address "G" and the forwarding address "UR7" based on the received Join message 3, thus registering the entry in an entry holder 21*i* (S904).

A message provider 26 of the UR 20*i* sets "S" as a destination address and "UR9" as a source address, and generates a join message 3 designating the multicast group address "G". A forwarder 23 forwards the Join message 3 based on the source terminal address "S" set as the destination address (S905).

Note that the UR 20*d* connecting to the same subnetwork 50 receives a multicast packet identified with the source terminal address "S" and the multicast group address "G". Accordingly, even after the multicast tree has become stable, the UR 20*i* receives the Join messages 3, similarly to a branch router.

A message processor 25 of the UR 20*b* detects that the UR 20*d* and the UR 20*i*, which are connected to the same subnetwork 50, are requesting the transmission of the same multicast packets, based on the received Join message 3 and an entry shown in the entry holder before update 214*b*, the entry being held by the entry holder 21*b*. Then, the message processor 25 generates an entry associated with the source terminal address "S", the multicast group address "G" and the forwarding address "G". The message processor 25 updates the entry held by the entry holder 21*b* from an entry (S, G): [UR6] in the entry holder before update 214*b* to an entry (S, G): [G], by registering the generated entry in the entry holder 21*b* (S906).

In this manner, the entry holder 21*b* holds the multicast group address as a forwarding address, when a multicast packet is forwarded to the URs 20*d* and 20*i* connected to the same subnetwork 50.

A message provider 26 of the UR 20*b* generate a Redirect message 4 to command the update of the entry held by the source terminal 10, and provides the message to the source terminal address via a forwarder 23 (S907). The message provider 26 generates the Redirect message 4 which requests the deletion of the address "UR6" of the UR 20*f* from the forwarding address and the addition of the address "UR2" of the UR 20*b* to the forwarding address. The source terminal address "S" is set as the destination address of the Redirect message 4.

The NR 30*a* existing between the UR 20*b* and the UR 20*a* located upstream of the UR 20*b* forwards the received Redirect message 4 by unicast based on the source terminal address "S".

A message processor 25 of the UR 20*a* updates the entry held by the entry holder 21*a* from an entry (S, G): [UR6] in the entry holder before update 214*a* to an entry (S, G): [UR2], based on the received Redirect message 4 (S908). A forwarder 23 of the UR 20*a* forwards the Redirect message 4 to the source terminal 10 based on its destination address (S909).

A message processor 14 of the source terminal 10 updates the entry held by the entry holder 11 from the entry (S, G): [UR6] in the entry holder before update 111 to the entry (S, G): [UR2], based on the received Redirect message 4 (S910). Due to this, a new multicast tree such as the one shown in FIG. 24 is set.

Figure 25:
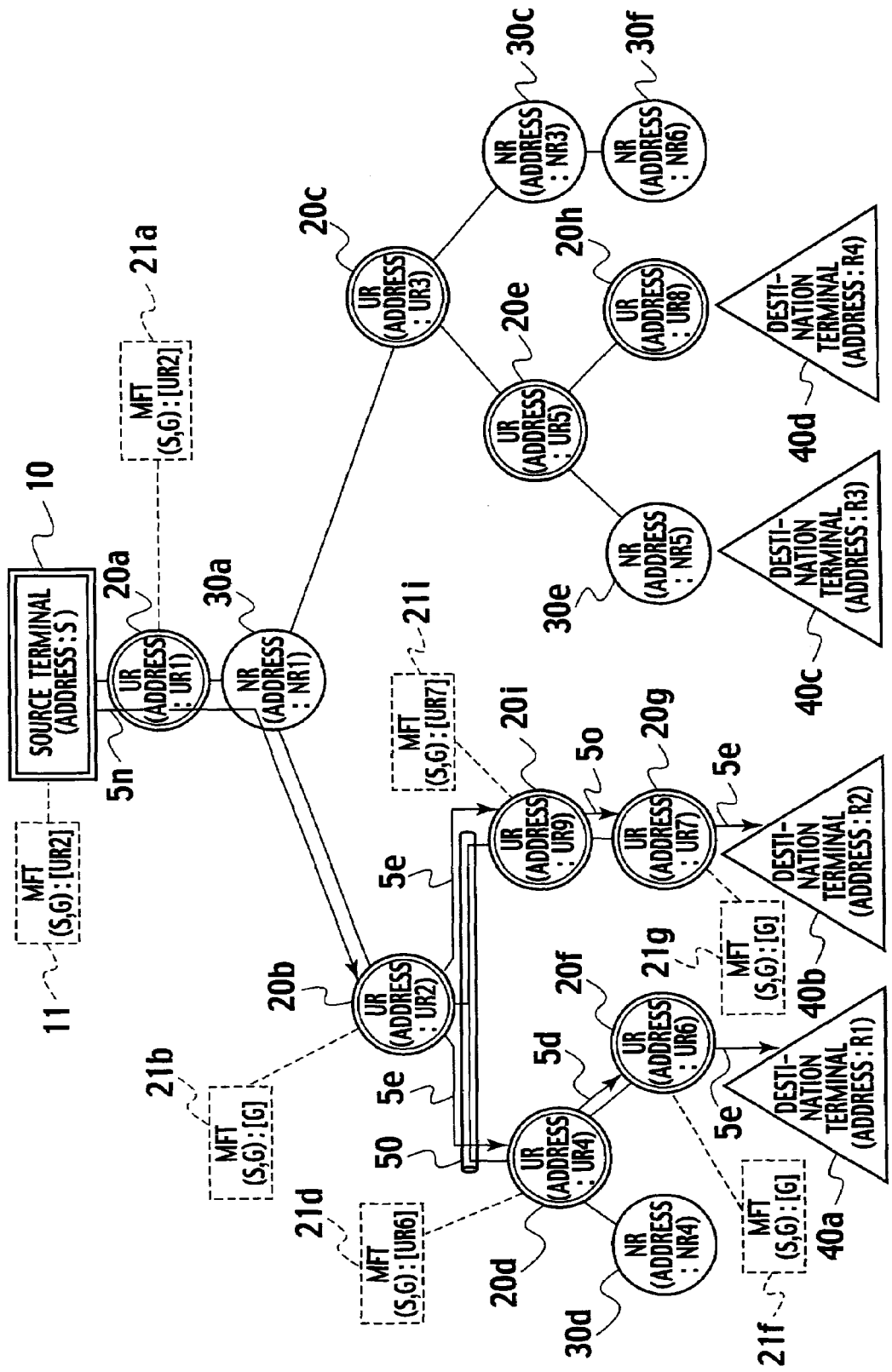
FIG. 25 is a view showing the forwarding of the multicast packet in accordance with a newly set multicast tree according to the second embodiment of the present invention.

A description will be given of the forwarding of a multicast packet in accordance with the multicast tree shown in FIG. 24, with reference to FIG. 25. A packet generator 15 of the source terminal 10 refers to the entry holder 11, sets the source terminal address "S" as a source address and the multicast group address "G" as a destination address in data, and generates a multicast packet. Subsequently, the packet generator 15 sets, for the generated multicast packet, the source terminal address "S" as the source address, the sending address "UR2" held by the entry holder 11 as the destination address, and encapsulates the multicast packet. Then, a transmitter 13 of the source terminal 10 transmits the encapsulated multicast packet 5n based on its destination address "UR2".

A receiver 22 of the UR 20b decapsulates the encapsulated multicast packet 5n. A forwarding controller 24 of the UR 20b refers to the entry holder 21b. Since the forwarding address "G" is the same as the destination address "G" of the decapsulated multicast packet, the forwarding controller 24 of the UR 20b inputs the packet into the forwarder 23 natively. The forwarder 23 forwards a multicast packet 5e to the subnetwork 50 by multicast based on the destination address "G".

A receiver 22 of the UR 20d receives the multicast packet 5e via the subnetwork 50. A forwarding controller 24 of the UR 20d refers to an entry holder 21d. Since the forwarding address "UR6" is different from the destination address "G" of the multicast packet 5e, the forwarding controller 24 of the UR 20d sets the address "UR4" of the UR 20d itself as a source address and the forwarding address "UR6" as a destination address, then encapsulating the packet. Then, a forwarder 23 forwards the encapsulated multicast packet 5d to the UR 20f based on its destination address "UR6". The UR 20f decapsulates the multicast packet 5d, and forwards the multicast packet 5e to the destination terminal 40a by multicast.

Similarly, a receiver 22 of the UR 20i receives the multicast packet 5e via the subnetwork 50. The forwarding controller 24 of the UR 20i refers to the entry holder 21i. Since the forwarding address "UR7" is different from the destination address "G" of the multicast packet 5e, the forwarding controller 24 of the UR 20i sets the address "UR9" of the UR 20i itself as a source address and the forwarding address "UR7" as a destination address, then encapsulating the packet. Subsequently, the forwarder 23 forwards the encapsulated multicast packet 5o to the UR 20g based on its destination address "UR7". The UR 20g decapsulates the multicast packet 5o, and forwards the multicast packet 5e to the destination terminal 40b by multicast.

Third Embodiment

All the URs 20a to 20h included in the communication system 1 perform the processing in the first and second embodiments, when receiving control messages. However, the URs 20a to 20h can let the control messages pass and entrust the processing to other URs. For example, the UR whose resource lacks omits the processing of the control message, and forwards the control message upstream natively. Thus, it is possible to entrust the processing of the control message to another UR. A description will be given of the operations in the communication system 1 in this case, with reference to FIGS. 26 to 28.

Figure 26:
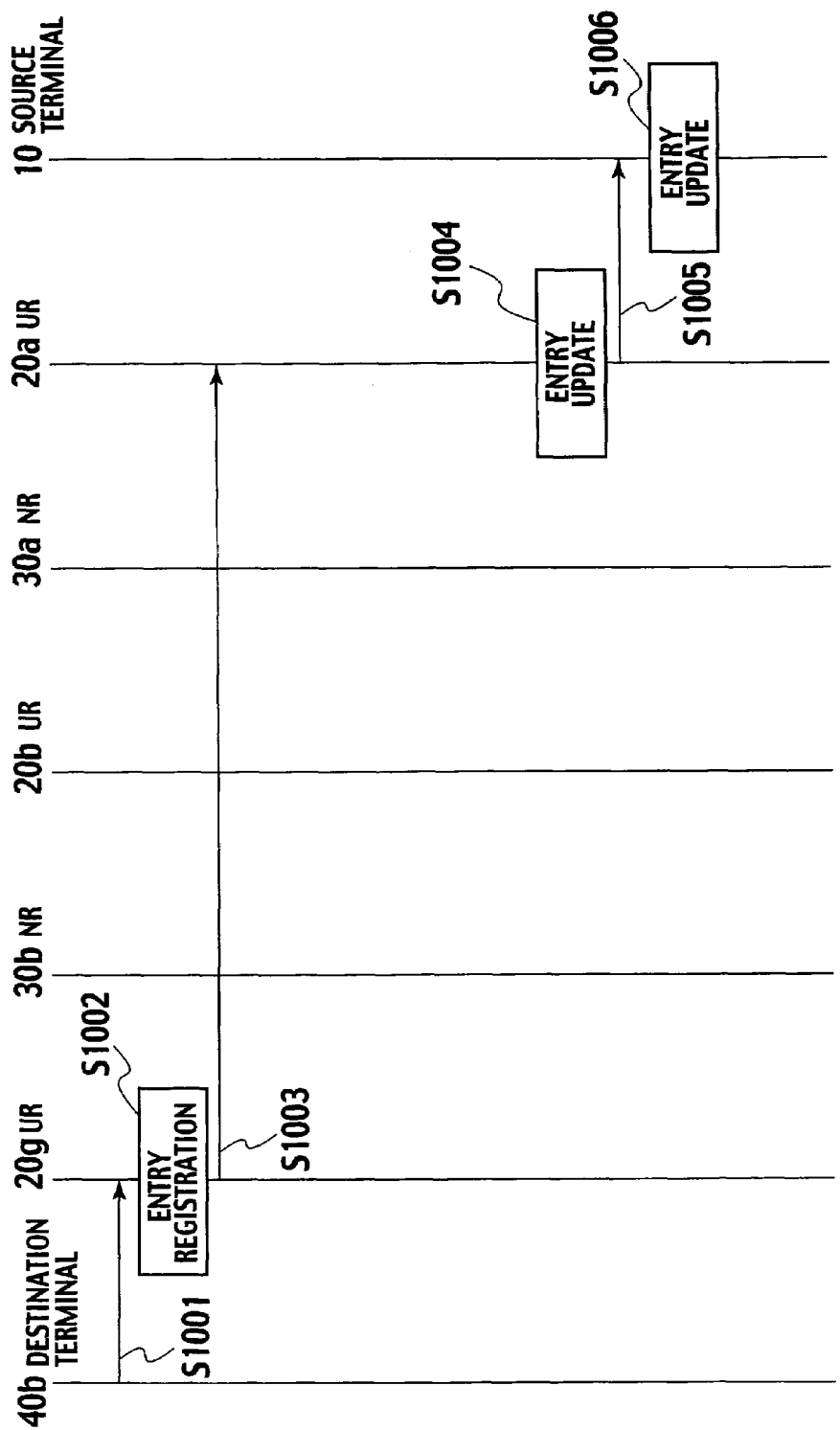
FIG. 26 is a sequence diagram showing the procedures of when a destination terminal joins a multicast tree according to a third embodiment of the present invention.
Figure 27:
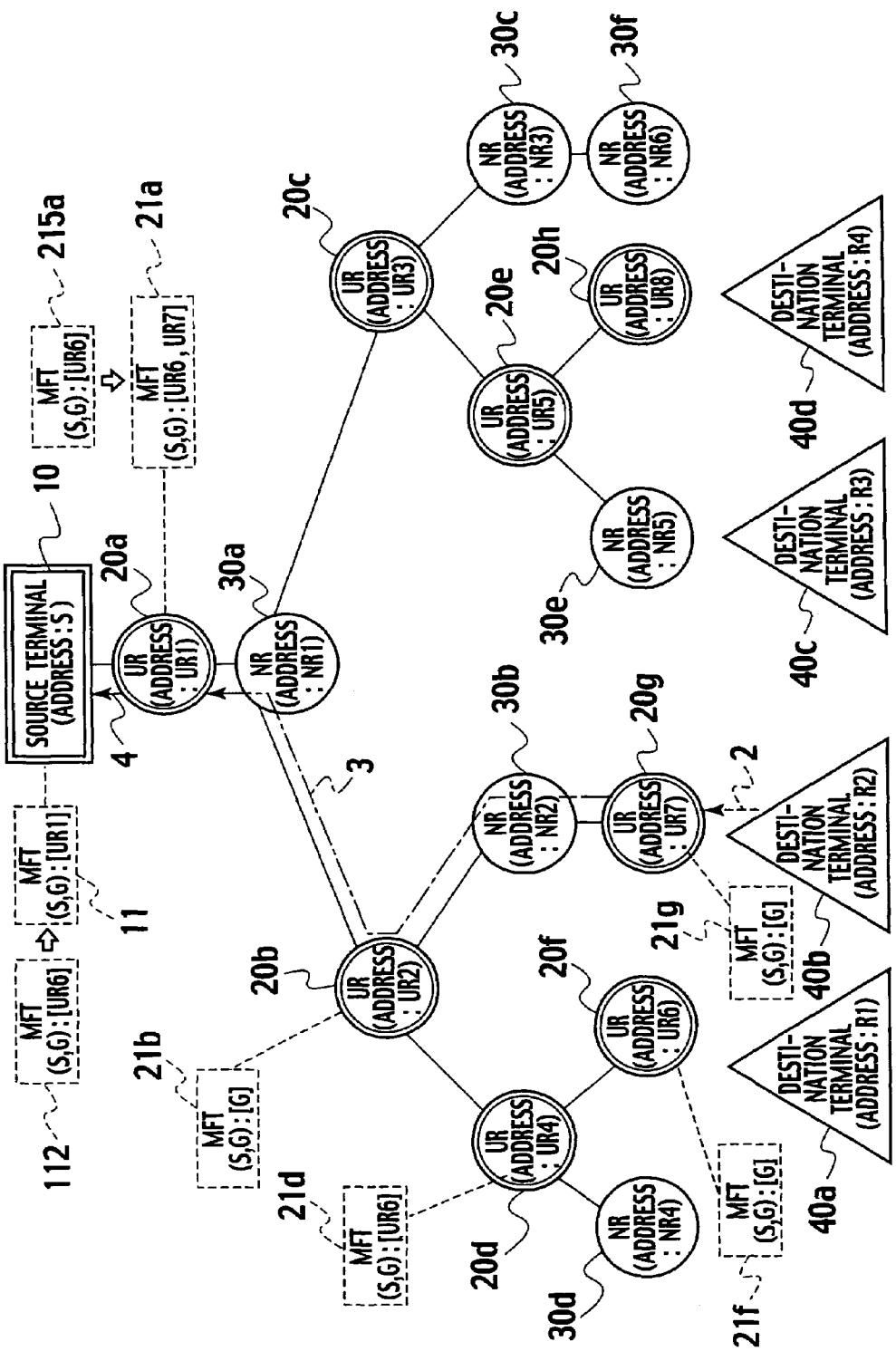
FIG. 27 is a view showing the join of the destination terminal to the multicast tree according to the third embodiment of the present invention.

A description will be given in FIGS. 26 and 27, taking an example of a case where a destination terminal 40b joins a multicast tree when the resource of the UR 20b lacks in a state where a destination terminal 40a has already joined the multicast tree. Note that in FIG. 27 the states of entry holders 11 and 21a before updates are shown as entry holders before update 112 and 215a in order to discriminate the entry holders 11 and 21a between the states before and after the updates.

The destination terminal 40b transmits a Membership Report 2 to the UR 20g, and requests to join the multicast tree (S1001). A message processor 25 of the UR 20g generates an entry associated with a source terminal address "S", a multicast group address "G" and a forwarding address "G" based on the received Membership Report 2, and then registers the entry in an entry holder 21g (S1002).

A message provider 26 of the UR 20g generates a Join message 3, and provides the message to the source terminal address via a forwarder 23. The message provider 26 generates the Join message 3 in which "S" is set as a destination address, "UR7" is set as a source address, and the multicast group address "G" is designated. The forwarder 23 forwards the Join message 3 based on the source terminal address "S" set as the destination address (S1003).

An NR 30b existing between the UR 20g and the UR 20b located upstream of the UR 20g forwards the received Join message 3 by unicast based on the source terminal address "S". Further, since the UR 20b lacks the resource for performing a process based on the received Join message 3, the UR 20b forwards the Join message 3 natively by unicast based on the source terminal address "S". Additionally, an NR 30a existing between the UR 20b and the UR 20a located upstream of the UR 20b forwards the received Join message 3 by unicast based on the source terminal "S".

As a result, the UR 20a receives the Join message 3. A message processor 25 of the UR 20a generates an entry associated with the source terminal address "S", the multicast group address "G" and forwarding addresses "UR6, UR7", based on the received Join message 3 and the entry held by the entry holder 21a in the state shown in the entry holder before update 215a. The message processor 25 updates the entry held by an entry holder 21b from an entry (S, G): [UR6] in an entry holder before update 215b to an entry (S, G): [UR6, UR7], by registering the generated entry in an entry holder 21b (S1004).

A message provider 26 of the UR 20a generates a Redirect message 4 to command the update of the entry held by a source terminal 10, and then provides themes sage to the source terminal address via a forwarder 23 (S1005). The message provider 26 generates the Redirect message 4 which requests the deletion of the address "UR6" of the UR 20f from the forwarding address and the addition of the address "UR1" of the UR 20a to the forwarding address. The source terminal address "S" is set as the destination address of the Redirect message 4.

A message processor 14 of the source terminal 10 updates the entry held by the entry holder 11 from the entry (S, G): [UR6] in the entry holder before update 112 to an entry (S, G): [UR1], based on the received Redirect message 4 (S1006). Due to this, the new multicast tree shown in FIG. 27 is set.

Figure 28:
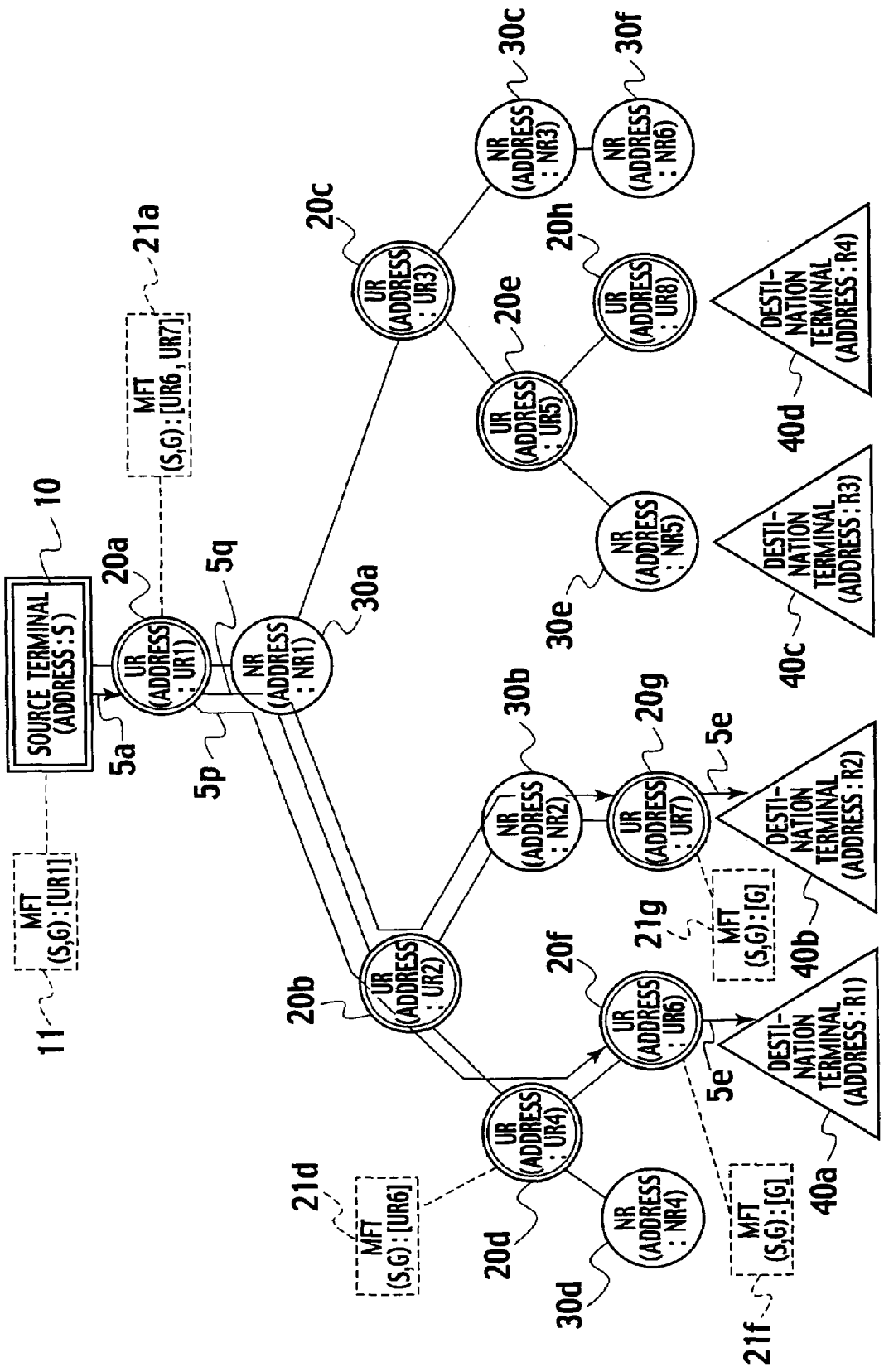
FIG. 28 is a view showing the forwarding of a multicast packet in accordance with a newly set multicast tree according to the third embodiment of the present invention.

A description will be given of the forwarding of a multicast packet in accordance with the multicast tree shown in FIG. 27, with reference to FIG. 28. A packet generator 15 of the source terminal 10 refers to the entry holder 11, sets, in a multicast packet, the source terminal address "S" as a source address and the sending address "UR1" held by the entry holder 11 as a destination address, and encapsulates the multicast packet. Then, a transmitter 13 of the source terminal 10 transmits the encapsulated multicast packet 5a based on its destination address "UR1".

A receiver 22 of the UR 20a decapsulates the encapsulated multicast packet 5a, thus deriving the multicast packet. A forwarding controller 24 of the UR 20a refers to the entry holder 21a. Since there are two forwarding addresses, the forwarding controller 24 of the UR 20a replicates the derived multicast packet to make two copies.

Since the forwarding addresses "UR6, UR7" are different from the destination address "G" of the derived multicast packet, the forwarding controller 24 sets the address "UR1" of the UR 20a itself as a source address. The forwarding controller 24 sets the forwarding address "UR6" as the destination address for one of the multicast packets and sets the destination address "UR7" for the other packet, then encapsulating the multicast packets. Then, the forwarder 23 forwards the encapsulated multicast packets 5p and 5q to the URs 20f and 20g based on their destination addresses "UR6" and "UR7", respectively. The URs 20f and 20g decapsulates the multicast packets 5p and 5q, respectively, and forwards a multicast packets 5e to the destination terminals 40a and 40b by multicast.

According to this, for example, in cases such as the one where resources lack, the URs 20a to 20h can entrust the processing of control messages to other URs by forwarding the control messages natively without processing the control messages. Moreover, by causing a part of the URs to process the control messages, it is possible to aim the scattering of the load in the communication system 1, thus reducing the load of the entire communication system 1.

Fourth Embodiment

Figure 29:
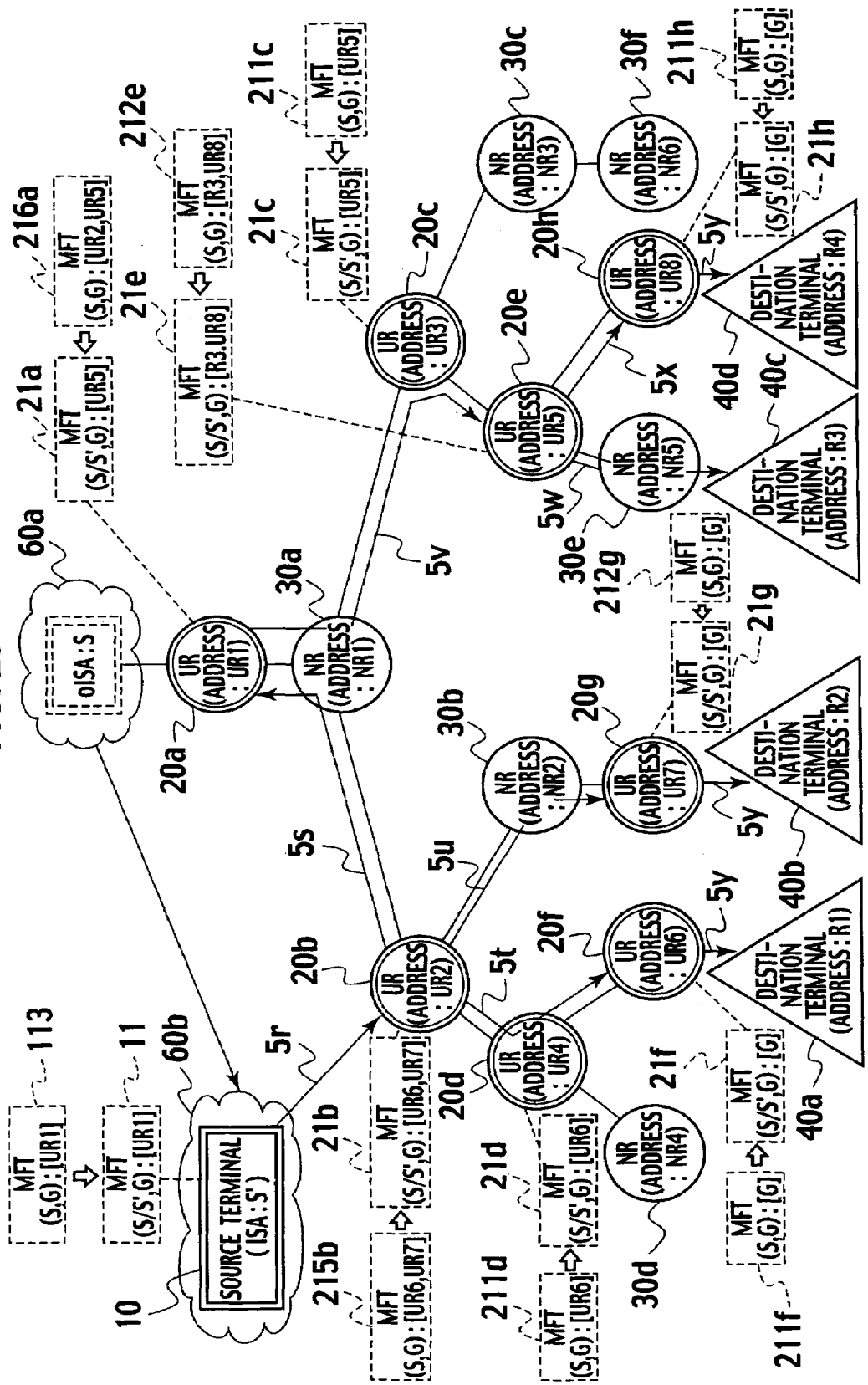
FIG. 29 is a view showing operations in a communication system of when a source terminal moves according to a fourth embodiment of the present invention.

A description will be given of the operations in the communication system 1 of when a source terminal 10 moves from a home network 60a to a foreign network 60b (handover), with reference to FIG. 29. Note that in FIG. 29 the states of entry holders 11 and 21a to 21h before updates are shown as entry holders before update 113, 216a, 215b, 211c, 211d, 212e, 212g, 211f and 211h, respectively, in order to discriminate the entry holders 11 and 21a to 21h between the states before and after the updates.

A consideration will be given to a case where the source terminal 10 moves from the home network 60a to the foreign network 60b, and a source terminal address changes from "S" to "S'". The source terminal address after the change, that is, the address of the current location of the source terminal 10 is hereinafter referred to as an "instantaneous source address (ISA)". The source terminal address before the change is referred to as an "old ISA (oISA)".

For example, the source terminal 10 moves from the home network 60a to the foreign network 60b by use of Mobile IPv6 (handover). Then, the source terminal 10 obtains, for example, a care-of address (CoA) as the ISA "S'" in the foreign network 60b of the destination.

A packet generator 15 of the source terminal 10 generates a multicast packet in which the ISA "S'" is set as a source address and the oISA "S" used in the home network 60a is set as a Home Address option (HAO). In addition, when a source terminal address has changed and there is one sending address held by the source terminal 10, the packet generator 15 sets a special option. The packet generator 15 of the source terminal 10 refers to the entry holder 11 in the state of the entry holder before update 113, thus setting "UR1" as a destination address in accordance with an entry before the move. Then, the packet generator 15 encapsulates the multicast packet. The transmitter 13 forwards the encapsulated multicast packet 5r based on the destination address. Note that when the entry holder 11 holds a plurality of sending addresses, the packet generator 15 does not set a special option and generates an encapsulated multicast packet by use of the plurality of forwarding addresses.

Moreover, a message processor 14 of the source terminal 10 generates an entry associated with the ISA "S'" and the oISA "S", a multicast group address "G" and the sending address "UR1" held by the entry holder before update 113. The message processor 14 registers the generated entry in the entry holder 11, and updates the entry held by the entry holder 11 from an entry (S, G): [UR1] held in the entry holder before update 113 to an entry (S/S', G): [UR1].

The multicast packet 5r transmitted from the source terminal 10 is received by a UR 20b, for example. Since the special option is set, a receiver 22 of the UR 20b decapsulates the multicast packet 5r, and inputs, in a message processor 25, the derived multicast packet and the destination address "UR1" and the source address "S'", the addresses being set in the multicast packet 5r (the addresses being used for the decapsulation).

The message processor 25 generates an entry associated with the ISA "S'" and the oISA "S", the multicast group address "G" and the forwarding addresses "UR6, UR7" held by the entry holder before update 215b, based on the ISA "S'" set as the source address, the oISA "S" set as the HOA, and the entry holder 21b in the state of the entry holder before update 215b.

The message processor 25 registers the generated entry in the entry holder 21b, and updates the entry held by the entry holder 21b from an entry (S, G): [UR6, UR7] held in the entry holder before update 215b to an entry (S/S', G): [UR6, UR7].

The message processor 25 inputs, in a forwarding controller 24, the decapsulated multicast packet and the destination address "UR1" set in the multicast packet 5r.

The forwarding controller 24 sets the destination address "UR1" set in the multicast packet 5r gas the destination address of the derived multicast packet, sets the address "UR2" of the UR 20b as a source address, and encapsulates the multicast packet. A forwarder 23 forwards the encapsulated multicast packet 5s to a UR 20a based on its destination address. When the source terminal address is changed in this manner, the forwarding controller 24 controls the forwarding in a manner of forwarding the multicast packet to the sending address "UR1" before the change of the source terminal 10. Therefore, the forwarder 23 forwards the multicast packet 5s to the UR 20a which is the forwarding source of multicast packets that the UR 20b has heretofore received.

Furthermore, the forwarding controller 24 refers to the entry holder 21b. Since there are two forwarding addresses, the forwarding controller 24 replicates the multicast packet to make two copies. The forwarding addresses "UR6, UR7" are different from the destination address "G" of the derived multicast packet. Hence, the forwarding controller 24 sets the address "UR2" of the UR 20b itself as a source address. The forwarding controller 24 sets the forwarding address "UR6" as a destination address for one of the multicast packets, and sets the destination address "UR7" for the other multicast packet, then encapsulating the multicast packets. Then, the forwarder 23 forwards the encapsulated multicast packets 5t and 5u to the URs 20f and 20g based on their destination addresses "UR6" and "UR7", respectively.

The message processors 25 of URs 20f and 20g update the entry holders 21f and 21g from entries (S, G): [G] in the entry holders before update 211f and 212g to entries (S', G): [G], similarly to the UR 20b. Additionally, a message processor 25 of a UR 20d existing between the URs 20b and 20f, too, updates the entry holder 21d from an entry (S, G): [UR6] in the entry holder before update 211d to an entry (S/S', G): [UR6].

The URs 20f and 20g decapsulate multicast packets 5t and 5u, respectively, and forward a multicast packets 5y, in which the ISA "S'" is set as a source address and the OISA "S" is set as the HAO, to destination terminals 40a and 40b by multicast.

On the other hand, the multicast packet 5s forwarded to "UR1" is received by a receiver 22 of the UR 20a. Since the special option is set, the receiver 22 decapsulates the multicast packet 5s, and inputs, into a message processor 25, the derived multicast packet, and the destination address "UR1" and the source address "UR2", the addresses being set in the multicast packet 5s (the addresses being used for the decapsulation).

The message processor 25 of the UR 20a judges that the UR 20a is not required to forward the multicast packet to "UR2" which is the transmission source of the multicast packet based on the source address "UR2" used for the encapsulation and the entry holder 21a in the state of the entry holder before update 216a. Therefore, the message processor 25 deletes "UR2" from the forwarding address.

Then, the message processor 25 generates an entry associated with the ISA "S'" and the oISA "S", the multicast group address "G" and the forwarding address "UR5", based on the ISA "S'" set as the source address, the oISA "S" set as the HOA, the source address "UR2" used for the encapsulation, and the entry holder 21a in the state of the entry holder before update 216a.

The message processor 25 registers the generated entry in the entry holder 21a, and updates the entry held by the entry holder 21a from an entry (S, G): [UR2, UR5] in the entry holder before update 215a to an entry (S/S', G): [UR5]. The message processor 25 inputs the decapsulated multicast packet into a forwarding controller 24. The forwarding controller 24 of the UR 20a refers to the entry holder 21a after the update, and forwards a multicast packet 5v encapsulated with the forwarding address "UR5" to a UR 20e.

In this manner, the UR 20a forwards the multicast packet 5v to the UR 20e in which the UR 20b to be the forwarding source of the multicast packet 5s is excluded from the forwarding addresses held by the entry holder 21a upon the receipt of the multicast packet 5s.

A message processor 25 of a UR 20c existing between the UR 20a and the UR 20e, too, updates the entry holder 21c from an entry (S, G): [UR5] in the entry holder before update 211c to the entry (S/S', G): [UR5]. A message processor 25 of the UR 20e, too, updates the entry holder 21e from an entry (S, G): [R3, UR8] in the entry holder before update 212e to an entry (S', G): [R3, UR8].

A forwarding controller 24 of the UR 20e forwards, to a destination terminal 40c, an encapsulated multicast packet 5w in which "UR5" is set as a source address and "R3" is set as a destination address in accordance with the entry holder 21e. Moreover, the forwarding controller 24 forwards, to the UR 20h, an encapsulated multicast packet 5x in which "UR5" is set as a source address and "UR8" is set as a destination address. The UR 20h updates the entry held by the entry holder 21h from the entry (S, G): [G] held by the entry holder before update 211h to an entry (S/S', G): [G]. Then, the multicast packet 5y is forwarded to a destination terminal 40d by multicast.

The destination terminals 40a to 40d receive the multicast packets 5y in which the ISA "S'" is set as the source address and the OISA "S" is set as the HAO. Note that the destination terminal 40c derives the multicast packet 5y by decapsulating the multicast packet 5w. In this manner, when receiving multicast packets from the source terminal 10 which has moved to the foreign network 60b, the destination terminals 40a to 40d transmit Membership Reports 2 or Join messages 3 to the ISA "S'". Hence, a multicast tree, in which the ISA "S'" is set to be upstream, is set.

Note that when the destination terminals 40a to 40d move (handover), connections are made before the moves and Leave Group messages 7 are transmitted to the URs 20f, 20g, 20e and 20h which have had multicast packets transmitted. Subsequently, the destination terminals 40a to 40d newly transmit Membership Reports 2 or Join messages 3 in the networks of their destinations.

In a conventional MIP-BT, it is possible to continue communications even if a source terminal moves. However, since a multicast packet travels via a home agent, there has been a problem where a forwarding path becomes redundant. On the other hand, in the communication system 1, even if the source terminal 10 moves, it is possible to set an appropriate multicast tree and transmit a multicast packet. Therefore, it is possible to continue communications in addition to preventing a forwarding path from becoming redundant in the communication system 1. Especially, it is possible to appropriately forward multicast packets to the destination terminals 40a to 40d in the communication system 1 by causing the URs 20a to 20h to detect the move of the source terminal 10 and update the entry holders 21a to 21h. Hence, a necessity that the destination terminals 40a to 40d should detect the move of the source terminal 10 for themselves and the control based on the necessity can be omitted. Accordingly, there is no need to change the functions of the destination terminals 40a to 40d, and thus the load can be reduced.

Fifth Embodiment

Figure 30:
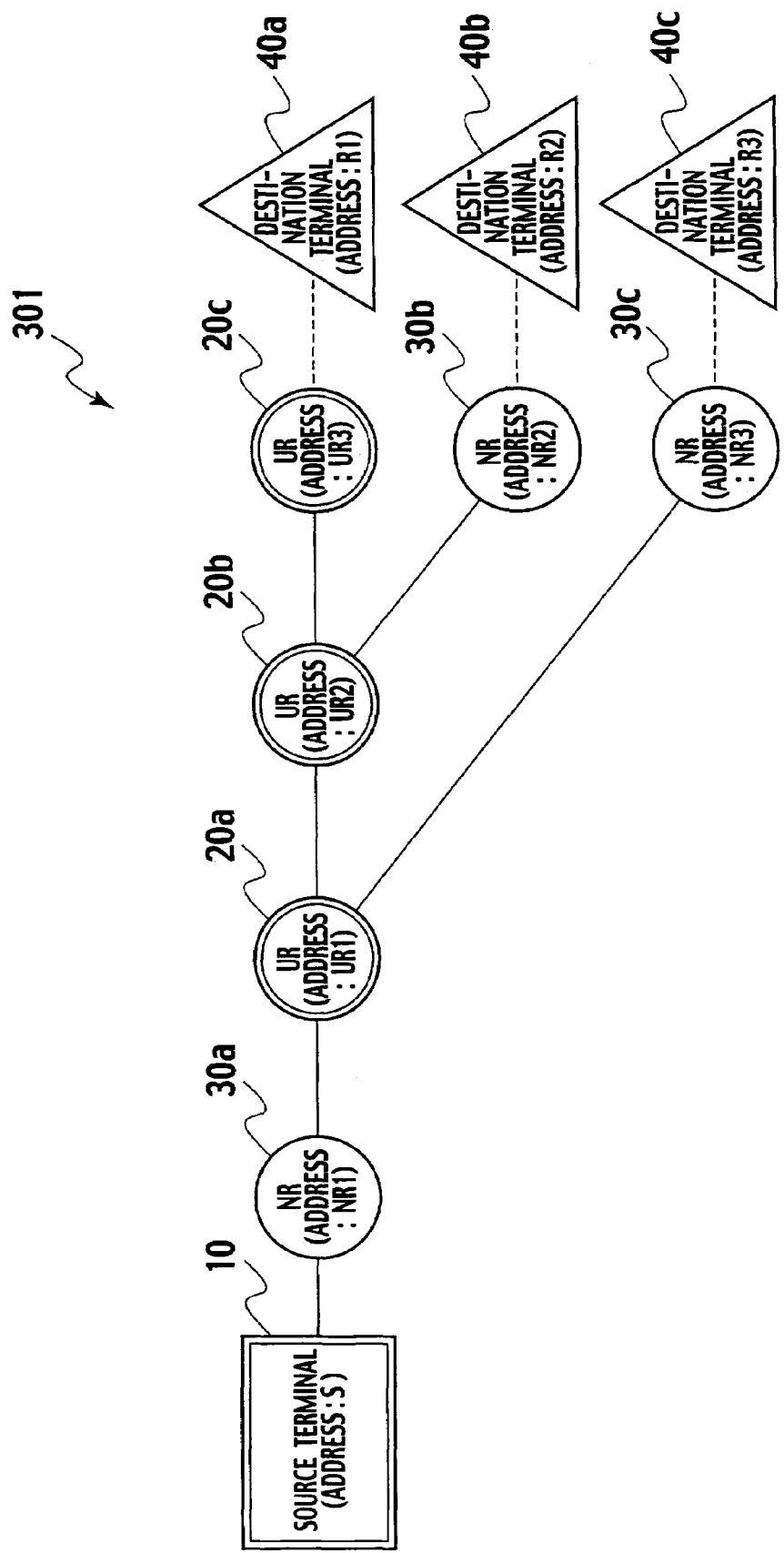
FIG. 30 is a view showing a communication system according to a fifth embodiment of the present invention.

As shown in FIG. 30, a communication system 301 includes a source terminal 10, URs 20a to 20c, NRs 30a to 30c and destination terminals 40a to 40c. Compared with the communication system 1 shown in FIG. 1, the communication system 301 is virtually the same except for the points that the number of the URs, the NRs and the destination terminals are different and that connection relationships between the source terminal 10, the URs 20a to 20c, the NRs 30a to 30c, and the destination terminals 40a to 40c are changed. A description will here in after be given, centering different points from the above-mentioned embodiments. The URs 20a to 20c can be branch routers for forwarding multicast packets to a plurality of forwarding addresses. In this embodiment, multicast packets are forwarded by being encapsulated between the source terminal and the branch router and between the branch routers.

Receivers 22 of the URs 20a to 20c judge whether or not the destination addresses of encapsulated multicast packets correspond to the addresses of the URs 20a to 20c themselves. When corresponding to the addresses of the URs 20a to 20c themselves, since the UR 20a is a branch router, the receivers 22 input the multicast packets into forwarding controllers 24. When not corresponding to these conditions, the receivers 22 input the multicast packets into forwarders 23.

In addition, message processors 25 of the URs 20a to 20c function as judgment sections for judging whether or not the URs become branch routers when assuming that a source terminal address is upstream in a multicast tree. The message processors 25 make judgments based on control messages and forwarding addresses held by entry holders 21a to 21c. Moreover, when having judged that the URs become branch routers, the message processors 25 function also as forwarding destination registers for registering, in forwarding destination holders, a plurality of forwarding addresses associated with the source terminal address. Specifically, when having judged that the URs 20a to 20c become the branch routers, the message processors 25 generate MFT entries in the entry holders 21a to 21c, and register the forwarding addresses.

Furthermore, the message processors 25 delete the forwarding addresses of branch routers downstream of the routers 20a to 20c themselves from the entry holders 21a to 21c, based on the Redirect messages 4 (join/leave request messages) from the downstream branch routers, thus registering the addresses of the downstream branch routers in the entry holders 21a to 21c. Due to this, an appropriate multicast tree, in which multicast packets are forwarded from the source terminal 10 to the destination terminals 40a to 40c via a plurality of branch routers, is set.

Note that the message processors 25 generate MFT entries and register forwarding addresses associated with the source terminal address and a multicast group address, when having judged that the URs 20a to 20c become the branch routers, in addition to when the URs 20a to 20c become edge routers connecting to the destination terminals 40a to 40c. Due to this, an appropriate multicast tree, in which multicast packets are forwarded from the source terminal 10 to the destination terminals 40a to 40c via the branch and edge routers, is set. The message processors 25 generate MCT entries and register forwarding addresses except for when the URs 20a to 20c become the branch or edge routers.

Moreover, the message processors 25 judge whether to transmit received control messages natively based on whether or not the URs 20a to 20c become the branch routers, or to generate and transmit new control messages based on the received control messages. When the URs 20a to 20c do not become the branch routers, the message processors 25 judge to transmit the messages natively, and input the received control messages into the forwarders 23. When the URs 20a to 20c become the branch routers, the message processors 25 judge to newly generate control messages, and input the received control messages into message providers 26.

The message providers 26 generate control messages. The message providers 26 generate the control messages based on the control messages received by the URs 20a to 20c, the messages being obtained from the message processors 25, and on the information held by the entry holders 21a to 21c. The message providers 26 input the generated control messages into the forwarders 23.

An entry holder 11 of the source terminal 10 holds any address of the branch router, the edge router and the destination terminal as a sending address. A message processor 14 functions as a sending destination register for deleting the forwarding address of the branch router from a sending destination holder based on a Redirect message to be a join/leave message, and for registering the address of the branch router in the sending destination holder.

Next, a detailed description will be given of the setting of a multicast tree in the communication system 301, by use of FIGS. 31 to 34. As described above, there are initial and stable states in a multicast tree. Hence, the description will be given while dividing the processing into the one in the initial state and the one in the stable state.

(Initial State)

Figure 31:
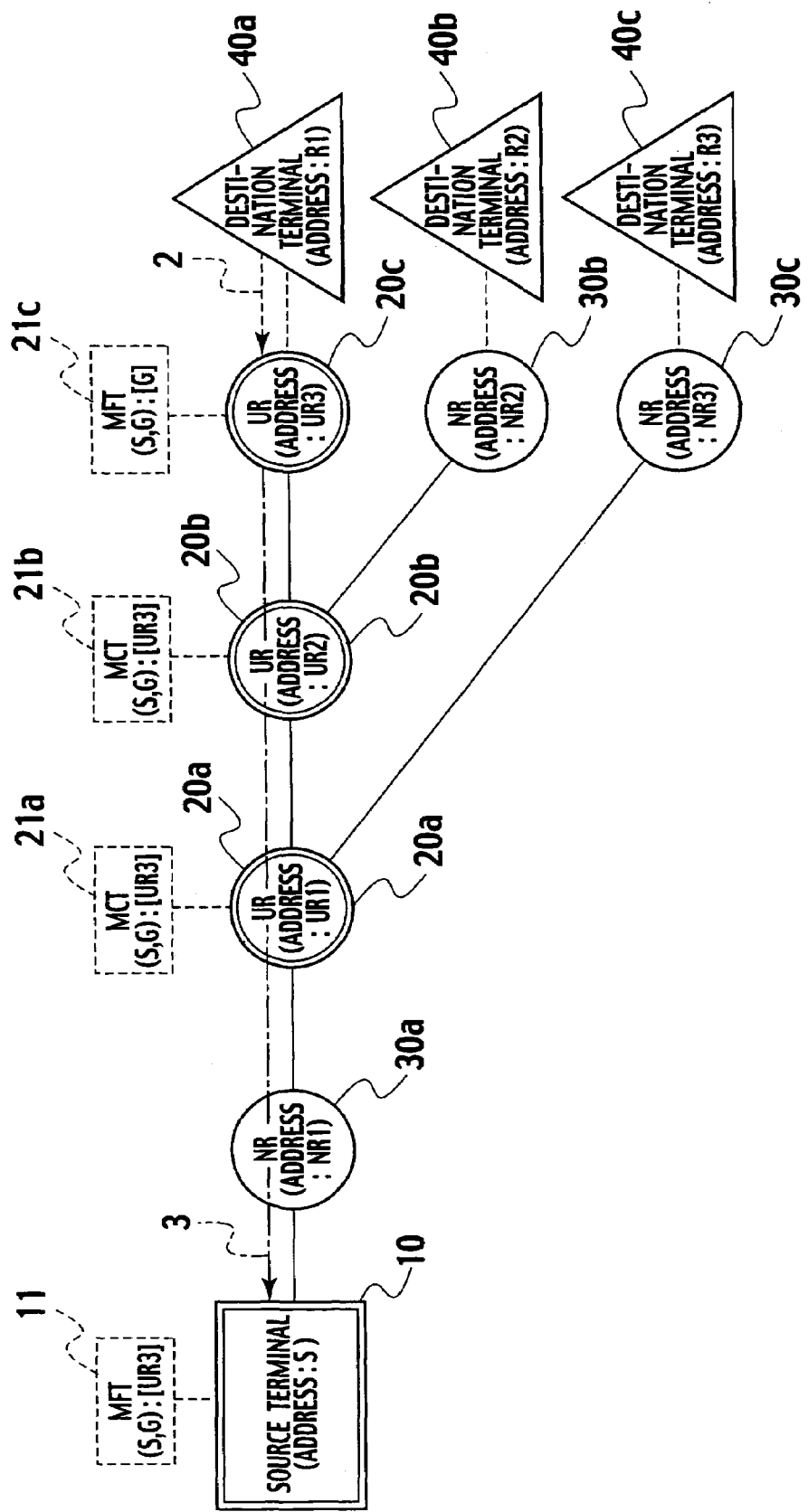
FIG. 31 is a view showing processing in an initial state of a multicast tree according to the fifth embodiment of the present invention.

In the initial state, the entry holders 11 and 21a to 21c do not hold sending addresses and forwarding addresses. As shown in FIG. 31, when desiring to start receiving a multicast packet transmitted by the source terminal 10, the destination terminal 40a requests the transmission of the multicast packet. When a router to which the destination terminal 40a is connecting via the radio link is a UR, the destination terminal 40a can request the transmission in accordance with the MLDv2. Specifically, the destination terminal 40a transmits a Membership Report 2 to the UR 20c.

The destination terminal 40a requests the transmission of a multicast packet identified with a source terminal address "S" and a multicast group address "G", that is, (S, G), by use of the Membership Report 2. The Membership Report 2, in which the multicast group address "G" is set as a destination address and the address "R1" of the destination terminal 40a is set as a source address, contains the designation of the multicast group address "G".

The UR 20c existing most downstream of a path from the destination terminal 40a to the source terminal 10 receives the Membership Report 2. The message processor 25 of the UR 20c generates an MFT entry in the entry holder 21c, since the UR 20c is an edge router connecting to the destination terminal 40a. The message processor 25 registers (S, G): [G] in the MFT entry. The message processor 25 activates a JT relating to the KAT of the forwarding address "G" and (S, G).

The message processor 25 of the UR 20c inputs the received Membership Report 2 in the message provider 26. The message provider 26 of the UR 20c generates a Join message 3 to request the source terminal 10 for the transmission of the multicast packet, which has been requested by the destination terminal 40a by use of the Membership Report 2. Specifically, the message provider 26 sets the source terminal address "S" as a destination address, sets the address "UR3" of the UR 20c as a source address, and then generates the Join message 3 designating the multicast group address "G".

The message provider 26 of the UR 20c inputs the generated Join message 3 in the forwarder 23, and the forwarder 23 of the UR 20c transmits the Join message 3 to the source terminal 10. Due to this, the UR 20c can forward the Join message 3 also to the more upstream URs 20b and 20a.

The UR 20b existing on a path from the UR 20c to the source terminal 10 receives the Join message 3. The message processor 25 of the UR 20b refers to the entry holder 21b. Since the entry holder 21b is not holding a forwarding address, the message processor 25 judges that the number of forwarding address that the UR 20b forwards the multicast packet is one, the number being to be determined by the received Join message 3. Therefore, the message processor 25 judges that the UR 20b does not become the branch router.

Accordingly, the message processor 25 of the UR 20b generates an MCT entry in the entry holder 21b. The message processor 25 judges that "UR3" set as the source address in the Join message 3 is a forwarding address, thus registering (S, G): [UR3] in the MCT entry. The message processor 25 activates the KAT of the forwarding address "UR3". In this manner, a UR which is not a branch router, too, is caused to hold an MCT in the initial state. Additionally, the message processor 25 inputs the received Join message 3 natively into the forwarder 23. The forwarder 23 of the UR 20b transmits the Join message 3 to the source terminal 10, thus forwarding the Join message to the more upstream UR 20a.

Then, The UR 20a existing more upstream on the path from the UR 20c to the source terminal 10 receives the Join message 3. The message processor 25 of the UR 20a generates an MCT entry in the entry holder 21a similarly to the UR 20b, registers (S, G): [UR3] in the MCT entry, and activates the KAT of the forwarding address "UR3". The NR 30a cannot interpret a special option, and therefore forwards the Join message 3 to the source terminal 10 as a normal unicast packet.

Finally, the source terminal 10 receives the Join message 3. The message processor 14 generates an MFT entry in the entry holder 11. The message processor 14 judges that "UR3" set as the source address of the Join message 3 is a sending address, and registers (S, G): [UR3] in the MFT entry. The message processor 25 activates the KAT of the sending address "UR3".

With the foregoing processing, the multicast tree, in which the multicast packet is forwarded from the most upstream source terminal 10 to the destination terminal 40a via the UR 20c to be the edge router, is set. When desiring to start the receipt of the multicast packet transmitted by the source terminal 10 in the state shown in FIG. 31 where the destination terminal 40a is joining the multicast tree identified with this (S, G), the destination terminal 40b joins the multicast tree as shown in FIG. 32.

Figure 32:
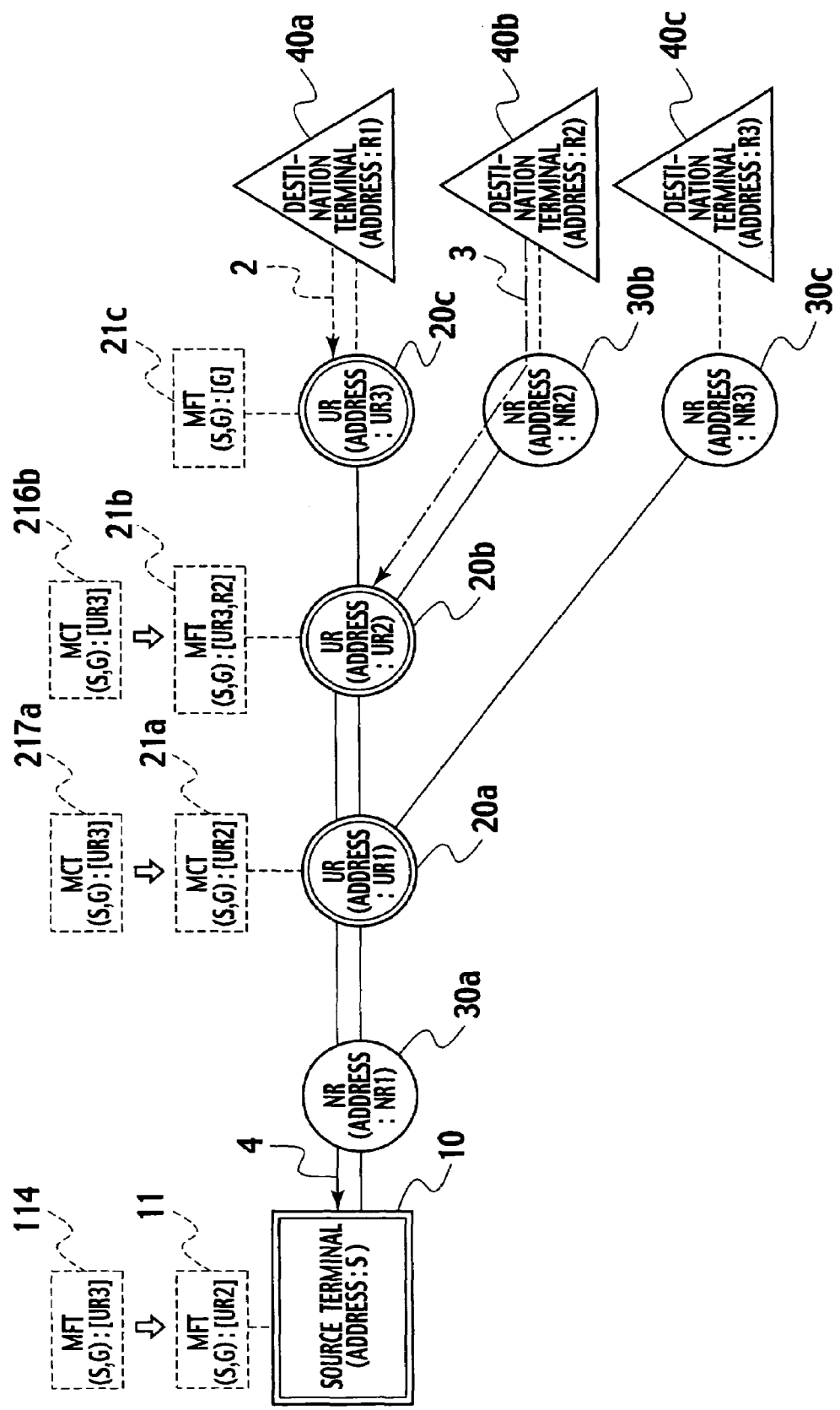
FIG. 32 is a view showing a join of a destination terminal to the multicast tree in the initial state according to the fifth embodiment of the present invention.

Note that the states of the entry holders 11, 21a and 21b in FIG. 31 are illustrated as entry holders before update 114, 217a and 216b in FIG. 32, in order to discriminate the entry holders 11, 21a and 21b between the state in FIG. 31 where only the destination terminal 40a is joining and the state in FIG. 32 where the destination terminal 40b has joined.

Initially, since the destination terminal 40b is connecting to the NR 30b, it is detected that a router to which the destination terminal 40b is connecting via the radio link is a NR. Therefore, the destination terminal 40b transmits a Join message 3 which requests the join to the multicast tree identified with (S, G). Since the special option is set in the Join message 3, the NR 30b does not discard the Join message 3, thus making it possible for the UR 20b existing on a path from the destination terminal 40b to the source terminal 10 to receive the Join message 3. The destination terminal 40b sets the source terminal address "S" as a destination address, and sets the address "R2" of the destination terminal 40b as a source address, and then transmits the Join message 3 designating the multicast group address "G".

The UR 20b existing most downstream on the path from the destination terminal 40b to the source terminal 10 among the URs receives the Join message 3. The message processor 25 of the UR 20b refers to the entry holder before update 216b of the UR 20b. The entry holder before update 216b holding the MCT entry is different from "UR3" already held as the forwarding address which corresponds to (S, G) and the source address "R2" of the received Join message 3 relating to (S, G). Hence, the message processor judges that the number of the forwarding address to which the UR 20b forwards the multicast packet identified with (S, G) is plural, that is, "UR3" and "R2". Therefore, the message processor 25 judges that the UR 20b becomes a branch router. In this manner, an MCT entry is used in the initial state to judge whether or not a UR becomes a branch router.

The message processor 25 of the UR 20b which has judged to be the branch router deletes the MCT entry from the entry holder before update 216b, and then generates a new MCT entry. The message processor 25 registers (S, G): [UR3, R2] in the MFT entry of the entry holder 21b based on the information held by the entry holder before update 216b and the received Join message 3. Then, the message processor 25 copies the KAT of the forwarding address "UR3" used in the MCT entry. Further, the message processor 25 activates the KAT of the forwarding address "R2" and a JT relating (S, G). In addition, the message processor 25 inputs the received Join message 3 into the message provider 26 of the UR 20b.

The message provider 26 of the UR 20b generates a Redirect message 4 based on the forwarding addresses held by the entry holder 21b and the received Join message 3. After the generation of the Redirect message 4, the message provider 26 discards the received Join message 3. The message provider 26 of the UR 20b generates the Redirect message 4 including: a Join message which requests the addition of the address "UR2" of the UR 20b, which becomes the branch router, to the sending address; and a Prune message which requests the deletion of the forwarding addresses "UR3" and "R2" of the UR 20b, which is the branch router, from the sending address.

Furthermore, the message provider 26 sets the Redirect message 4 in a manner that the source terminal address "S" is set as a destination address, the address "UR2" of the UR 20b is set as a source address, and the multicast group address "G" is designated. Subsequently, the message provider 26 of the UR 20b inputs the generated Redirect message 4 into the forwarder 23, and the forwarder 23 of the UR 20b transmits the Redirect message 4 to the source terminal 10. Accordingly, the UR 20b can forward the Redirect message 4 also to the more upstream UR 20a. In this manner, the forwarder 23 functions as a router message provider for providing, to a transmission address, a join/leave message which requests the addition of the address of a branch router to a sending address and the deletion of the forwarding address of the branch router from the sending address.

Then, the UR 20a existing on the path from the UR 20b to the source terminal 10 receives the Redirect message 4. The message processor 25 of the UR 20a updates the entry holder 21a in accordance with the Redirect message 4. Specifically, among "UR3" and "R2", which are commanded to be deleted from the MCT entry of the entry holder before update 217a, the message processor 25 deletes "UR3" held as the forwarding address and its KAT, and registers "UR2" commanded to be added in the MCT entry as a forwarding address. The message processor 25 activates the KAT of the forwarding address "UR2". Due to this, the MCT entry of the entry holder 21a is updated to (S, G): [UR2]. In this manner, the URs located more upstream of the branch router, too, add the address of the branch router included in the Redirect message 4 to the forwarding address, and delete the forwarding address of the branch router from the forwarding address.

Additionally, the message processor 25 inputs the received Redirect message 4 natively into the forwarder 23. Then, the forwarder 23 of the UR 20a transmits the Redirect message 4 to the source terminal 10, and the NR 30a forwards the Redirect message 4 to the source terminal 10 as a unicast packet.

Lastly, the source terminal 10 receives the Redirect message 4. The message processor 14 updates the entry holder 11 in accordance with the Redirect message 4. Specifically, among "UR3" and "R2", which are commanded to be deleted from the MFT entry of the entry holder before update 114, the message processor 14 deletes "UR3" held as the sending address and its KAT, and registers the address "UR2" of the branch router commanded to be added in the MFT entry as a sending address. The message processor 14 activates the KAT of the sending address "UR2". Due to this, the MFT entry of the entry holder 11 is updated to (S, G): [UR2]. In this manner, the message processor 14 functions as a sending destination register for deleting the forwarding address of the branch router from the sending destination holder based on the join/leave message and for registering the address of the branch router in the sending destination holder.

With the foregoing processing, the multicast packet is forwarded from the most upstream source terminal 10 to the destination terminal 40a via the UR 20b to have become the branch router and the UR 20c to be the edge router, and the multicast tree in which the multicast packet is forwarded to the destination terminal 40b via the UR 20b is set. In this manner, new destination terminals join a multicast tree one after another in the initial state of the multicast tree. Further, whenever a new destination terminal joins, a multicast tree is to be changed and set.

The destination terminal 40b, the UR 20c to have become the edge router, and the UR 20b to have become the branch router regularly transmit Join messages 3 to the UR 20b to be the branch router and the source terminal 10, respectively.

Additionally, the destination terminal 40a regularly transmits a Membership Report 2 to the UR 20c to be the edge router. The sending and forwarding addresses of the entry holders 11 and 21a to 21c are maintained, by causing the source terminal 10 and the UR 20b to receive the Join messages 3, and by causing the UR 20c to receive the Membership report 2.

Specifically, the message provider 26 of the UR 26b to have become the branch router refers to the entry holder 21b. When the JT is expired, the message provider 26 of the UR 20b generates a Join message 3 in which the destination address is the source terminal address "S" and the source address is "UR2". Then, the forwarder 23 of the UR 20b transmits the generated Join message 3. The message processor 14 of the source terminal 10 refers to the entry holder 11. When the KAT of the sending address "UR2" is expired, the message processor 14 deletes the sending address "UR2" corresponding to (S, G) from the entry holder 11. On the other hand, when a receiver 12 receives the Join message 3 whose source address is "UR2" from the UR 20b to be the branch router within a holding time when the KAT of the sending address "UR2" is expired, the message processor 14 reactivates the KAT of the sending address "UR2", thus extending the holding time.

Moreover, similarly to the UR 20b, the UR 20c to have become the edge router, too, transmits a Join message 3 in which the destination address is the source terminal address "S" and the source address is "UR3", if there is even one forwarding address in which the KAT is not expired when the JT is expired. The destination terminal 40b, too, transmits a Join message 3 in which the destination address is the source address "S" and the source address is "R2".

The message processor 25 of the UR 20b to have become the branch router refers to the entry holder 21b. When the KAT of the forwarding address "UR3" is expired, the message processor 25 deletes the MFT entry of the entry holder 21b, generates an MCT entry, and registers the forwarding address "R2". The message processor 25 judges that the UR 20b has changed from the branch router to a router which is not the branch router (hereinafter, referred to as a "non-branch router") since the number of the forwarding address has become one, that is, "R2". Then, the message processor 25 commands the message provider 26 to generate a Redirect message 4. Subsequently, the message provider 26 generates a Redirect message 4 which requests: the addition of the forwarding address "R2" of the UR 20b, which has become the non-branch router, to the sending address; and the deletion of the address "UR2" of the UR 20b, which has become the non-branch router, from the sending address. Then, the forwarder 23 transmits the Redirect message 4 to the source terminal address "S".

In this manner, the message processor 25 judges whether or not the UR is to change from a branch router to a non-branch router. Then, the forwarder 23 transmits, to the source terminal address, a join/leave request message which requests the addition of the forwarding address of a non-branch router to a sending address and the deletion of the address of the non-branch router from the sending address, when the message processor 25h as judged that the UR changes to the non-branch router. Due to this, the communication system 301 can change the multicast tree to an appropriate multicast tree, even when the UR which became a branch router once has become a non-branch router.

Next, the message processor 25 of the UR 20b deletes the MCT entry in which the forwarding address "R2" is registered from the entry holder 21b, when the KAT of the forwarding address "R2" is expired. On the other hand, the message processor 25 of the UR 20b reactivates the KATs of the forwarding addresses "UR3" and "R2" and extends the holding times, when the receiver 22 of the UR 20b receives Join messages 3 whose source addresses are "UR3" and "R2" from the UR 20c to be the edge router and the destination terminal 40b before the KATs of the forwarding addresses "UR3" and "R2" are expired. Note that when the message processor 25 of the UR 20c refers to the entry holder 21c and the KAT of the forwarding address "G" is expired, the message processor 25 of the UR 20c to be the edge router, too, deletes the forwarding address "G" corresponding to (S, G) from the MFT entry of the entry holder 21c, similarly to the UR 20b. In addition, the message processor 25 of the UR 20c reactivates the KAT of the forwarding address "G", when the receiver 22 of the UR 20c receives a Membership Report 2 from the destination terminal 40a.

The multicast tree is maintained in the initial state in this manner. Further, a Join message 3 and a Membership Report 4 can function as maintenance request messages for maintaining the multicast tree.

(Stable State)

A description will be given of the processing after shifting to the stable state with reference to FIG. 33, taking an example of a case where the multicast tree has shifted to the stable state in the state shown in FIG. 32. Note that the state of the entry holder 21a in FIG. 32 is illustrated as an entry holder before update 218a in FIG. 33 in order to discriminate the entry holder 21a between the state in FIG. 32 and the state after shifting to the stable state.

When the multicast tree has shifted to the stable state, a packet generator 15 of the source terminal 10 generates a multicast packet in which a Stable option showing the shift to the stable state is set, thus transmitting the packet by transmitter 13. Due to this, the source terminal 10 notifies the destination terminals 40a and 40b which are joining that the multicast tree has shifted to the stable state. After the destination terminals 40a and 40b receive multicast packets in which the Stable options are set, the destination terminal 40a transmits a Stable Membership Report and the destination terminal 40b transmits a Stable Join message 3a. For example, after receiving the multicast packet in which the Stable option is set, the destination terminal 40b transmits a Stable Join message 3a in which the destination address is the source terminal address "S" and the source address is "R2".

Then, after receiving the Stable Join messages 3a from the destination terminals 40a and 40b, or the downstream URs, the URs 20b and 20c transmit Stable Join messages 3a. For example, if there is even one forwarding address in which the KAT is not expired when the JT is expired, the message provider 26 of the UR 20c to be the edge router generates a Stable Join message 3a in which the destination address is the source terminal address "S", the source address is "UR3", and "G" is designated as a multicast group address. The forwarder 23 of the UR 20c transmits the generated Stable Join message 3a.

Then, the UR 20b existing on the path from the UR 20c to the source terminal 10 receives the Stable Join message 3a from the UR 20c. The message processor 25 of the UR 20b refers to the entry holder 21b, thus judging that the entry holding the source address of the received Stable Join message 3a as a forwarding address is either an MFT or an MCT entry. When an MFT entry is holding the source address of the Stable Join message 3a as a forwarding address, the message processor 25 extends the holding time. When an MCT entry is holding the source address of the Stable Join message 3a as a forwarding address, themes sage processor 25 does not extend the holding time. Note that when the MFT entry is holding the source address of the Stable Join message 3a as a forwarding address, the UR 20b has naturally received the Stable Join message 3a before the KAT of the forwarding address is expired, that is, within the holding time.

Since the MFT entry of the entry holder 21b is holding the source address "UR3" of the received Stable Join message as the forwarding address, the message processor 25 of the UR 20b reactivates the KAT of the forwarding address "UR3", thus extending the holding time. Similarly, the UR 20b existing on the path from the destination terminal 40b to the source terminal 10 receives the Stable Join message 3a from the destination terminal 40b. Subsequently, since the MFT entry of the entry holder 21b is holding the source address "R2" of the received Stable Join message 3a as a forwarding address, the message processor 25 of the UR 20b reactivates the KAT of the forwarding address "R2", thus extending the holding time.

In addition, the message processor 25 of the UR 20b commands the message provider 26 to set a Stable option in Join messages to be hereinafter generated. Then, if there is even one forwarding address in which the KAT is not expired when the JT is expired, the message provider 26 of the UR 20b generates a Stable Join 3a message in which the destination address is the source terminal address "S", the source address is "UR2", and "G" is designated as a multicast group address. Subsequently, the forwarder 23 of the UR 20b transmits the generated Stable Join message 3a. In this manner, the branch router itself, too, transmits a Stable Join message 3a after receiving a Stable Join message 3a.

Then, the UR 20a existing on the path from the UR 20b to the source terminal 10 receives the Stable Join message 3a. The message processor 25 of the UR 20a refers to an entry holder before update 211a. The entry holder before update 211a is holding an MCT entry alone and also the forwarding address registered in the MCT entry is the same as the source address "UR2" of the received Stable Join message 3a. Therefore, the message processor 25 does not reactivate the KAT of the forwarding address "UR2", and the holding time is not extended. In this manner, a Stable Join message 3a is not used to reactivate the KAT of a forwarding address held by an MCT entry.

Moreover, the message processor 25 of the UR 20a inputs the Stable Join message 3a natively into the forwarder 23. The forwarder 23 of the UR 20a transmits the Stable Join message 3a to the source terminal 10, and the NR 30a forwards the Stable Join message 3a as a unicast packet to the source terminal 10.

Since the KAT of the forwarding address "UR3" held by the entry holder before update 218a is not reactivated, the KAT is expired. The message processor 25 of the UR 20a deletes the forwarding address "UR2" in which the KAT is expired, from the entry holder before update 218a. As a result, the entry holder 21a is caused to discard the MCT entry and update itself to a state of holding no forwarding address.

Lastly, the source terminal 10 receives the Stable Join message 3a. Since the entry holder 11 holds the source address "UR2" of the received Stable Join message 3a as a sending address, the message processor 14 reactivates the KAT of the sending address "UR2", thus extending the holding time. Note that the message processor 25 of the UR 20c reactivates the KAT of the forwarding address "G" held by the entry holder 21c of the UR 20c to be the edge router, when the UR 20c receives a Membership Report, similarly to a case of the maintenance of the multicast tree in the initial state.

In this manner, only forwarding addresses held by the MFT entries of the entry holders 21a to 21c are held, and forwarding addresses held by the MCT entries are deleted in the communication system 301 after the shift to the stable state, by utilizing Stable Join messages 3a used only for the extension of the holding time of the forwarding addresses held by the MFT entries of the entry holders 21a to 21c. Due to this, the URs 20a to 20c can continue to hold the forwarding addresses and maintain the multicast tree in the stable state, only when the MFT entries of the entry holders 21a to 21c are branch or edge routers which hold the forwarding addresses.

An MCT is used for the setting of a multicast tree, more specifically, is used to judge whether or not the UR becomes a branch router. Hence, an MCT is useful in the initial state of a multicast tree where destination terminals frequently join. However, after the multicast tree has shifted to the stable state, the number of destination terminals which newly join the multicast tree decreases. Accordingly, the number of chances to judge whether or not the UR becomes a branch router decreases, and thus the number of chances to utilize the MCT entries also decreases. Therefore, the forwarding addresses held by the MCT entries are held only in the initial state, and are deleted after the multicast tree has shifted to the stable state. Thus, the loads on the URs except the branch and edge routers can be further reduced.

Figure 33:
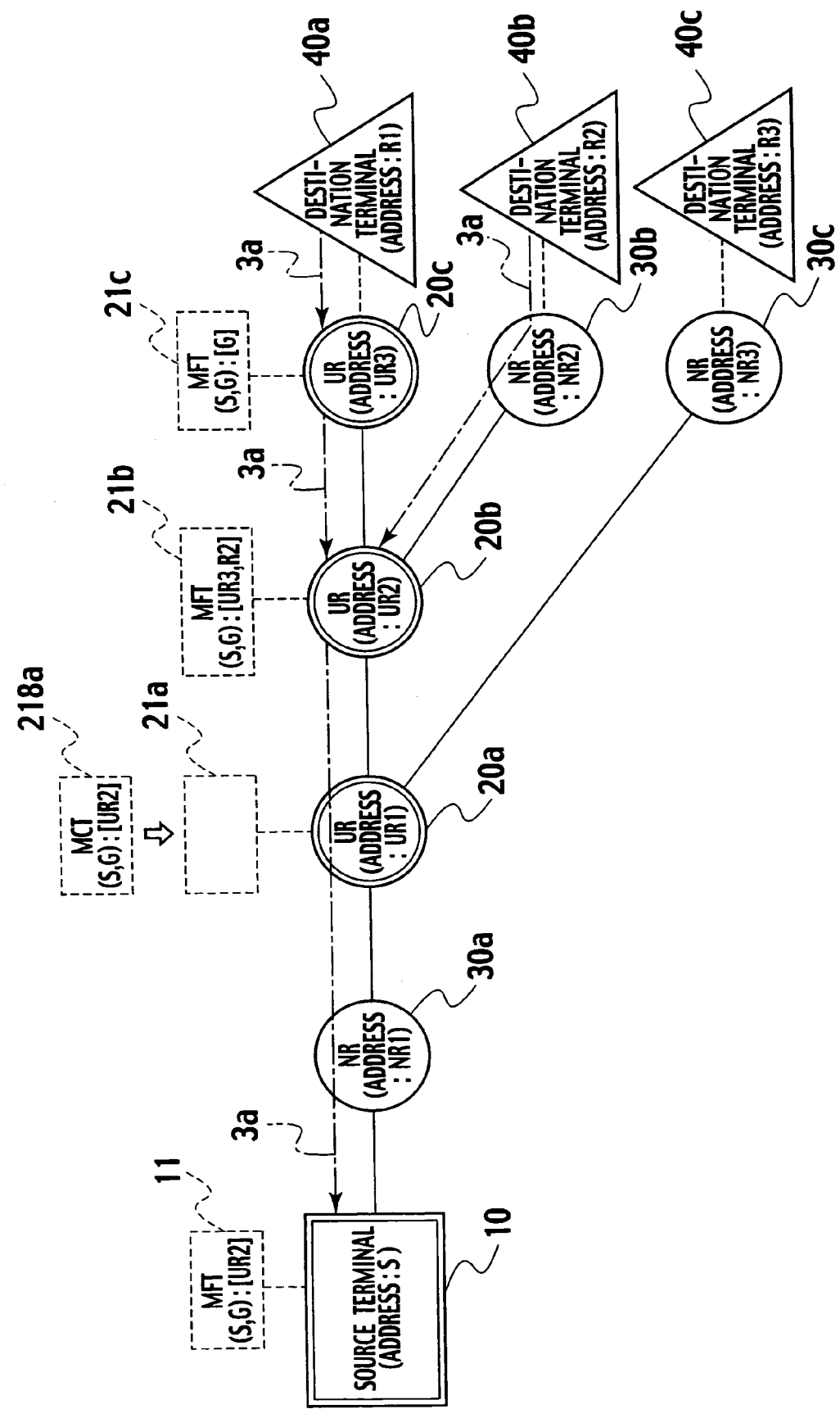
FIG. 33 is a view showing processing in a stable state of the multicast tree according to the fifth embodiment of the present invention.
Figure 34:
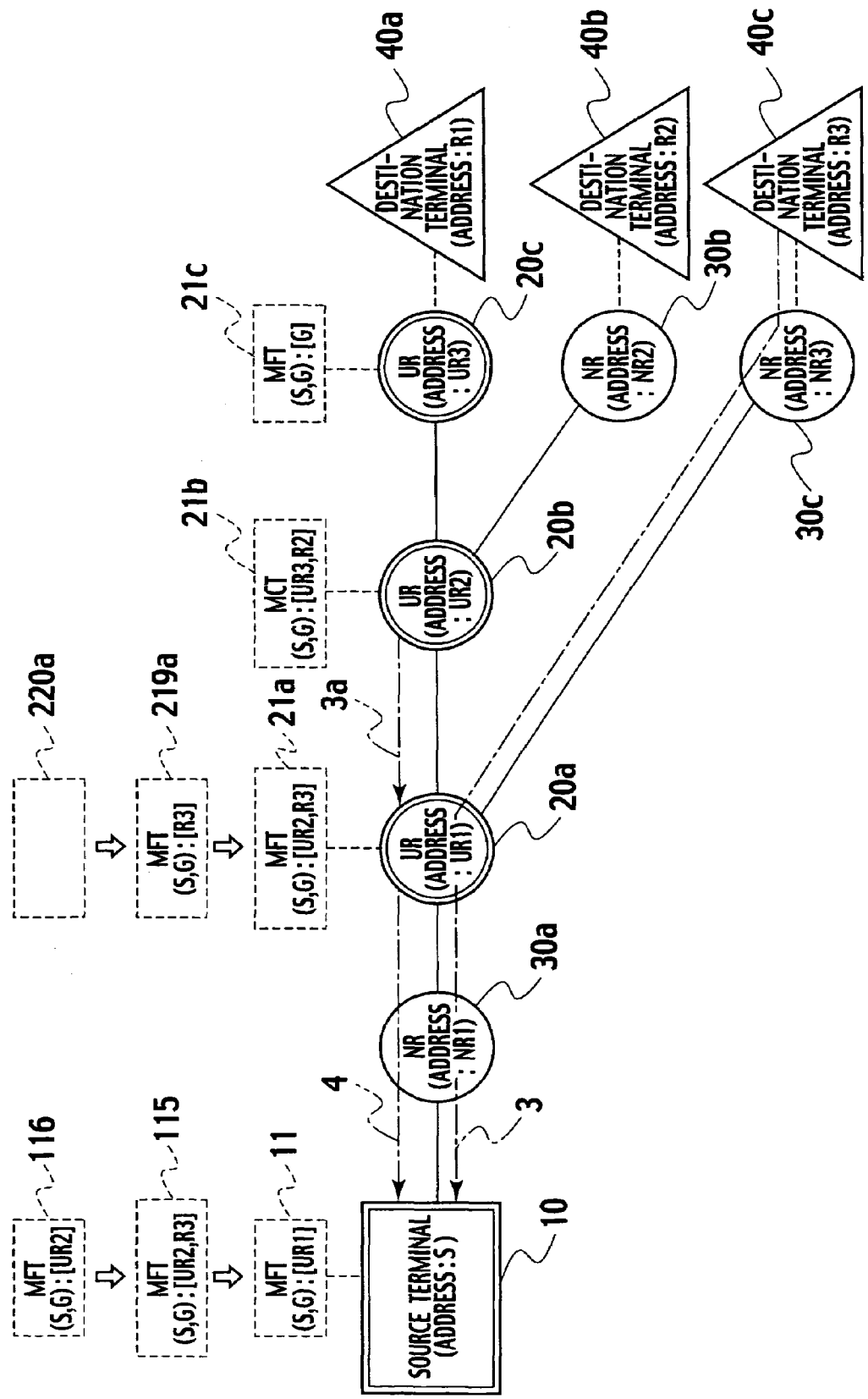
FIG. 34 is a view showing a join of the destination terminal to the multicast tree in the stable state according to the fifth embodiment of the present invention.

In the state shown in FIG. 33 where the multicast tree has shifted to the stable state and also the forwarding address held by the MCT entry is deleted, the destination terminal 40c joins the multicast tree in the stable state as shown in FIG. 34, when desiring to start the receipt of a multicast packet transmitted by the source terminal 10. Note that in FIG. 34 the states of the entry holders 11 and 21a in FIG. 33 are illustrated as entry holders before update 116 and 220a, and the states of the entry holders 11 and 21a during the shift are illustrated as entry holders during shift 115 and 219a, in order to discriminate the entry holders 11 and 21a between the state shown in FIG. 33 where the destination terminals 40a and 40b are joining, the state in FIG. 34 where the destination terminal 40c has joined, and the shifting state from the state in FIG. 33 to the state in FIG. 34.

Initially, since the destination terminal 40c is connecting to the NR 30c, the destination terminal 40c detects that a router to which the destination terminal 40c is connecting via the radio link is an NR and transmits a Join message 3, similarly to the destination terminal 40b. Since the destination terminal 40c is not joining the multicast tree at this point, the destination terminal 40c does not receive a multicast packet in which a Stable option is set. Hence, the destination terminal 40c transmits a normal Join message 3 in which a Stable option is not set. The destination terminal 40c sets the source terminal address "S" as a destination address, sets the address "R3" of the destination terminal 40c as a source address, and transmits the Join message 3 designating the multicast group address "G".

The UR 20a existing most downstream on the path from the destination terminal 40c to the source terminal 10 among the URs, receives the Join message 3. The message processor 25 of the UR 20a refers to the entry holder before update 220a. The entry holder before update 220a is not holding the forwarding address and also the UR 20a has received the normal Join message 3 which is not a Stable Join message 3a used to maintain a multicast tree in the stable state. Therefore, the message processor 25 judges that "R3" set as the source address of the received Join message 3 is the forwarding address to which the UR 20a forwards a multicast packet. Additionally, the number of the forwarding address is one, the message processor 25 judges that the UR 20a does not become the branch router.

Hence, the message processor 25 of the UR 20a generates an MCT entry in the entry holder before update 220a, registers (S, G): [R3], and changes its state to that of the entry holder during shift 219a. Furthermore, the message processor 25 inputs the received Join message 3 natively into the forwarder 23 of the UR 20a, and the forwarder 23 transmits the Join message 3 to the source terminal 10.

The source terminal 10 receives the Join message 3. Since the entry holder before update 116 is not holding "R3" which is set as the source address of the received Join message 3, the message processor 14 judges that "R3" is a new forwarding address. The message processor 14 generates an MFT entry, adds the forwarding address "R3", and updates the entry holder before update 116 to (S, G): [UR2, UR3] of the state of the entry holder during shift 115. Accordingly, a multicast tree, in which a multicast packet is directly forwarded from the source terminal 10 to the destination terminal 40c, is once built.

Since the JT is expired, the UR 20b thereafter transmits a Stable Join message 3a in which the destination address is the source terminal address "S", the source address is "UR2", and "G" is designated as the multicast group address. Then, the UR 20a existing on the path from the UR 20b to the source terminal 10 receives the Stable Join message 3a.

The message processor 25 of the UR 20a refers to the entry holder during shift 219a. "R3" which is already held by the entry holder during shift 219a as the forwarding address corresponding to the received (S, G) is different from the source address "UR2" of the Stable Join message 3a relating to the received (S, G). For this reason, the message processor 25 judges that the Stable Join message 3a is not used to maintain the multicast tree in the stable state. Moreover, the message processor 25 judges that the UR 20a becomes the branch router, since the number of forwarding addresses to which the UR 20a forwards a multicast packet identified with (S, G) is plural, that is, "UR2" and "R3".

Hence, the message processor 25 of the UR 20a deletes the MCT entry from the entry holder during shift 219a, and newly generates an MFT entry. The message processor 25 registers (S, G): [UR2, R3] in the MFT entry of the entry holder 21a.

Furthermore, the message provider 26 of the UR 20a generates a Redirect message 4 including: a Join message which requests the addition of the address "UR1" of the UR 20a, which newly becomes the branch router, to the sending address; and a Prune message which requests the deletion of the forwarding addresses "UR2" and "R3" of the UR 20a, which is the branch router, from the sending address. In addition, the message provider 26 generates the Redirect message 4 in which the source terminal address "S" is set as a destination address, the address "UR1" of the UR 20a is set as a source address, the multicast group address "G" is designated. Then, the forwarder 23 of the UR 20a transmits the Redirect message 4 to the source terminal 10.

The source terminal 10 receives the Redirect message 4. The message processor 14 updates the entry holder 11 in accordance with the Redirect message 4. Specifically, the message processor 14 deletes "UR2" and "R3", which are commanded to be deleted, from the MFT entry of the entry holder during shift 115. The message processor 14 then registers the address "UR1" of the branch router, which is commanded to be added, in the MFT entry as a sending address. For this reason, the MFT entry of the entry holder 11 is updated to (S, G): [UR1].

With the foregoing processing, a multicast tree is set in the following manner: the multicast packet is forwarded from the most upstream source terminal 10 to the destination terminal 40a via the UR 20a to have newly become the upstream branch router, the UR 20b to have become a downstream branch router by making the upstream UR 20a the branch router, and the UR 20c to be the edge router; the multicast packet is forwarded to the destination terminal 40b via the URs 20a and 20b; and the multicast packet is forwarded to the destination terminal 40c via the UR 20a. In this manner, the multicast tree in the stable state is set.

[Communication Method]

Figure 35:
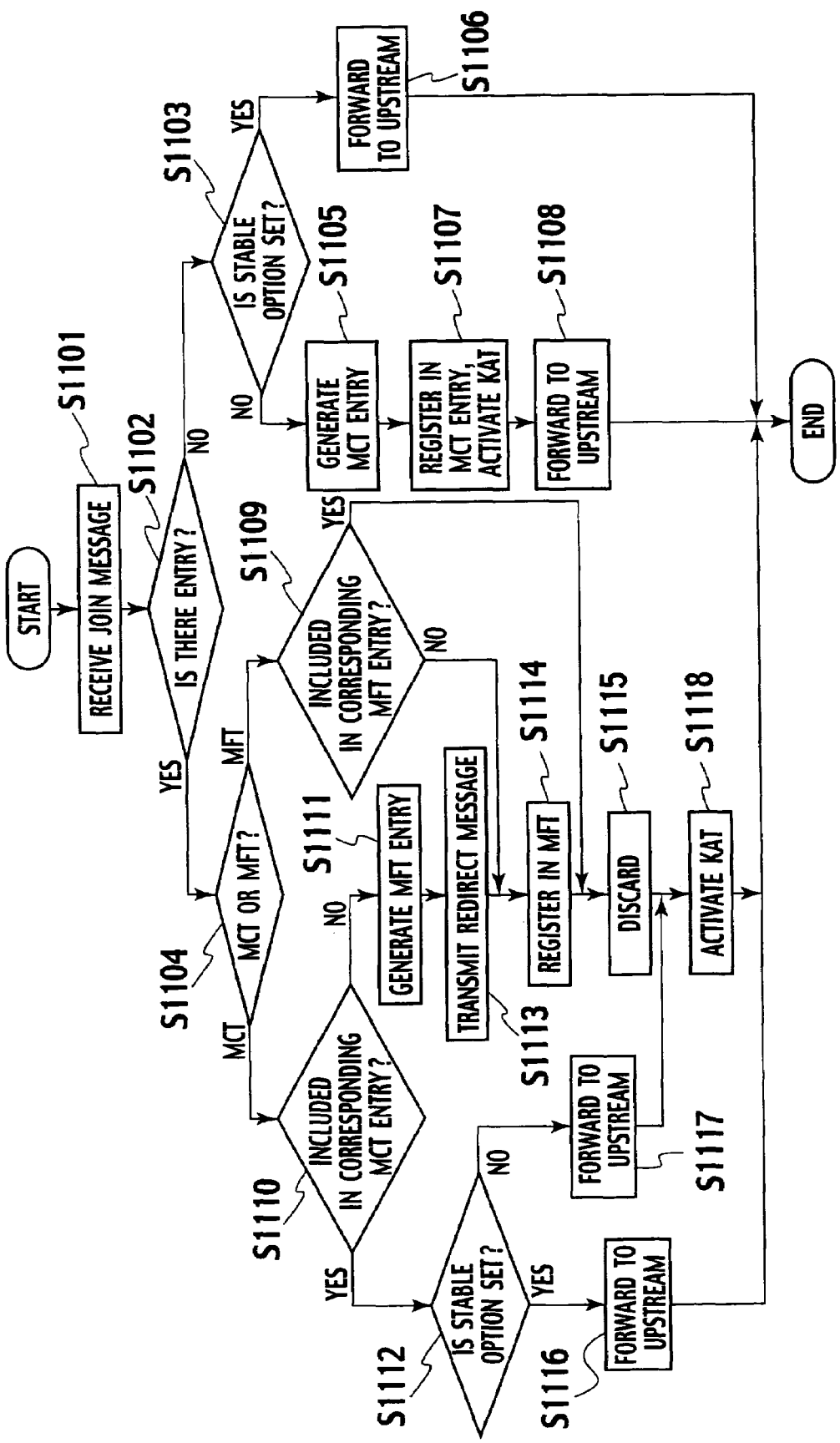
FIG. 35 is a flowchart showing processing procedures for receiving a Join message according to the fifth embodiment of the present invention.

A description will be given of a communication method in which the communication system 301 shown in FIG. 30 is used. Initially, a description will be given of the processing procedures of when receiving a Join message. As shown in FIG. 35, the receivers 22 of the URs 20a to 20c receive Join messages (S1101). The message processors 25 of the URs 20a to 20c search the entry holders 21a to 21c, thus judging whether or not there exist entries including the source terminal address and the multicast group address, the addresses being included in the received Join messages (S1102).

When having judged that there exist no entries in Step (S1102), the message processors 25 of the URs 20a to 20 judge whether or not the received join messages are Stable Join messages in which Stable options are set (S1103). When the message processors 25 of the URs 20a to 20c have judged that the messages are the Stable Join messages, the forwarders 23 of the URs 20a to 20c forward the Stable Join messages upstream (S1106).

On the other hand, when having judged that the received Join messages are not Stable Join messages but normal Join messages in Step (S1103), the message processors 25 of the URs 20a to 20c generate MCT entries in the entry holders 21a to 21c (S1105). Moreover, the message processors 25 of the URs 20a to 20c register the source addresses of the received Join messages in the generated MCT entries as forwarding addresses, and activate their KATs (S1107). Then, the forwarders 23 of the URs 20a to 20c forward the Join messages upstream (S1108).

In addition, when having judged that there exist entries in Step (S1102), the message processors 25 of the URs 20a to 20c judge that the entries are which of either MCT or MFT entries (S1104). When having judged that the entries are MFT entries, the message processors 25 of the URs 20a to 20c judge whether or not the source addresses of the Join message are included in the forwarding addresses of the MFT entries corresponding to the source terminal and multicast group addresses shown in the Join messages, that is, (S, G) (S1109).

When having judged that the source addresses of the Join messages are not included in the forwarding addresses of the MFT entries corresponding to (S, G), the message processors 25 of the URs 20a to 20c register the source addresses of the Join messages as forwarding addresses in the MFT entries corresponding to (S, G) in the entry holders 21a to 21c (S1114). Subsequently, the message processors 25 of the URs 20a to 20c discard the received Join messages (S1115). Furthermore, the message processors 25 of the URs 20a to 20c activate the KATs of the forwarding addresses held by the registered MFT entries corresponding to (S, G) (S1118).

On the other hand, when having judged that the source addresses of the Join messages are included in the forwarding addresses of the MFT entries corresponding to (S, G) in Step (S1109), the message processors 25 of the URs 20a to 20c advance to Step (S1115), and discard the received Join messages. Moreover, the message processors 25 of the URs 20a to 20c advance to Step (S1118), and reactivate the KATs of the forwarding addresses registered in the MFT entries corresponding to (S, G).

When having judged that the entries are MCT entries in Step (S1104), the message processors 25 of the URs 20a to 20c judge whether or not the source addresses of the Join messages are included in the forwarding addresses of the MCT entries corresponding to the source terminal and multicast group addresses shown in the Join messages, that is, (S, G) (S1110). When having judged that the source addresses of the Join messages are not included in the MCT entries corresponding to (S, G), the message processors 25 of the URs 20*a* to 20*c* generate MFT entries corresponding to (S, G) (S1111).

Furthermore, the message providers 26 of the URs 20*a* to 20*c* generate Redirect messages corresponding to (S, G), and the forwarders 23 of the URs 20*a* to 20*c* transmit the messages to the source terminal address (S1113). Subsequently, the URs 20*a* to 20*c* advance to Steps (S1114) and (S1115), register the source addresses as forwarding addresses in the generated MFT entries corresponding to (S, G), and discard the Join messages. In addition, the URs 20*a* to 20*c* advance to Step (S1118), and activate the KATs of the forwarding addresses held as the registered MFT entries corresponding to (S, G). Note that in this case the URs 20*a* to 20*c* cause the JTs to activate, too.

On the other hand, when having judged that the source addresses of the Join messages are included in the forwarding addresses of the MCT entries corresponding to (S, G) in Step (S1110), the message processors 25 of the URs 20*a* to 20*c* judge whether or not the received Join messages are Stable Join messages in which Stable options are set (S1112). When the message processors 25 of the URs 20*a* to 20*c* have judged that the Join messages are Stable Join messages, the forwarders 23 of the URs 20*a* to 20*c* forward the Stable Join messages upstream (S1116). On the other hand, when the message processors 25 of the URs 20*a* to 20*c* have judged that the Join messages are not Stable Join messages but normal Join messages in Step (S1112), the forwarders 23 of the URs 20*a* to 20*c* forward the Join messages upstream (S1117). Thereafter, advancing to Step (S118), the KATs of the forwarding addresses included in the MCT entries corresponding to (S, G) are reactivated. In this manner, the communication system 301 sets a multicast tree.

Figure 36:
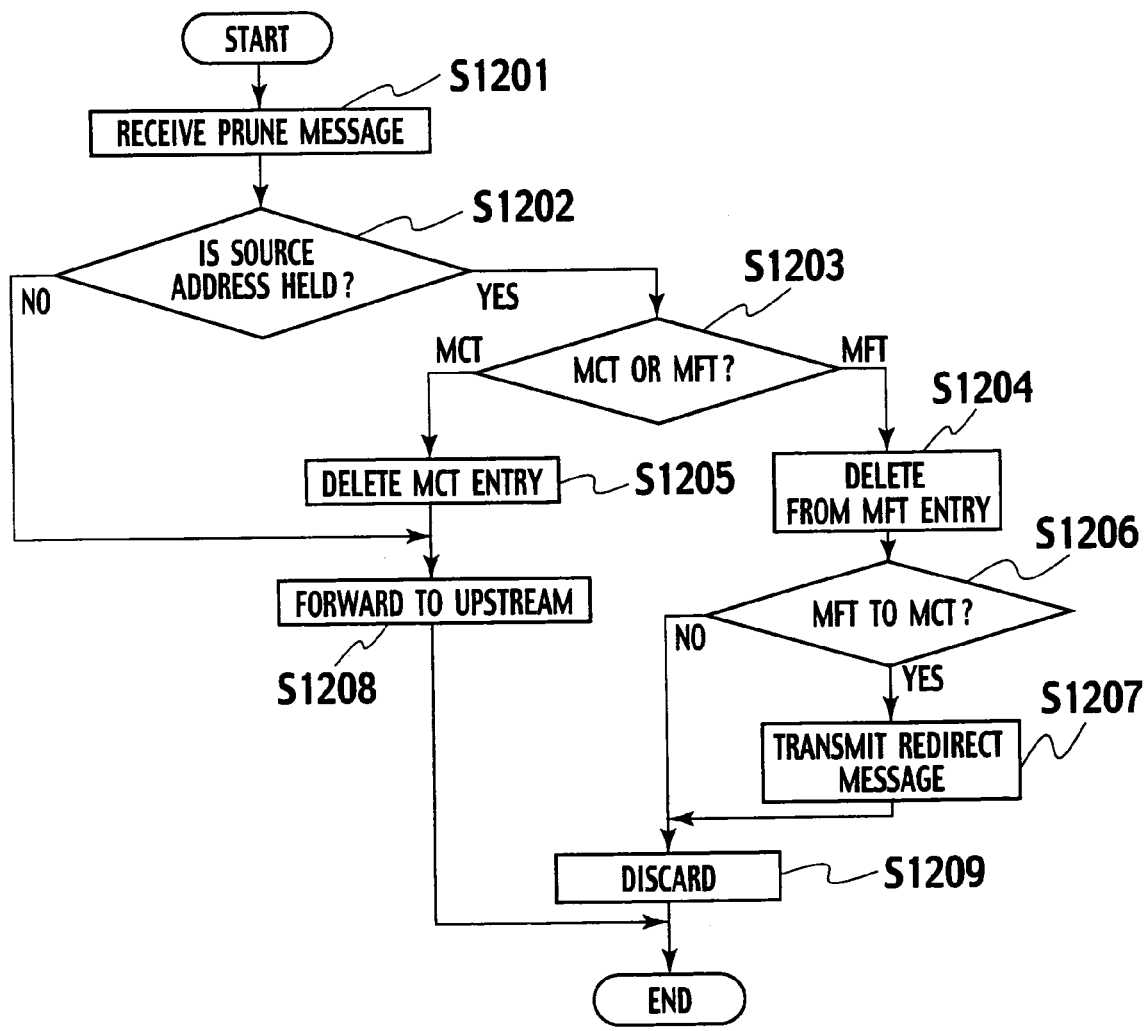
FIG. 36 is a flowchart showing processing procedures for receiving a Prune message according to the fifth embodiment of the present invention.

Next, a description will be given of the processing procedures upon the receipt of a Prune message. Initially, the receivers 22 of the URs 20*a* to 20*c* receive Prune messages as shown in FIG. 36 (S1201). The message processors 25 of the URs 20*a* to 20*c* judge whether or not the entry holders 21*a* to 21*c* are holding the source addresses of the Prune messages as the forwarding addresses (S1202). When having judged that the entry holders 21*a* to 21*c* are not holding the source addresses of the Prune messages, the message processors 25 of the URs 20*a* to 20*c* forward the received Prune messages upward (S1208).

On the other hand, when having judged that the entry holders 21*a* to 21*c* are holding the source addresses of the Prune messages in Step (S1202), the message processors 25 of the URs 20*a* to 20*c* judge that the source addresses are held as which of either MCT or MFT entries of the entry holders 21*a* to 21*c* (S1203). When having judged that the addresses are held as MCT entries, the message processors 25 of the URs 20*a* to 20*c* delete the MCT entries from the entry holders 21*a* to 21*c* (S1205). Then, the URs 20*a* to 20*c* advance to Step (S1208).

On the other hand, when having judged that the source addresses are held as MFT entries in Step (S1203), the message processors 25 of the URs 20*a* to 20*c* delete the source addresses of the Prune messages from the MFT entries of the entry holders 21*a* to 21*c* (S2104). The message processors 25 of the URs 20*a* to 20*c* judge whether or not the MFT entries change to MCT entries due to the deletion of the source addresses of the Prune messages from the MFT entries in Step (S1204) (S1206).

When having judged that the MFT entries change to MCT entries in Step (S1206), the message processors 25 of the URs 20*a* to 20*c* command the message providers 26 to generate Redirect messages. The message providers 26 of the URs 20*a* to 20*c* generate Redirect messages 4, and the forwarders 23 transmit the messages to the source terminal 10 (S1207). Subsequently, the message processors 25 of the URs 20*a* to 20*c* discard the Prune messages (S1209). On the other hand, when the message processors 25 of the URs 20*a* to 20*c* have judged that the MFT entries are holding a plurality of forwarding addresses and thus the MFT entries are not to change to MCT entries even when deleting the source addresses from the MFT entries in Step (S1206), the step advances to (S1209).

Figure 37:
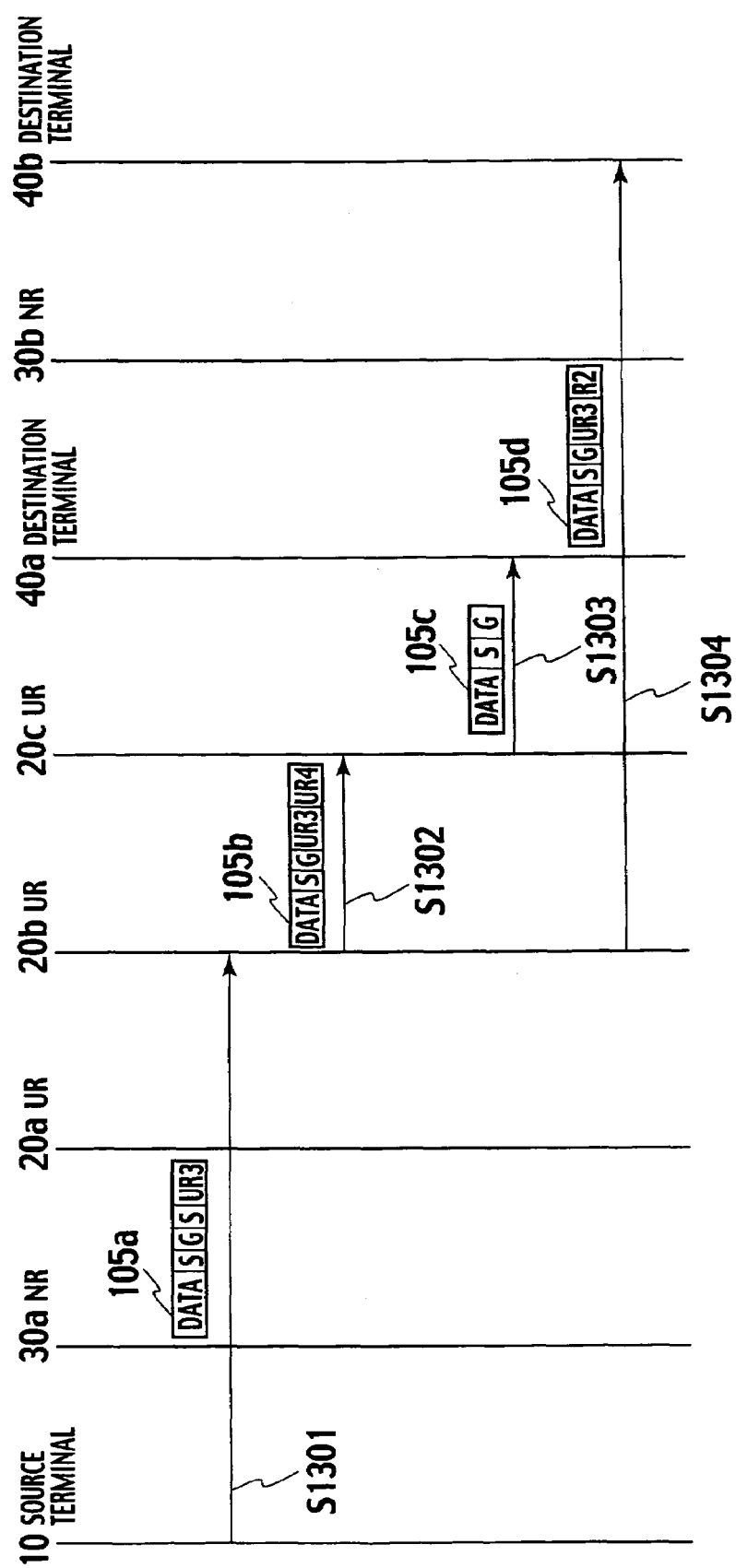
FIG. 37 is a sequence diagram showing the forwarding procedures of a multicast packet according to the fifth embodiment of the present invention.

Next, a description will be given of a method of forwarding a multicast packet by using a set multicast tree. FIG. 37 shows a forwarding method by use of a multicast tree in the initial state shown in FIG. 32.

Initially, the source terminal 10 generates a multicast packet in which, in data the source terminal address "S" is set as a source address and the multicast group address "G" is set as a destination address. Subsequently, the source terminal 10 sets, in the generated multicast packet, the source terminal address "S" as a source address, the sending address "UR2" held by the entry holder 11 as a destination address, then encapsulating the multicast packet. Then, the source terminal 10 forwards the encapsulated multicast packet 105*a* by unicast to the UR 20*b* which is a branch router (S1301). Hence, the NR 30*a* and the UR 20*a*, which exist on the path between the source terminal 10 and the UR 20*b* to be the branch router, can forward the multicast packet 105*a* with normal unicast processing, without being aware that the packet is a multicast packet.

The UR 20*b* sets the source address "S" of the encapsulated multicast packet 105*a* as the tunnel source address of the entry holder 21*b*, thus decapsulating the encapsulating multicast packet 105*a*. The UR 20*b* replicates the multicast packet by use of the forwarding controller 24 in order to transmit the multicast packets to the forwarding addresses "UR3" and "R2" held by the entry holder 21*b*. Then, the UR 20*b* sets the address "UR2" of the UR 20*b* itself as a source address and the forwarding address "UR3" as a destination address to encapsulate the packet, and forwards the encapsulated multicast packet 105*b* to the UR 20*c* which is the edge router (S1302). The UR 20*c* decapsulates the encapsulated multicast packet 105*b* to derive a multicast packet 105*c*, thus forwarding the packet to the destination terminal 40*a* (S1303).

Additionally, the UR 20*b* sets the address "UR2" of the UR 20*b* itself as a source address and the other forwarding address "R2" as a destination address to encapsulate the packet, thus forwarding the encapsulated multicast packet 105*d* to the destination terminal 40*b* (S1304). In this manner, data can be distributed by multicast to a plurality of sending destinations, that is, the destination terminals 40*a* and 40*b*.

According to these kinds of the communication system 301, the URs 20*a* to 20*c* and the communication method, the URs 20*a* to 20*c* hold a plurality of forwarding addresses to be replication points, only when having judged to be branch routers which forward multicast packets transmitted by the source terminal 10 to the plurality of forwarding addresses. Furthermore, when having become the branch routers, the URs 20*a* to 20*c* can request the URs upstream of themselves and the source terminal 10 to add the addresses of the branch routers to the forwarding and sending addresses and to delete the forwarding addresses of the branch routers from the forwarding and sending addresses, by transmitting, to the source terminal address, join/leave request messages such as a Redirect message which requests the addition of the addresses of the URs 20*a* to 20*c* to the sending address and the deletion of the forwarding address of the branch router from the sending address. In addition, the upstream URs and the source terminal 10 can hold the addresses of the downstream branch routers as forwarding and sending addresses and delete the forwarding addresses of the downstream branch routers from the forwarding and sending addresses.

Therefore, the URs 20*a* to 20*c* can appropriately become the branch routers. In other words, the branch router is dynamically determined in the communication system 301. Then, an appropriate multicast tree, in which multicast packets are forwarded from the source terminal 10 to the destination terminals 40*a* to 40*c* via the branch routers, is set. Moreover, among the URs 20*a* to 20*c* and the NRs 30*a* to 30*c*, only the branch routers hold the forwarding addresses, thus forwarding the multicast packets to the plurality of forwarding addresses. Therefore, it is sufficient if the URs and the NRs existing between the source terminal 10 and the branch router forward encapsulated multicast packets by unicast.

Accordingly, the loads on the URs are reduced except for the branch routers, thus making it possible to realize multicast as the entire communication system 301, even if routers except for the branch routers are NRs. For example, when using HBH, all routers are not required to hold information for setting a multicast tree in MCTs, but routers except for the routers which replicate multicast packets, too, are required to hold the MCTs. Hence, there is a case where the load on the entire communication system cannot be reduced sufficiently. However, according to the communication system 301, it is possible to realize multicast by setting an appropriate multicast tree, without increasing the load on the communication system 301, and further, even if an NR exists between the source terminal and the branch router and between the branch routers.

Moreover, when the KATs of the sending and forwarding addresses are expired, the message processors 14 and 25 delete the sending and forwarding addresses from the entry holders 11 and 21*a* to 21*c*, and then reactivate the KATs when the source terminal 10 and the URs 20*a* to 20*c* receive Join messages 3 and Stable Join messages 3*a* (maintenance request messages), in which the forwarding and sending addresses are set as source addresses, before the expiration of the KATs. Therefore, the communication system 301 maintains a multicast tree till the KATs are expired, thereby making it possible to always use an appropriate multicast tree also when a network topology is changed. Additionally, the communication system 301 can maintain the multicast tree over a required time due to Join messages 3 and Stable Join messages 3*a* (maintenance request messages).

Sixth Embodiment

[Communication System]

Figure 38:
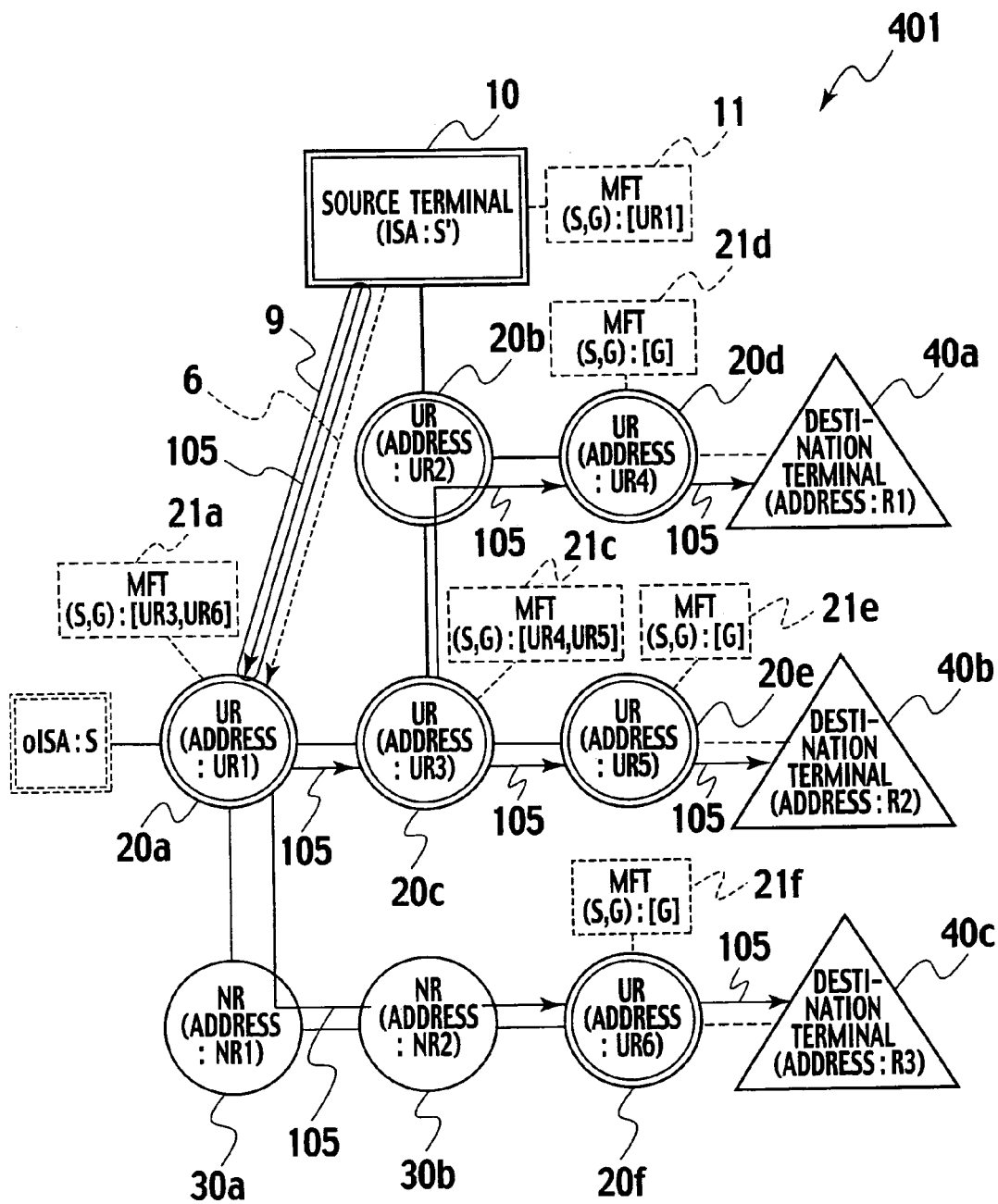
FIG. 38 is a view showing a state immediately after a source terminal of a communication system moves according to a sixth embodiment of the present invention.

Next, a description will be given of a case where a source terminal address is changed due to the move of a source terminal 10 and the like, by use of a communication system 401 shown in FIG. 38. The communication system 401 includes the source terminal 10, URs 20*a* to 20*f*, NRs 30*a* and 30*b*, and destination terminals 40*a* to 40*c*. Compared with the communication system 1 shown in FIG. 1, the communication system 401 is virtually the same except for the points that the numbers of the URs, the NRs and the destination terminals are different and that the connection relationships between the source terminal 10, the URs 20*a* to 20*f*, the Ns 30*a* and 30*b*, and the destination terminals 40*a* to 40*c* are changed. A consideration will be given to a case where the source terminal 10 moves between the networks, and thus the source terminal address is changed from "S" to "S'".

(Configuration of Destination Terminal)

Figures 39, 40:
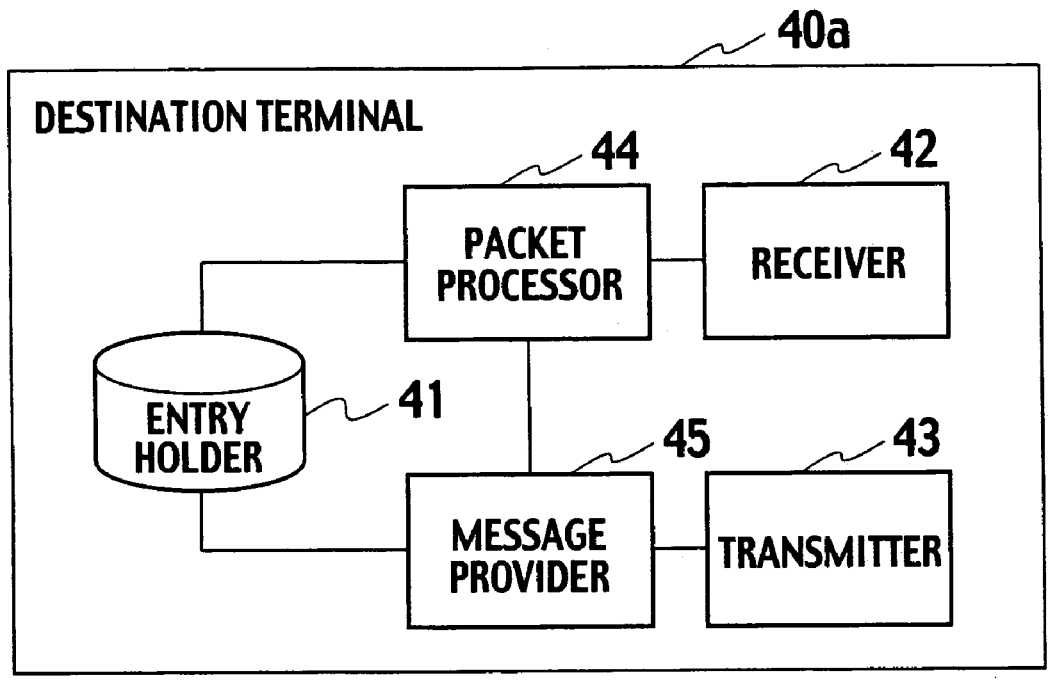
FIG. 39 is a block diagram showing the configuration of a destination terminal according to the sixth embodiment of the present invention.
FIG. 40 is a view showing an entry holder of the destination terminal according to the sixth embodiment of the present invention.

Next, a description will be given of the configurations of the destination terminals 40*a* to 40*c*. As shown in FIG. 39, the destination terminal 40*a* includes an entry holder 41, a receiver 42, a transmitter 43, a packet processor 44, and a message provider 45. Note that the destination terminals 40*b* and 40*c* also, have the same configurations as that of the destination terminal 40*a*.

The receiver 42 receives control messages and multicast packets from the URs 20*a* to 20*f*, the NRs 30*a* and 30*b*, and the source terminal 10. The receiver 42 inputs the received control messages and multicast packets into the packet processor 44.

The entry holder 41 is an address holder for holding an ISA, that is, a source terminal address and a multicast group address. As shown in FIG. 40, the entry holder 41 holds an ISA, a multicast group address, an oISA, a message pending timer (MPT), and a stable timer (ST). The entry holder 41 holds them while associating the ISA and the oISA.

An MPT is a timer value for measuring a message control time during which the transmission of a Prune message or a Leave Group message is being controlled. While the MPT is expired and is off, a Prune message or a Leave Group message is transmitted. While the MPT is on, a Prune or Leave Group message is not transmitted. An ST is a timer value for measuring the holding time of an OISA. The ST is held while being associated with the oISA. When the ST is expired, the corresponding oISA is deleted from the entry holder 41.

The packet processor 44 processes a control message and a multicast packet. The packet processor 44 obtains, from the receiver 42, a control message and a multicast packet received by the destination terminal 40*a*. When receiving an LU message or a multicast packet to which an LU message is added, the packet processor 44 sets an ISA "S" currently held by the entry holder 41 as an oISA of the entry holder 41, then activating its ST. Moreover, the packet processor 44 sets an ISA "S'" included in the LU message as the ISA of the entry holder 41.

Furthermore, the packet processor 44 refers to the entry holder 41, and judges whether or not the source address of the multicast packet is the oISA. When the source address is the oISA, the packet processor 44 refers to the entry holder 41, and judges whether the MPT is on or off. When the MPT is off, the packet processor 44 commands the message provider 45 to generate a Prune or Leave Group message designating the oISA. In addition, the packet processor 44 activates the MPT of the entry holder 41. Further, the packet processor 44 deletes the oISA whose ST is expired, from the entry holder 41.

The message provider 45 generates a control message, and provides the message via the transmitter 43. The message provider 45 obtains an ISA and a multicast group address from the entry holder 41. The message provider 45 generates a Join message, a Membership Report, a Stable Join message, or the like by use of the obtained ISA and multicast group address. The message provider 45 generates a Prune or Leave Group message in accordance with a command from the packet processor 44 to generate a Prune or Leave Group message designating the oISA. The message provider 45 inputs the generated control message into the transmitter 43.

Especially when the source terminal address for transmitting a multicast packet is changed, the message provider 45 functions as a destination terminal message provider for providing the source terminal address before the change (ISA) with a join request message (a Join message or a Membership Report) which requests the addition of the address of the destination terminal to the sending address to which the source terminal 10 transmits the multicast packet, based on a location update message (an LU message) for notifying the source terminal address after the change. Further, when the destination terminal 40a connects to the NR, the message provider 45 provides a join request message to which data commanding not to discard the join request message is added. Specifically, the message provider 45 generates a Join message 3, and provides the message via the transmitter 43. Since a special option is set in the Join message 3, even if the destination terminal 40a connects to the NR, the NR does not discard the Join message. Therefore, the UR existing on a path from the destination terminal 40a to the source terminal 10 can receive the Join message.

The transmitter 43 transmits control messages to the URs 20a to 20f, the NRs 30a and 30b, and the source terminal 10. The transmitter 43 obtains the control messages from the message provider 45, and transmits the messages.

Next, a description will be given of the processing in the communication system 401 of when the source terminal address is changed, with reference to FIGS. 38, 41 and 42. FIG. 38 shows a state immediately after the source terminal 10 has moved from the OISA "S" to the ISA "S'". Therefore, in FIG. 38, the entry holders 21a to 21f hold the forwarding addresses in the multicast tree identified with (S, G) which uses the OISA "S". When the source terminal 10 exists in the OISA "S", the multicast tree is set in a manner of making the multicast tree optimal when the oISA "S" is assumed to be upstream in the multicast tree. Furthermore, all the destination terminals 40a to 40c are joining the multicast tree. Accordingly, as MFT entries, an entry holder 11 of the source terminal 10 holds (S, G): [UR1], and an entry holder 21a of the UR 20a holds (S, G): [UR3, UR6]. An entry holder 21c of the UR 20c holds (S, G): [UR4, UR5] as an MFT entry, and serves as a branch router. Moreover, entry holders 21d to 21f of the URs 20d to 20f hold (S, G): [G] as MFT entries, and serve as edge routers.

When the source terminal 10 moves from the oISA "S" to the ISA "S'", a packet generator 15 generates a BU message 6 associated with the OISA "S" and the ISA "S'". The packet generator 15 sets "UR1" as the destination address of the BU message 6 in accordance with the entry holder 11. Then, the packet generator 15 provides the BU message 6 to the UR 20a via a transmitter 13.

A message processor 25 of the UR 20a holds the BU message 6 while associating the ISA "S'" with the OISA "S" based on the BU message 6 received by a receiver 22. Then, the message processor 25 of the UR 20a causes a forwarder 23 to forward, to the ISA "S'", the control message received by the receiver 22 and destined for the OISA "S". In this manner, the UR 20a builds a tunnel (Bi-directional Tunneling) 9 in between with the source terminal 10, and functions as a home agent.

Moreover, the transmitter 13 of the source terminal 10 transmits a multicast packet 105 to the UR 20a based on the entry holder 11. The transmitter 13 transmits the multicast packet 105 by using a multicast tree identified with (S, G). Since the multicast tree identified with (S, G) is set to be optimal when the oISA "S" is assumed to be upstream in the multicast tree, the multicast tree includes redundant paths. Hence, there is a need to reset a multicast tree identified with (S', G) based on the ISA "S'" in a communication system 201.

Therefore, the packet generator 15 generates the multicast packet 105 in which a Stable option is not set.

Further, the packet generator 15 adds, to the multicast packet 105, an LU message which notifies an ISA in which the oISA "S" is associated with the ISA "S'". The packet generator 15 provides such a multicast packet 105 to the destination terminals 40a to 40c via the transmitter 13, thus notifying the destination terminals 40a to 40c that the source terminal 10 has moved from the OISA "S" to the ISA "S'".

In this manner, when the source terminal address is changed, the packet generator 15 initially provides a sending address with a forwarding destination update message (a BU message) which notifies the change in the source terminal address. Additionally, the packet generator 15 functions as an update notification section for providing a location update message (an LU message) which notifies the destination terminals 40a to 40c, which receive multicast packets, of the source terminal address after the change.

As shown in FIG. 13, the destination terminals 40a to 40c transmit Membership Reports 2 in which the ISA "S'" is set as destination addresses, based on the LU messages which are added to the received multicast packets 105. Specifically, the packet processors 44 update the entry holders 41 based on the LU messages. Subsequently, the message providers 45 generate Membership Reports 2 by use of the ISAs "S'" held by the updated entry holders 41, and the transmitters 43 transmit the Membership Reports 2. Note that when a plurality of destination terminals are connected to one edge router, the destination terminals transmit the Membership Reports 2 in accordance with a congestion avoidance control stipulated in the MLD. According to this, all destination terminals can avoid the congestion caused by the attempts to join a multicast tree identified with (S', G) which is to be newly set.

When receivers 22 of the URs 20d to 20f to be the edge routers receive the Membership Reports 2 setting the ISA "S'" as the destination addresses, message processors 25 of the URs 20d to 20f input the received Membership Reports 2 into message providers 26. When having obtained the Membership Reports 2, the message providers 26 of the URs 20d to 20f generate Join messages 3 whose destination addresses are set as the ISA "S'I". Then, forwarders 23 of the URs 20d to 20f transmit the join messages 3 which are destined for the ISA "S'".

Triggered by these Membership Reports 2 and Join messages 3, which are destined for the ISA "S'", the source terminal 10 and URs 20a to 20f register the forwarding addresses corresponding to (S', G) in the entry holders 11 and 21a to 21f in a manner that the multicast tree is to be optimal when the ISA "S'" is assumed to be upstream, similarly to the processing of a case where the multicast treed in the initial states are set in the communication system 301 shown in FIGS. 31 and 32.

Specifically, when the ISA "S'", which is the source terminal address after the change, is assumed to be upstream in the multicast tree, the message processors 25 of the URs 20a to 20f judge whether or not the URs 20a to 20f are to be branch routers. The message processors 25 of the URs 20a to 20f, to have judged to be the branch routers, register a plurality of forwarding addresses associated with (S', G) which uses the ISA "S'", in the entry holders 21a to 21f. Then, the message providers 26 of the URs 20a to 20f to have judged to be the branch routers generate Redirect messages whose destination addresses are set as the ISA "S'", then providing the messages via the forwarders 23.

Figure 41:
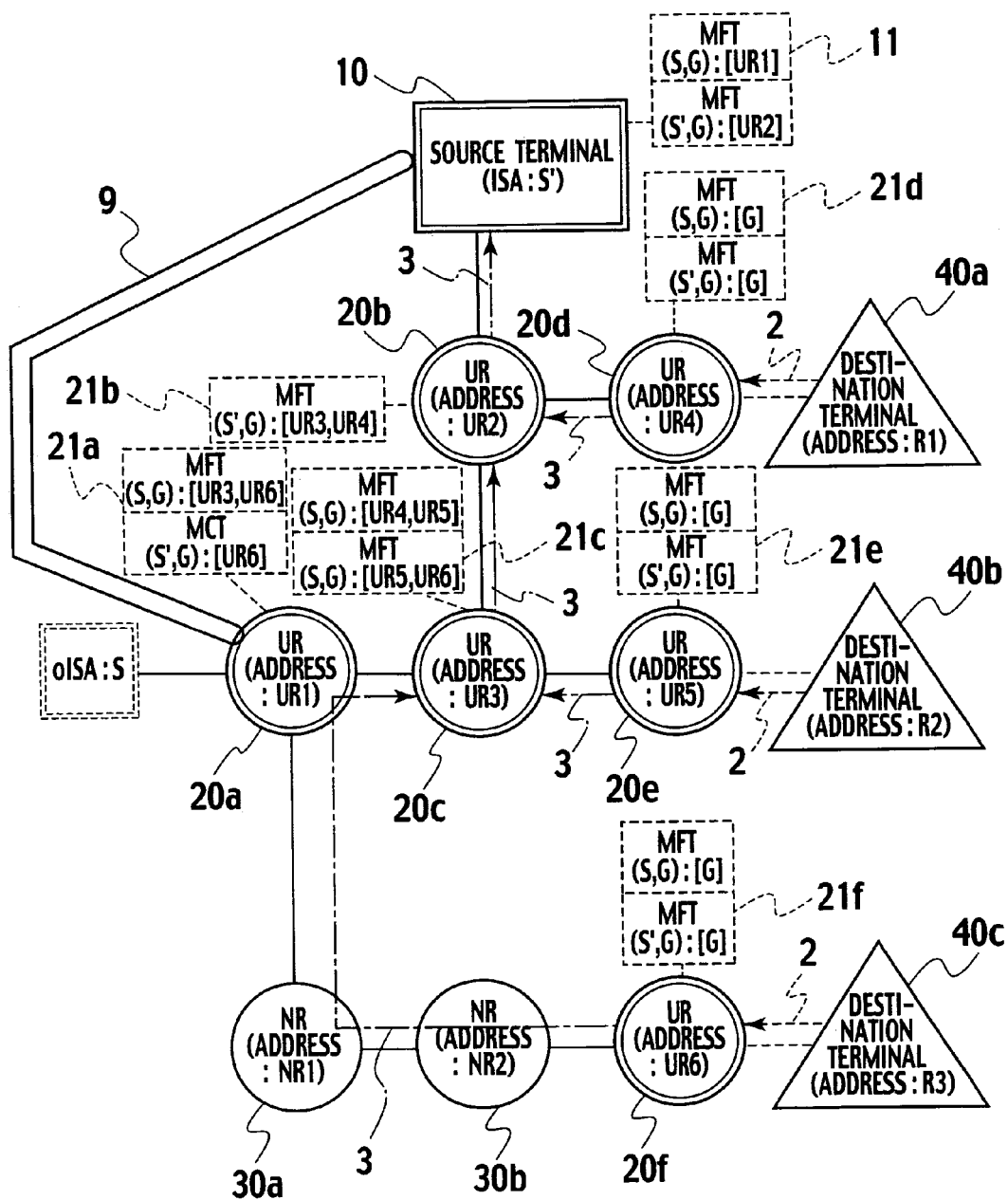
FIG. 41 is a view showing a state where multicast trees before and after changing source terminal addresses coexist according to the sixth embodiment of the present invention.

Consequently, as shown in FIG. 41, the entry holder 21b of the UR 20b which did not hold the forwarding address holds (S', G): [UR3, UR4] as an MFT entry, thus becoming a branch router in the multicast tree identified with (S', G). Furthermore, the entry holder 21c of the UR 20c holds (S', G): [UR5, UR6] as an MFT entry in addition to (S, G): [UR4, UR5] which has been held as an MFT entry, becoming a branch router also in the multicast tree identified with (S', G). Moreover, the entry holder 21a of the UR 20a holds (S', G): [UR6] as an MCT entry in addition to (S, G): [UR3, UR6] which has been held as an MFT entry.

Additionally, the entry holders 21d to 21f of the URs 20d to 20f hold (S', G): [G] as MFT entries in addition to (S, G) [G] which has been held as MFT entries, thus becoming the edge routers in the multicast tree identified with (S', G). Subsequently, the entry holder 11 of the source terminal 10 holds (S', G): [UR2] in addition to (S, G): [UR1].

In this manner, immediately after the multicast tree optimal for the ISA "S'" is set, the communication system 401 becomes a state where the multicast tree identified with (S, G), which is optimal for the oISA "S", and the multicast tree identified with (S', G), which is optimal for the ISA "S'" coexist as shown in FIG. 41. Therefore, in the communication system 401, multicast packets are made to be forwarded redundantly due to the two multicast trees, and the destination terminals 40a to 40c are made to receive the multicast packets redundantly.

Hence, message processors 14 and 24 of the source terminal 10 and the URs 20a to 20f are preferred to delete the sending and forwarding addresses associated with the OISA "S" from the entry holders 11 and 21a to 21f, based on at least one of a Leave Group message, a Prune message, and the holding time of the sending and forwarding addresses.

The destination terminals 40a to 40c, which have received LU messages, stop the transmission of Stable Join messages designating (S, G). Specifically, the message providers 45 of the destination terminals 40a to 40c generate Stable Join messages by using the ISA"S'" of the entry holders 41. Therefore, after the ISAs are updated in the entry holders 41 by the LU messages, the message providers 45 no longer generate Stable Join messages by use of "S" which has become an oISA.

As a result, the destination terminals 40a to 40c transmit only Stable Join messages designating (S', G). Thereby, the message processors 14 and 25 reactivate only the KATs of the sending and forwarding addresses corresponding to (S', G), and extending their holding times. Accordingly, only the MFT entries corresponding to (S', G) of the entry holders 11 and 21a to 21f are held, and the sending and forwarding addresses held by the MFT entries corresponding to (S, G) are thus deleted. Therefore, the source terminal 10 and the URs 20a to 20f can delete the multicast tree corresponding to (S, G) and continue to hold only the MFT entries corresponding to (S', G). Hence, the sources terminal 10 and the URs 20a to 20f can maintain only multicast trees corresponding to (S', G).

Figure 42:
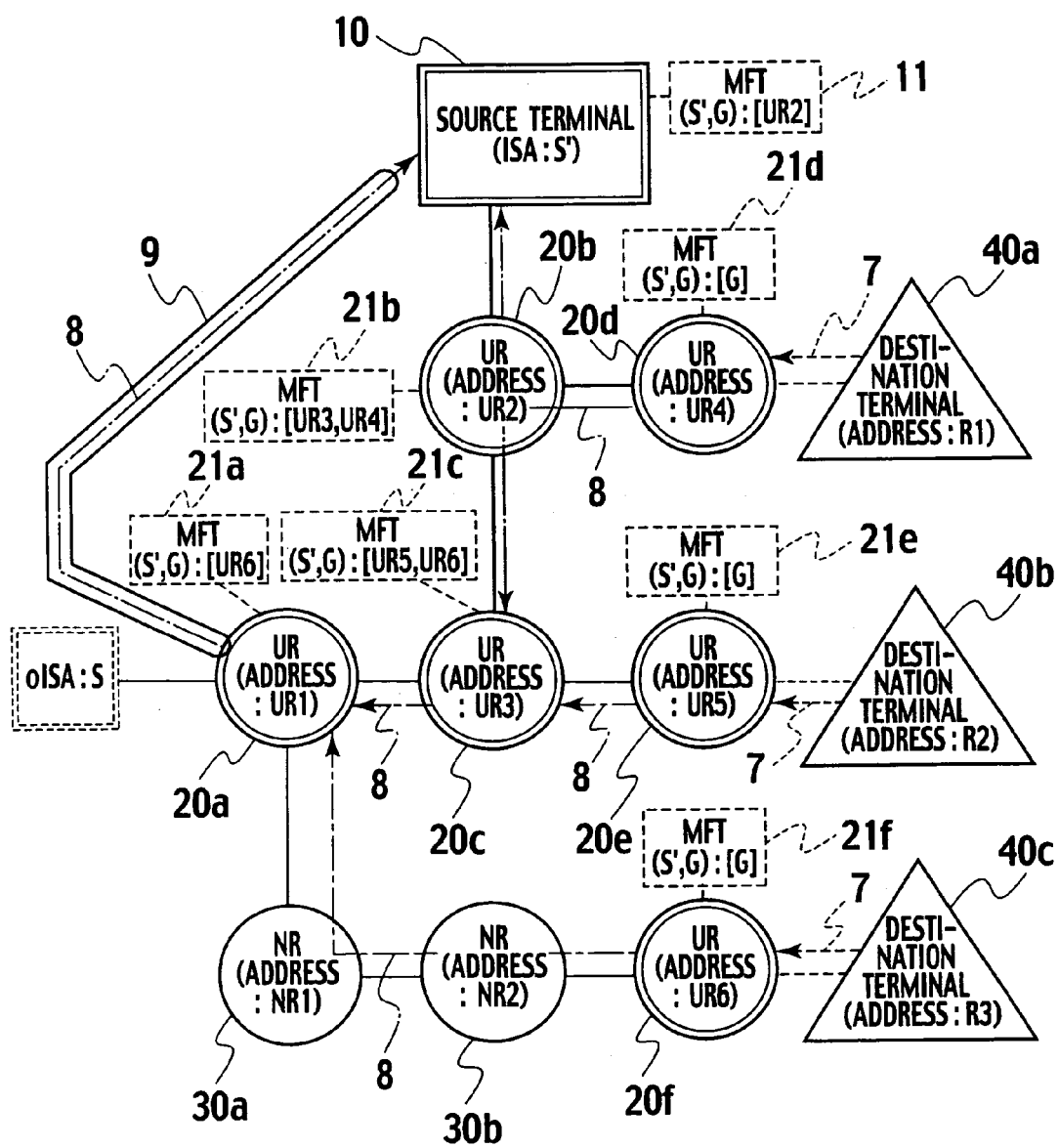
FIG. 42 is a view showing a state where only the multicast tree after changing the source terminal address is maintained according to the sixth embodiment of the present invention.
Figure 43:
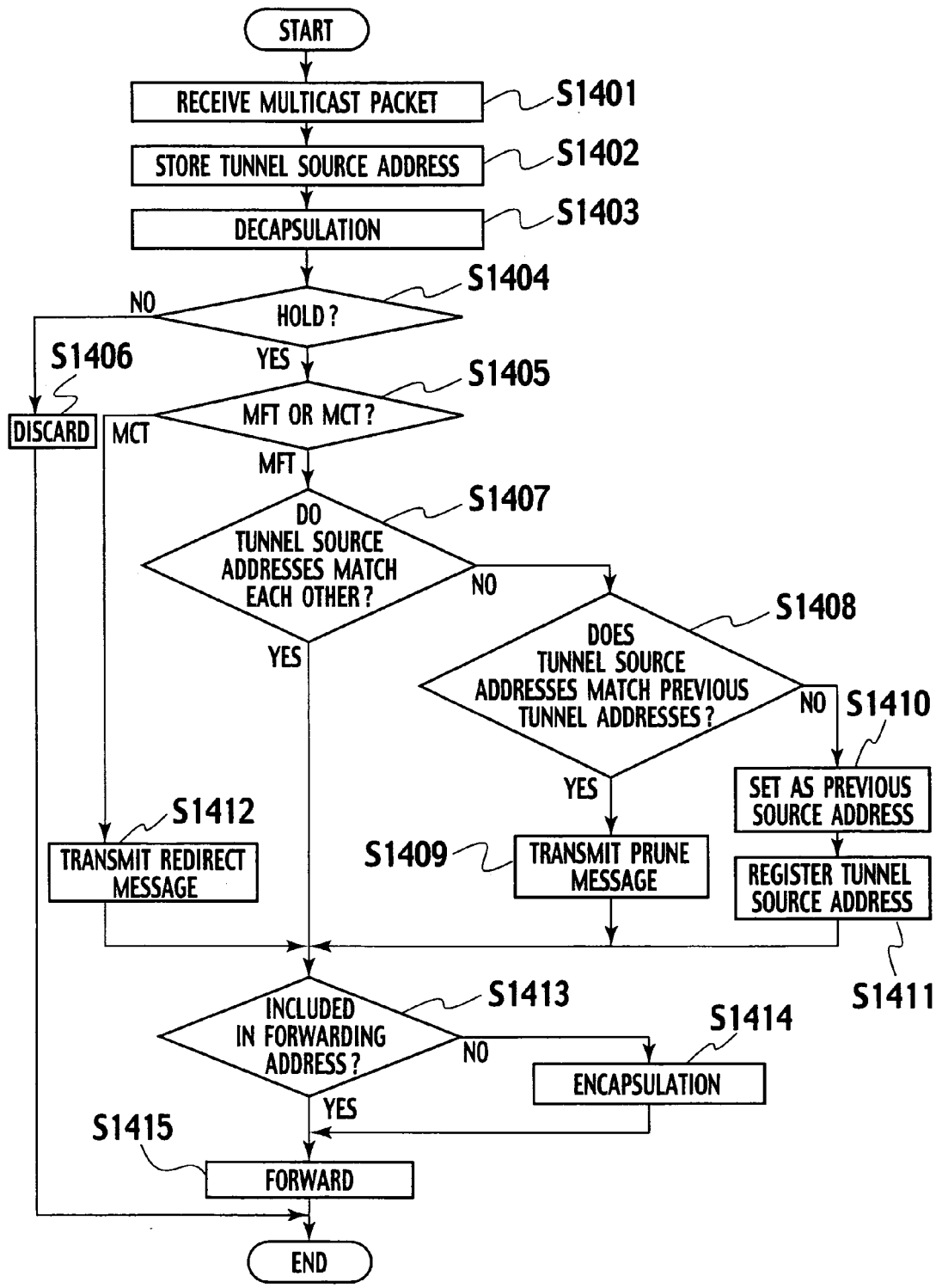
FIG. 43 is a flowchart showing the operational procedures of a UR according to the sixth embodiment of the present invention.
Figure 44:
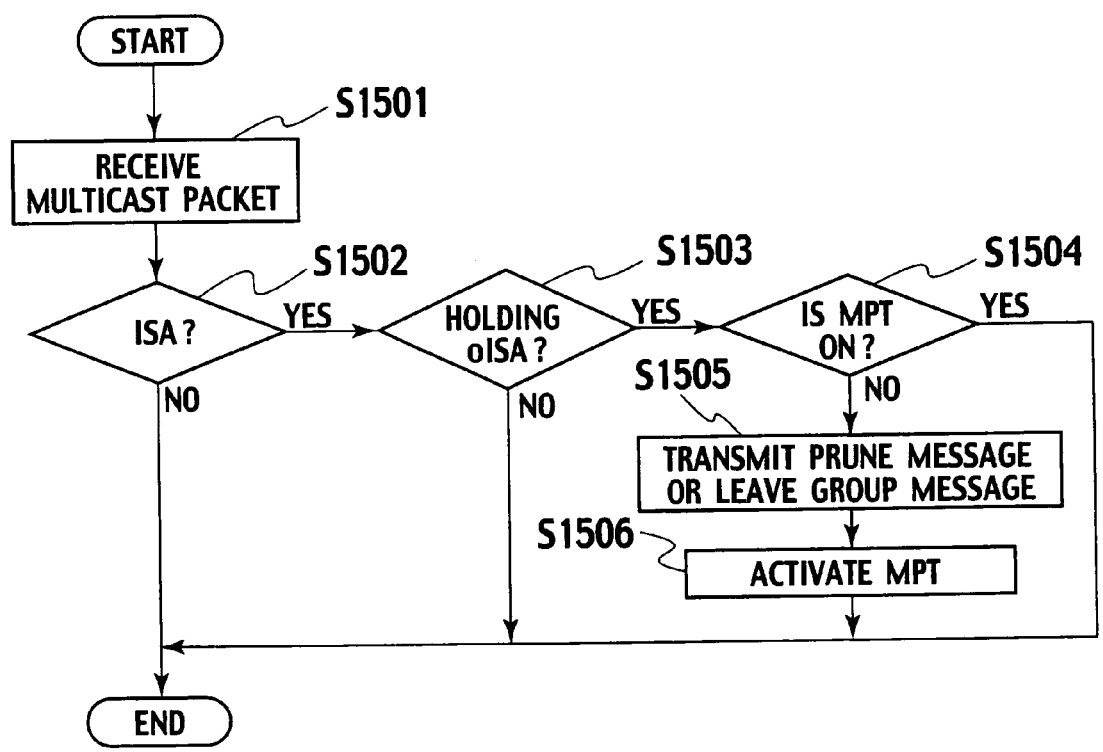
FIG. 44 is a flowchart showing the operational procedures of the destination terminal according to the sixth embodiment of the present invention.

In addition, as shown in FIG. 42, the destination terminals 40a to 40c can explicitly leave the multicast tree using the oISA "S" by using Leave Group messages 7 and Prune messages 8 without waiting for the expiration of the KATs. The destination terminals 40a to 40c transmit, to the URs 20d to 20f to be the edge routers, Leave Group messages 7 which request the leave from the multicast tree identified with (S, G), after receiving multicast packets from the multicast tree identified with (S', G) Specifically, the message providers 45 of the destination terminals 40a to 40c generate Leave Group messages 7 designating the oISA "S", and the transmitters 43 transmit the messages.

The message processors 25 of the URs 20d to 20f delete the MFT entries corresponding to (S, G) held by the entry holders 21d to 21f, based on the Leave Group messages 7 which request the leave from the multicast tree identified with (S, G). Moreover, the message processors 25 input the received Leave Group messages 7 into the message providers 26.

The message providers 26 of the URs 20d to 20f set the oISA "S" as the destination addresses based on the Leave Group messages 7, generate Prune messages 8 which request the deletion of the MFT entries corresponding to (S, G), and provides the messages via the forwarders 23. The forwarders 23 of the URs 20d to 20f transmit the Prune messages 8. When receiving the Prune message 8, the UR 20a forwards the Prune message 8 to the ISA "S'" by use of a tunnel 9, in accordance with the association of the ISA "S'" and the OISA "S". In this manner, the Prune messages 8 reach the URs 20a to 20c and the source terminal 10 located in the ISA "S'".

The message processor 14 of the source terminal 10 and the message processors 14 of the URs 20a to 20c delete the MFT entries corresponding to (S, G) from the entry holders 11 and 21a to 21c based on the Prune messages 8. Consequently, as shown in FIG. 42, the entry holders 11 and 21a to 21f of the source terminal 10 and the URs 20a to 20f can hold only the MFT entries corresponding to (S', G).

[Communication Method]

A description will be given of the procedures of a communication method using the communication system 401 shown in FIG. 38. Initially, a description will be given of the operations of the URs 20a to 20f. The receivers 22 of the URs 20a to 20f receive multicast packets (S1401). The forwarding controllers 24 of the URs 20a to 20f obtain tunnel source addresses from the multicast packets, thus temporarily storing the addresses (S1402). The URs 20a to 20f decapsulate the multicast packets (S1403). The URs 20a to 20f judge whether or not the entry holders 21a to 21f are holding the corresponding MFT or MCT entries, based on the source terminal address and the multicast group address, the addresses being set in the multicast packets (S1404). The URs 20a to 20f discard the multicast packets, when the entries are not being held (S1406).

On the other hand, when having judged that the entries are being held in Step (S1404), the message processors 25 of the URs 20a to 20f judge that the entries are held as which of either MCT or MFT entries (S1405). When having judged that the entries are being held as MCT entries, the message providers 26 of the URs 20a to 20f generate Redirect messages destined for the source terminal address, in which Hop-by-Hop options are set, the messages requesting the addition of the forwarding addresses of the URs 20a to 20f to the sending addresses and the deletion of the addresses of the URs 20a to 20f themselves from the sending addresses. Subsequently, the forwarders 23 transmit the Redirect messages (S1412).

On the other hand, when having judged that the entries are being held as MFT entries in Step (S1405), the forwarding controllers 24 of the URs 20a to 20f judge that the tunnel source addresses of the received multicast packets agree with the tunnel source addresses held by the entry holders 21a to 21f (S1407).

When the tunnel source addresses do not agree with each other in Step (S1407), the forwarding controllers 24 of the URs 20a to 20f judge whether or not the tunnel source addresses of the received multicast packets agree with previous tunnel source addresses held by the entry holders 21a to 21f (S1408). When the tunnel source addresses agree with the previous tunnel source addresses, the message providers 26 of the URs 20a to 20f generate Prune messages in which Hop-by-Hop options are not set, and the forwarders 23 thus forward the messages to the previous tunnel source addresses (S1409).

On the other hand, when the tunnel source addresses do not agree with the previous tunnel source addresses in Step (S1408), the forwarding controllers 24 of the URs 20a to 20f set the tunnel source addresses currently held by the entry holders 21a to 21f as the previous tunnel source addresses of the entry holders 21a to 21f (S1410). At this point, the forwarding controllers 24 may set to delete the previous tunnel addresses due to the expiration of the STs, by utilizing the KATs of the entry holders 21a to 21f as STs. The forwarding controllers 24 of the URs 20a to 20f thereafter register the tunnel source addresses stored in Step (S1402) in the entry holders 21a to 21f (S1411). After Steps (S1409) and (S1411), the URs 20a to 20f advance to Step (S1413).

When the tunnel source addresses agree with each other in Step (S1407), if Steps (S1409) and (S1411) are finished, the forwarding controllers 24 of the URs 20a to 20f judge whether or not the destination addresses of the multicast packets are included in the forwarding addresses of the MFT entries (S1413). When the destination addresses are not included in the forwarding addresses, the forwarding controllers 24 encapsulate the multicast packets with the forwarding addresses (S1414). When having judged that the destination addresses are included in the forwarding addresses in Step (S1413), the forwarding controllers 24 input the multicast packets into the forwarders 23 natively. The forwarding controllers 24 input, into the forwarders 23, the multicast packets encapsulated in Step (S1414) Then, the forwarders 23 forward the multicast packets obtained from the forwarding controllers 24 (S1415). Note that Steps (S1407) to (S1411) can be omitted.

Next, a description will be given of the operations of the destination terminals 40a to 40c. The receivers 42 of the destination terminals 40a to 40c receive multicast packets (S1501). The packet processors 44 of the destination terminals 40a to 40c refer to the entry holders 41, and judge whether or not the source addresses of the received multicast packets are the ISAs (S1502).

When the source addresses of the multicast packets are the ISAs, the packet processors 44 of the destination terminals 40a to 40c judge whether or not the entry holders 41 are holding the oISA (S1503). When the entry holders 41 are holding the oISA, the packet processors 44 judge whether the MPTs are on or off (S1504). When the MPTs are in the off states, the message providers 45 of the destination terminals 40a to 40c generate Prune messages destined for the oISA, in which Hop-by-Hop options are set, thus providing the messages via the transmitters 43. Otherwise, the message providers 45 generate Leave Group messages destined for the oISA, and provide the messages via the transmitters 43 (S1505). Furthermore, the packet processors 44 activate the MPTs of the entry holders 41 (S1506).

Note that the destination terminals 40a to 40c do not perform special processing and the packet processors 44 process data included in the multicast packets, when the source addresses of the multicast packets are not the ISAs in Step (S1502), when the entry holders 41 are not holding the oISAs in Step (S1503), and when the MPTs are on in Step (S1504).

According to these kinds of the communication system 401, the URs 20a to 20f, the destination terminals 40a to 40c, and the communication method, the source terminal 10 includes the message provider 45 for providing the sending addresses with BU messages to notify a change in the source terminal address and for providing the destination terminals 40a to 40c with LU messages to notify the ISA "S'", when the source terminal address is changed. In addition, the destination terminals 40a to 40c include the message providers 45 for providing Join messages or Membership Reports to the ISA, based on the LU messages.

Therefore, when the source terminal address is changed due to the move of the source terminal 10, and the like, it is possible to build a tunnel between the source terminal and the UR of a sending address thereof by causing the source terminal 10 to transmit a BU message to the sending address. Accordingly, a control message destined for the oISA is forwarded to the source terminal 10.

Moreover, the source terminal 10 can notify the destination terminals 40a to 40c of the change in the source terminal address by use of LU messages. Then, the destination terminals 40a to 40c can transmit Join messages or Membership Reports to the ISA "S'" by grasping the change in the source terminal address by use of the LU messages. Accordingly, triggered by the Join messages or the Membership Reports, which are destined for the ISA "S'", a multicast tree appropriate for the ISA "S'" is newly set. Therefore, the communication system 401 can realize multicast using an appropriate multicast tree even if the source terminal address is changed.

In addition, a branch router holds a plurality of forwarding addresses associated with the ISA "S'". Thereby, the URs 20a to 20f can clearly discriminate the oISA "S", that is, a multicast tree corresponding to (S, G), from the ISA "S'", that is, a multicast tree corresponding to (S', G).

Furthermore, the message providers 45 of the destination terminals 40a to 40c provide Leave Group messages 7 and Prune message 8, the messages designating the address of the source terminal 10 before the change. Then, the message processors 14 and 25 of the source terminal 10 and the URs 20a to 20f delete, from the entry holders 11 and 21a to 21f, the OISA "S", that is, the sending and forwarding addresses associated with (S, G), based on the Leave Group messages 7, the Prune messages 8, and the holding times of the sending and forwarding addresses.

Hence, the communication system 401 can delete the multicast tree formed by use of the OISA "S", by use of the Leave Group messages 7, the Prune messages 8, and the holding times of the sending and forwarding addresses. Therefore, it is possible to control the redundant forwarding of multicast packets caused by the coexistence of the multicast tree using the oISA "S" and the multicast tree using the ISA "S'". Especially according to Leave Group messages 7 and Prune messages 8, the destination terminals 40a to 40c can explicitly leave the multicast tree formed by use of the OISA "S" designated by the Leave Group messages and the Prune messages, without waiting for the expiration of the holding times. Hence, it is possible to further mitigate redundant forwarding in the communication system 401.

Modification Example

It is to be understood that the present invention is not intended to be limited to the foregoing first to sixth embodiments, and various changes may be made therein.

Since an IP is a connectionless communication, there is a case where a message does not reach a target node. Therefore, the communication systems 1 to 401 are preferred to take measures to cause control messages to securely reach the target nodes. In other words, it is preferable to take measures against the loss of the control messages.

For example, the message providers 26 of the URs 20a to 20i and the message processor 14 of the source terminal 10 can provide acknowledges to the transmission source of control messages such as join request messages (a Membership Report 2 and a Join message 3), leave request messages (a Leave Group message 7 and a Prune message 8), and join/leave request messages and change request messages (a Redirect message 4), the messages being received by the URs 20a to 20i.

For example, the message providers 26 can explicitly provide acknowledges to the destination terminals 40a to 40c and other URs, which are the transmission sources, when generating entries to be registered in the entry holders 21a to 21i or deleting entries from the entry holders 21a to 21i based on the received control messages, or when generating control messages based on the received control messages. For example, the message providers 26 can provide acknowledges to the destination terminals 40a to 40c and other URs of the transmission sources, when forwarding the generated control messages. In addition, the message processor 14 of the source terminal 10 can provide an acknowledge to the transmission source of the control message, even when generating no entry to be registered in the entry holder 11, or when deleting no entry from the entry holder 11.

The destination terminals 40a to 40c or the URs 20a to 20i, which are the transmission sources to have received the acknowledges, can confirm not only that the source terminal 10 or the URs, which have received the control messages, have received the control messages, but also that the URs existing between themselves and the source terminal 10 or the URs, which have received the control messages, too, have received the control messages, by receiving the acknowledges.

In this manner, the destination terminals 40a to 40c and the URs 20a to 20i, which are the transmission sources, can recognize that the control messages provided by themselves have appropriately been processed and that the entry holders 11 and 21a to 21i held by the source terminal 10 and the URs 20a to 20i have securely been updated by the way that entries are generated and deleted based on the received control messages, or the URs and the source terminal 10, which have generated the control messages, provide acknowledges. Further, the destination terminals 40a to 40c and the URs 20a to 20i of the transmission sources can detect the loss of the control messages and provide the control messages again by being incapable of obtaining the acknowledges. Therefore, it is possible to cause the control messages to securely reach the target nodes in the communication systems 1 to 401. In addition, there is no need to transmit the same control messages repeatedly for the security reason, expecting the loss of the control messages. Accordingly, the loads on the entire communication systems 1 to 401 can be reduced.

Furthermore, it is possible to take measures against the loss of leave request messages also in the communication systems 1 and 201, by utilizing the KATs as in the communication systems 301 and 401. When receiving Join messages 3 relating to the entries before the KATs included in each entry are expired (within the holding times), the URs 20a to 20i and the source terminal 10 reactivate the KATs and extend their holding times. On the other hand, when not receiving Join messages before the KATs included in each entry are expired (within the holding times), the URs 20a to 20i and the source terminal 10 are automatically deleted from the forwarding and sending addresses of the entries.

In this case, there arises a need for the URs 20a to 20i and the destination terminals 40a to 40c, which desire to be maintained in the entries, to reactivate the KATs of the URs 20a to 20i and the source terminal 10, by transmitting Join messages 3 to the source terminal address before the expiration of the KATs of the corresponding entries. However, when desiring to leave a multicast tree, the URs 20a to 20i and the source terminal 10 are automatically deleted from the forwarding and sending addresses of the entries due to the expiration of the KATs. Therefore, the URs 20a to 20i and the destination terminals 40a to 40c, which desires to stop the transmission of multicast packets, are not required to transmit leave request messages repeatedly, expecting the loss of the leave request messages.

Note that, in terms of multicast packets, the communication systems 1 to 401 can increase their reliability by utilizing technologies such as TCP and SCTP (refer to RFC 2960) to forward multicast packets.

Furthermore, the loss of the multicast packets may occur when the source terminal 10 and the URs 20a to 20i immediately update the entry holders 11 and 21a to 21i based on control messages such as a Redirect message due to the join of a new destination terminal to the multicast tree. For example, in FIG. 24, the loss of the packet may occur in the UR 20f when deleting "UR6" from the entry holder 11 and deleting a forwarding path between the source terminal 10 and the UR 20f.

The source terminal 10 and the URs 20a to 20i may hold entries before updates for a predetermined period of time in order to prevent such loss of a multicast packet upon a change of a multicast tree due to a change in the information held by the entry holders 11 and 21a to 21i and to forward the multicast packet more securely. In other words, the loss of a packet may be mitigated by setting a fixed extra time.

In this case, for example, the UR 20f redundantly receives a multicast packet directly transmitted from the source terminal 10 and a multicast packet forwarded by the UR 20b, before the predetermined period of time passes. However, if an entry before an update is deleted from the source terminal 10 after the predetermined period of time passes, the multicast packet directly transmitted is automatically stopped to be transmitted.

Moreover, when having redundantly received multicast packets within the predetermined period of time, the UR 20f may transmit, to the source terminal 10, a Redirect message which explicitly requests the stop of the transmission of a multicast packet, and the like. According to this, it is possible to stop the redundant receipt of multicast packets and to change a multicast tree smoothly.

Furthermore, although multicast packets are encapsulated by use of forwarding and sending addresses and are forwarded in the communication systems 1 to 401, the method is not limited as long as the source terminal 10 and the URs 20a to 20i forward multicast packets in accordance with the sending and forwarding addresses held by the entry holders 11 and 21a to 21i. For example, the source terminal 10 and the URs 20a to 20i may use Network Address Translation (NAT) or IP masquerade. In this case, it is possible to reduce overhead due to encapsulation.

INDUSTRIAL APPLICABILITY

It is possible to set an appropriate multicast tree and forward a multicast packet, even if there exists a multicast-incapable router in a communication system.

The invention claimed is:

1. A communication system for forwarding a multicast packet transmitted from a source terminal to a destination terminal in accordance with predetermined forwarding paths, wherein
    the forwarding paths include a plurality of multicast-capable routers and a plurality of multicast-incapable routers, the plurality of multicast-capable routers include a non-branch router and a branch router, the non-branch router is connected to a single other multicast-capable router on the destination terminal side, and the branch router is connected to a plurality of other multicast-capable routers including the non-branch router on the destination terminal side, the non-branch router comprises:

a message provider configured to generate a request message requesting deletion of an address of the non-branch router and requesting registration of an address of a register target multicast-capable router connected to the destination terminal side of the non-branch router; and a forwarder configured to forward the request message to the branch router connected to the destination terminal side of the non-branch router;

the branch router comprises:

a forwarding destination holder configured to hold a table in which each address of the plurality of other multicast-capable routers is registered;

a forwarding destination register configured to update the table by deletion of the address of the non-branch router from the table and registration of an address of the register target multicast-capable router to the table, in accordance with receiving of the request message; and a forwarding controller configured to generate a second encapsulated multicast packet in accordance with receiving a first encapsulated multicast packet generated by setting an address of the branch router to the multicast packet, and wherein the forwarding controller is configured to generate the second encapsulated multicast packet by re-setting an address registered in the updated table to the multicast packet derived from the first encapsulated multicast packet.

2. The communication system according to claim 1, wherein the source terminal registers an address of a branch router most located on the source terminal side.

3. The communication system according to claim 1, wherein the plurality of multicast-capable routers further includes an edge router connecting to the destination terminal, and the edge router holds a multicast group address added to a multicast group in which the source terminal forwards the multicast packet.

4. The communication system according to claim 3, wherein the edge router transmits the multicast packet to the destination terminal by multicast, based on the multicast group address included in the multicast packet as a destination address.

5. The communication system according to claim 1, wherein when each of the plurality of other multicast-capable routers is connected to same subnetwork, the forwarding destination register is configured to register a multicast group address to the table instead of the each address of the plurality of other multicast-capable routers, the multicast group address is added to a multicast group in which the source terminal forwards the multicast packet, and when the multicast group address is registered in the table, the forwarding controller is configured to transmit the multicast packet derived from the first encapsulated multicast packet to each of the plurality of other multicast-capable routers by multicast.

6. The communication system according to claim 1, wherein the plurality of multicast-capable routers further include an other branch router located between the source terminal and the branch router, when a router connected to the source terminal is changed from the other branch router to the branch router by moving of the source terminal, the forwarding controller of the branch router is configured to receive a third encapsulated multicast packet generated by setting an address of the other branch router to the multicast packet and to generate fourth encapsulated multicast packets by re-setting an address registered in the updated table and the address of the other branch router to the multicast packet derived from the third encapsulated multicast packet.

7. The communication system according to claim 1, wherein the source terminal includes an update notification section for providing a location update message which notifies a new source terminal address after a change to a destination terminal when a source terminal address is changed, and the destination terminal includes a destination terminal message provider for providing a join request message to the new source terminal address based on the location update message, the join request message requests registration of an address of the destination terminal.

8. A multicast-capable router used in a communications system for forwarding a multicast packet transmitted from a source terminal to a destination terminal in accordance with forwarding paths including a plurality of multicast-capable routers and a plurality of multicast-incapable routers, wherein when the multicast-capable router is a non-branch router connected to a single other multicast-capable router on the destination terminal side, the multicast-capable router comprises:

a message provider configured to generate a request message requesting deletion of an address of the non-branch router and requesting registration of an address of a register target multicast-capable router connected to the destination terminal side of the non-branch router; and a forwarder configured to forward the request message to the branch router connected to the destination terminal side of the non-branch router;

when the multicast-capable router is a branch router connected to a plurality of other multicast-capable routers including the non-branch router on the destination terminal side, the multicast-capable router comprises:

a forwarding destination holder configured to hold a table in which each address of the plurality of other multicast-capable routers is registered;

a forwarding destination register configured to update the table by deletion of the address of the non-branch router from the table and registration of an address of the register target multicast-capable router to the table, in accordance with receiving of the request message; and a forwarding controller configured to generate a second encapsulated multicast packet in accordance with receiving a first encapsulated multicast packet generated by setting an address of the branch router to the multicast packet, and wherein the forwarding controller is configured to generate the second encapsulated multicast packet by re-setting an address registered in the updated table to the multicast packet derived from the first encapsulated multicast packet.

9. A communication method for forwarding a multicast packet transmitted from a source terminal to a destination terminal in accordance with forwarding paths including a plurality of multicast-capable routers and a plurality of multicast-incapable routers, the plurality of multicast-capable routers including a non-branch router and a branch router, wherein the non-branch router is connected to a single other multicast-capable router on the destination terminal side and wherein the branch router is connected to a plurality of other multicast-capable routers, including the non-branch router, on the destination terminal side, the communication method comprising:

generating, in the non-branch router, a request message requesting deletion of an address of the non-branch router and requesting registration of an address of a register target multicast-capable router connected to the destination terminal side of the non-branch router;

forwarding the request message to the branch router connected to the destination terminal side of the non-branch router;

receiving, in the branch router, the request message;

updating, in branch router, a table, in which each address of the plurality of other multicast-capable routers is registered, by deletion of the address of the non-branch router from the table and by registration an address of the register target multicast-capable router to the table, in accordance with the received request message;

receiving, in the branch router, a first encapsulated multicast packet generated by setting an address of the branch router to the multicast packet;

generating, in the branch router, a second encapsulated multicast packet by re-setting an address registered in the updated table to the multicast packet derived from the first encapsulated multicast packet.

10. The communication method according to claim 9, wherein the source terminal registers an address of a branch router most located on the source terminal side.

11. The communication method according to claim 9, comprising:

transmitting a location update message which notifies a destination terminal of a source terminal address after a change when a new source terminal address is changed; and transmitting, to the new source terminal address, the join request message which requests registration of an address of the destination terminal, based on the location update message.

12. The communications system according to claim 1, wherein the register target multicast-capable router is an other branch router or an edge router, the other branch router is connecting to a plurality of other multicast-capable routers on the destination terminal side, and the edge router is connecting to the destination terminal.

* * * * *